(12) United States Patent
Kothari

(10) Patent No.: US 10,723,267 B2
(45) Date of Patent: Jul. 28, 2020

(54) DISPLAY REAR PASSENGER VIEW ON A DISPLAY SCREEN IN VEHICLE

(71) Applicant: Be Topnotch, LLC, Henrico, VA (US)

(72) Inventor: Ankit Dilip Kothari, Henrico, VA (US)

(*) Notice: Subject to any disclaimer, the term of this patent is extended or adjusted under 35 U.S.C. 154(b) by 0 days.

(21) Appl. No.: 15/650,762

(22) Filed: Jul. 14, 2017

(65) Prior Publication Data

US 2017/0313248 A1    Nov. 2, 2017

Related U.S. Application Data

(63) Continuation-in-part of application No. 15/269,950, filed on Sep. 19, 2016, now Pat. No. 9,712,741, which (Continued)

(51) Int. Cl.
*B60R 1/00* (2006.01)
*B60R 1/12* (2006.01)
(Continued)

(52) U.S. Cl.
CPC .............. *B60R 1/008* (2013.01); *B60J 3/0204* (2013.01); *B60K 35/00* (2013.01); *B60R 1/00* (2013.01); *B60R 1/12* (2013.01); *B60R 11/0235* (2013.01); *B60R 11/04* (2013.01); *G06F 3/017* (2013.01); *G06F 3/0416* (2013.01); *G06F 3/0488* (2013.01); *G06F 3/04883* (2013.01); *G06K 9/00355* (2013.01); *G06K 9/00791* (2013.01); *G06K 9/00832* (2013.01); *G06K 9/00838* (2013.01); *H04N 5/23212* (2013.01); *H04N 5/23216* (2013.01); *H04N 5/23293* (2013.01); *H04N 5/23296* (2013.01); *H04N 5/247* (2013.01); *H04N 7/181* (2013.01); *B60K 2370/152* (2019.05);

*B60K 2370/176* (2019.05); *B60K 2370/21* (2019.05); *B60K 2370/777* (2019.05); *B60R 2001/1269* (2013.01); *B60R 2011/0035* (2013.01);

(Continued)

(58) Field of Classification Search
CPC ...... B60R 2300/8026; B60R 2300/308; B60R 2300/8093; B60R 1/04; B60R 2011/0033; B60R 2011/0082; B60R 2300/105; B60R 2300/70; B60R 2300/8046; B60R 1/02; B60R 2011/0035; G08G 1/166; G08G 1/165; G08G 1/0175; G06K 9/00805; G06K 9/00791; G06K 9/00785; G06K 9/00798; H04N 7/183; H04N 7/181; H04N 5/2257; H04N 5/2252; H04N 5/2259; H04N 5/23296; B60J 3/0204

See application file for complete search history.

(56) References Cited

U.S. PATENT DOCUMENTS

| 2008/0212215 A1* | 9/2008 | Schofield | ............... B60C 23/00 359/844 |
| 2010/0245278 A1* | 9/2010 | Hosoda | ............... G06F 3/04883 345/173 |

\* cited by examiner

*Primary Examiner* — Farhan Mahmud
(74) *Attorney, Agent, or Firm* — Ellenoff Grossman & Schole LLP; James M. Smedley; Alex Korona

(57) ABSTRACT

An automotive audio visual system includes a display screen on the vehicle, such as the central display screen on the vehicle's dashboard, and one or more rear cameras facing a rear passenger seat of the vehicle. The image or video feed from one or more rear cameras is displayed on the display screen in the vehicle, so that the front passengers can view the rear passenger area on the vehicle's display screen.

29 Claims, 20 Drawing Sheets

Related U.S. Application Data is a continuation-in-part of application No. 14/623,368, filed on Feb. 16, 2015, now Pat. No. 9,457,642.

(60) Provisional application No. 62/220,966, filed on Sep. 19, 2015, provisional application No. 62/052,475, filed on Sep. 19, 2014.

(51) Int. Cl.

| | |
|---|---|
| *B60J 3/02* | (2006.01) |
| *H04N 5/247* | (2006.01) |
| *H04N 5/232* | (2006.01) |
| *G06F 3/0488* | (2013.01) |
| *G06K 9/00* | (2006.01) |
| *G06F 3/041* | (2006.01) |
| *H04N 7/18* | (2006.01) |
| *G06F 3/01* | (2006.01) |
| *B60R 11/04* | (2006.01) |
| *B60R 11/02* | (2006.01) |
| *B60K 35/00* | (2006.01) |
| *B60R 11/00* | (2006.01) |

(52) U.S. Cl.
CPC ... *B60R 2300/105* (2013.01); *B60R 2300/205* (2013.01); *B60R 2300/207* (2013.01); *B60R 2300/406* (2013.01); *B60R 2300/8006* (2013.01); *B60R 2300/8013* (2013.01); *G06F 2203/04808* (2013.01)

DISPLAY REAR PASSENGER VIEW ON A DISPLAY SCREEN IN VEHICLE

CROSS-REFERENCE TO RELATED APPLICATIONS

This application is a Continuation-in-Part of U.S. patent application Ser. No. 15/269,950 entitled "Smart Vehicle Sun Visor" filed on Sep. 19, 2016, which claims priority to U.S. Provisional Patent Application Ser. No. 62/220,966, entitled "Enhanced vehicle sun visor with a multi-functional touch screen with multiple camera views and photo video capability" filed on Sep. 19, 2015, and U.S. Non-Provisional patent application Ser. No. 14/623,368, entitled "Vehicle Sun Visor with a Multi-Functional Touch Screen with Multiple Camera Views and Photo Video Capability" filed on Feb. 16, 2015, which claims priority to U.S. Provisional Patent Application No. 62/052,475, entitled "Replace mirror on the vehicle's sun visor with multi-functional LED touch screen that displays multiple webcams and has photo video upload capability" filed on Sep. 19, 2014. The contents of all of the aforementioned patent applications are incorporated herein by reference in their entirety.

FIELD OF THE INVENTION

The present application relates to an automotive audio visual system comprising of a display screen on the vehicle such as the central display screen on the vehicle's dashboard and one or more rear cameras facing a rear passenger seat of the vehicle. The image or video feed from one or more rear cameras is displayed on the display screen in the vehicle such that the front passengers can view the rear passenger area on the vehicle's display screen.

BACKGROUND

Currently, the most sophisticated use of a vehicle sun visor involves nothing more than placing a vanity mirror on one side. When in use, current sun visors, while blocking out glare, eliminate a portion of the vehicle exterior from view, often forcing drivers to lift the sun visor in order to gain visibility of traffic lights or road signs ahead. Also, the currently existing mirrors on the vehicle's sun visors only display the person sitting inside the vehicle in front of that sun visor. However, such existing sun visor mirrors don't display the opposite direction i.e. view external to the vehicle, or in other words, view in front of the vehicle. Also, as mentioned above, the existing sun visor mirrors don't display any other passengers that aren't visible in the direct view i.e. in front of that sun visor. In addition, the existing sun visor mirrors also don't have the ability to take photos/videos and be able to upload them to a central location. Here are some scenarios that further explain these shortcomings of the existing sun visor mirrors.

There are many people who pull down the vehicle's sun visor to either avoid the bright sunlight during the day or to avoid the glare coming from other vehicles during the night. However, when such people are either driving or waiting in their vehicles, either during the day or the night, with their sun visor down, and if they wanted to see the traffic light, informational boards, street names, or other similar information, which is usually posted higher up, then those people often have to get that external information either by looking from the sides of their sun visor or sometimes even have to pull up their sun visors altogether to access that external information. In this case, since the currently existing mirrors on the vehicle's sun visors only display the view inside the vehicle and not the opposite direction i.e. the view external to the vehicle, so the existing mirrors on the sun visors don't help, and therefore, the vehicle's passengers often have to look at the bright sunlight or the glare in order to access the external information that's usually displayed higher up on the roads.

Since the existing sun visor mirrors also don't intend to display any other passengers except the person sitting in front of that sun visor, an individual who wants to look at the other passengers, especially the rear passengers, either has to look using special curved mirror that's usually located in the center of the vehicle, or turn around, or even move up and down their seat in order to create a correct angle for being able to view the other passengers using their vehicle's sun visor or the central rear view mirror. In short, the existing sun visor mirrors don't provide an easy way to be able to view the other passengers that might be sitting in the vehicle.

Also, the existing sun visor mirrors don't have the ability to take photos/videos of the passengers or to upload those photos/videos to online albums using built-in Wi-Fi, cellular, or to share those photos/videos with another device like smartphone, computer, etc. using Bluetooth. Many people spend a lot of time travelling and usually there are very minimal photos/videos taken during their travel in the vehicle. Since the existing mirrors don't have this feature to take photos/videos for the passengers sitting in the vehicle, those travelling moments are often never captured. Also, the existing sun visor mirrors don't have the video chat/conference functionality, which can allow the users to talk and share/exchange their videos in real-time with anyone else in the world that have video chat capable devices.

BRIEF SUMMARY

According to an embodiment of the present invention, a sun visor device allows the user to see the area around the vehicle which is blocked when the sun visor is deployed with polarization or glare reduction.

According to an embodiment of the present invention, an automotive visualization system comprises: a first camera, a display apparatus placed within view of a user of the vehicle, a computer processor, non-volatile computer memory storing computer instructions configured to: receive a first image from the first camera, display the first image on the display apparatus in real time, and a switching mechanism configured to cause the display apparatus to turn on and/or off in response to the switching mechanism.

According to an embodiment of the present invention, the first camera is placed in a position that faces toward the front of a vehicle.

According to an embodiment of the present invention, the first camera is positioned in a vehicle sun visor such that, when the sun visor is deployed, the camera faces toward the front of the vehicle.

According to an embodiment of the present invention, the display apparatus is a display screen and the display screen is mounted on or configured to be mounted on a vehicle sun visor such that when the sun visor is deployed, the display screen faces toward a user of the sun visor.

According to an embodiment of the present invention, the automotive visualization system further comprises: a rechargeable battery, and a housing configured to contain the first camera, the display apparatus, the computer processor, and the non-volatile computer memory in the form factor of a tablet PC, wherein the housing is configured to be detachable from the vehicle sun visor.

According to an embodiment of the present invention, the automotive visualization system is configured to interface with a Head Up Display, wherein the computer instructions are further configured to: send the front image for display on the Head Up Display, turn off the display apparatus when the Head Up Display is in use, and turn on the display apparatus in response to a user action in order to receive additional user inputs.

According to an embodiment of the present invention, the computer instructions are further configured to keep the display apparatus on, while the Head Up Display is in use, in response to a predetermined user input.

According to an embodiment of the present invention, the first camera produces a front image that is a polarized front image.

According to an embodiment of the present invention, the automotive visualization system further comprises a photochromic lens.

According to an embodiment of the present invention, the computer instructions are further configured to: process the front image to remove glare.

According to an embodiment of the present invention, the automotive visualization system further comprises: a second camera placed in a position that faces toward a user of a vehicle sun visor, wherein the display is configured to display a user image of the user, produced by the second camera, in response to a command entered by the user.

According to an embodiment of the present invention, the computer instructions are further configured to capture images produced by the first camera and/or the second camera.

According to an embodiment of the present invention, the automotive visualization system further comprises: a microphone; and the computer instructions are further configured to record video produced by the first camera and/or the second camera and capture audio produced by the microphone.

According to an embodiment of the present invention, the computer instructions are further configured to automatically transfer captured images to another location over a wireless connection.

According to an embodiment of the present invention, the computer instructions are further configured to automatically delete the captured images that have been transferred to another location.

According to an embodiment of the present invention, the computer instructions are further configured to provide a graphical user interface in a display area of the display apparatus, the graphical user interface comprising: a camera image viewing region centrally located in the display area, a view selection region, displayed on a first side of the display area, for selecting among the views produced by the cameras of the system, and a user action region, displayed on a second side of the display area, made up of one or more user action areas comprising: a user action area for capturing images, a user action area for viewing captured images, a user action area for accessing system settings, and a user action area for adjusting brightness.

According to an embodiment of the present invention, the automotive visualization system further comprises: one or more rear cameras placed in a position that faces a rear passenger seat of the vehicle, and the display apparatus is configured to display a rear view produced by the one or more rear cameras, in response to user input.

According to an embodiment of the present invention, the computer instructions are further configured to capture images and/or video produced by the first camera and/or at least one of the one or more rear cameras.

According to an embodiment of the present invention, the display apparatus is configured to: display multiple rear views in a split view mode displaying each of the multiple rear views in a separate section of the display apparatus simultaneously; and the computer instructions are further configured to switch to an enlarged view of one of the multiple rear views in response to user input.

According to an embodiment of the present invention, the automotive visualization system further comprises: a rear seat sensor that can detect rear facing passengers sitting on the rear seat.

According to an embodiment of the present invention, the rear seat sensor is embedded within the rear camera.

According to an embodiment of the present invention, one or more rear camera is further configured to capture the rear facing passenger sitting in the rear seat; and the display apparatus is further configured to display the rear facing passenger sitting in the rear seat.

According to an embodiment of the present invention, the display apparatus is configured to: display multiple rear camera views displaying both the rear facing passengers and the front facing passengers sitting on the rear seats of the vehicle.

According to an embodiment of the present invention, the computer instructions are further configured to: adjust focus and/or zoom of at least one of the one or more rear cameras in response to user input.

According to an embodiment of the present invention, the computer instructions are further configured to: save a focus and/or zoom level as a default camera setting, wherein a separate default camera setting is stored for each of the one or more rear cameras, and wherein the default camera setting is used each time the rear view of the camera to which the default camera setting belongs is displayed.

According to an embodiment of the present invention, the display apparatus acts as a regular mirror when the LCD within the display apparatus is turned off using the switching mechanism.

According to an embodiment of the present invention, a user of the vehicle can use voice commands to operate the automotive visualization system.

According to an embodiment of the present invention, an automotive audio visual system comprises: a housing; a first camera positioned on a first side of the housing; a display apparatus on a second side of the housing; a computer processor; non-volatile computer memory storing computer instructions configured to: receive a first image from the first camera, display the first image on the display apparatus in real time; and a switching mechanism configured to cause the display apparatus to turn on and/or off in response to the switching mechanism, wherein the housing is mounted or configured to be mounted on the ceiling of a vehicle.

According to an embodiment of the present invention, the automotive audio visual system further comprises: a second camera positioned on the second side of the housing, a microphone, and wherein the computer instructions are further configured to: receive a second image from the second camera, and display the second image on the display apparatus in real time.

According to an embodiment of the present invention, the automotive audio visual system further comprises: a second camera positioned elsewhere in or on the vehicle, an external camera interface to interface with the second camera, and wherein the computer instructions are further configured to:

receive a second image from the second camera, and display the second image on the display apparatus in real time.

According to an embodiment of the present invention, the first camera is configured to produce a polarized first image.

According to an embodiment of the present invention, a user of the vehicle can use voice commands to operate the automotive audio visual system.

According to an embodiment of the present invention, an automotive visual system for monitoring traffic signals, road signs, and such from a motor vehicle, where the visual system comprises: a vehicle having a windshield, a camera positioned behind the windshield, and the camera facing toward the front of the vehicle.

According to an embodiment of the present invention, the automotive visual system further comprises: a head up display, and a front image and/or video captured by the camera is displayed on the head up display.

According to an embodiment of the present invention, an automotive audio visual system comprises: a sunvisor, a display apparatus installed on sunvisor such that when the sunvisor is deployed, display apparatus faces a user of the sunvisor and a camera configured to face the user of the sunvisor at least when the sunvisor is deployed.

According to an embodiment of the present invention, the sunvisor is detachable from a vehicle to which the sunvisor is attached.

According to an embodiment of the present invention, the automotive audio visual system further comprises: non-volatile computer memory storing computer instructions configured to: receive an image and/or video from the camera, display the image and/or video on the display apparatus in real time, and capture images and/or videos produced by the camera in response to user input.

According to an embodiment of the present invention, the computer instructions are further configured to automatically transfer captured images and/or videos to another location over a wireless connection.

According to an embodiment of the present invention, the automotive audio visual system further comprises: a switching mechanism configured to cause the display apparatus to turn on and/or off in response to the switching mechanism.

According to an embodiment of the present invention, the display apparatus on the sun visor acts as a regular mirror when the LCD within the display apparatus is turned off using the switching mechanism.

According to an embodiment of the present invention, an automotive audio visual system comprises: a first camera, a display apparatus placed within view of a user of the vehicle, a computer processor, a microphone, a mechanism configured to turn on and/or off the video chat functionality.

According to an embodiment of the present invention, an automotive audio visual system further comprises: ability to send video chat request to video chat recipients According to an embodiment of the present invention, an automotive audio visual system further comprises: non-volatile computer memory storing computer instructions configured to: send video feed from the first camera to the video chat recipients in real time, display the video chat recipients' video feed on the display apparatus in real time, exchange audio between the video chat recipients and the user of the vehicle in real time.

According to an embodiment of the present invention, the first camera is placed in a position that faces toward a user of a vehicle sun visor.

According to an embodiment of the present invention, the first camera is positioned in a vehicle sun visor such that, when the sun visor is deployed, the camera faces toward the user of the vehicle sun visor.

According to an embodiment of the present invention, the display apparatus is a display screen and the display screen is mounted on or configured to be mounted on a vehicle sun visor such that when the sun visor is deployed, the display screen faces toward a user of the sun visor.

According to an embodiment of the present invention, the automotive audio visual system further comprises: a second camera placed in a position that faces toward the front of a vehicle, and the display is configured to display surrounding front image or video of the vehicle, produced by the second camera, in response to a command entered by the user.

According to an embodiment of the present invention, the computer instructions are further configured to capture images and/or video produced by the first camera and/or the second camera.

According to an embodiment of the present invention, the automotive audio visual system further comprises: one or more rear cameras placed in a position that faces a rear passenger seat of the vehicle, and the display apparatus is configured to display a rear view produced by the one or more rear cameras, in response to user input.

According to an embodiment of the present invention, the computer instructions are further configured to capture images and/or video produced by the first camera and/or one or more rear cameras.

According to an embodiment of the present invention, an automotive audio visual system comprises: a display apparatus placed within view of a user of the vehicle, one or more rear cameras placed in a position that faces a rear passenger seat of the vehicle, and the display apparatus is configured to display real time rear view produced by one or more rear cameras.

According to an embodiment of the present invention, the display apparatus is mounted on or configured to be mounted on ceiling of the vehicle.

According to an embodiment of the present invention, the display apparatus is configured to: display multiple rear views in a split view mode displaying each of the multiple rear views in a separate section of the display apparatus simultaneously, and the computer instructions are further configured to switch to an enlarged view of one of the multiple rear views in response to user input.

According to an embodiment of the present invention, an automotive audio visual system further comprises: a rear seat sensor that can detect rear facing passengers sitting on the rear seat According to an embodiment of the present invention, the rear seat sensor is embedded within the rear camera.

According to an embodiment of the present invention, one or more rear camera is further configured to capture the rear facing passenger sitting in the rear seat, and the display apparatus is further configured to display the rear facing passenger sitting in the rear seat.

According to an embodiment of the present invention, the display apparatus is configured to: display multiple rear camera views displaying both the rear facing passengers and the front facing passengers sitting on the rear seats of the vehicle.

The illustrated embodiments of the invention includes an apparatus of an audiovisual system, either built-in or retrofitted to a vehicle sun visor, allowing the driver and front passenger to regain visibility of the portion of the vehicle's external environment blocked from view when the sun visor is in use. This audiovisual system is alternatively referred to as an automotive visualization system. It also enables them to digitally view themselves and rear passengers, and also other additional camera views can be integrated or interfaced with the system. In addition, it also enabled them to take and upload videos and images of vehicle's internal and external environment by manipulating and communicating with a system of cameras from a tablet-like touch screen device that's built-in or retrofitted on the vehicle sun visors.

While the illustrated embodiments are primarily directed as original built-in equipment on a vehicle sun visor, it is within the spirit and scope of the invention to be able to retrofit the disclosed apparatus on existing vehicle sun visors as well.

The illustrated embodiments of the invention not only adds audiovisual systems on the vehicle's sun visors but also returns visibility to the portion of the vehicle environment that is blocked by use of the sun visor. It allows the user to not only view things in the vehicle's external environment that would be otherwise blocked by the sun visor, but also to enhance that view by using glare reduction and other image processing tools. In addition, it also allows the user to digitally view themselves and the rear passengers, and also other additional camera views can be integrated or interfaced with the system (For example: 'Rear polarized view' camera can also be displayed on the sun visor's LCD touch screen, so when the vehicle is being reversed, it would display the rear view of the vehicle on the sun visor's LCD touch screen, and that view would also be auto polarized and auto photochromic.) Moreover, it also allows the user to capture and store video and images, both within the vehicle and in the vehicle's external environment, allowing users to memorialize their trips.

Finally, the sun visor provides a convenient center for control and manipulation of such a system, allowing a driver to easily view both the external environment and interior of the vehicle by manipulating conveniently placed controls without turning or struggling with the sun visor thereby minimizing distractions during driving.

The invention is comprised of three major elements: a tablet like device containing a touch screen, a computer programmed to communicate with and display images/video, and a system of cameras placed within and/or outside the vehicle. The tablet like touch screen device is built-in or retrofitted to the vehicle's sun visors. Multiple cameras, either embedded on the sun visors' touch screen device itself or placed at different locations in the vehicle, allows to capture different views comprising the following: a "polarized front" view, which is the view of the external environment in front of the vehicle, a portion of which is usually hidden while the sun visor is in use; a "see me" view, which is the view of the person seated in the vehicle directly in front of the sun visor; and a "rear passengers" view, which is the view of passengers seated on the back seats of the vehicle; and there can also be other additional cameras that can be integrated or interfaced with this system (For example: 'Rear polarized view' camera can also be displayed on the sun visor's LCD touch screen, so when the vehicle is being reversed, it would display the rear view of the vehicle on the sun visor's LCD touch screen, and that view would also be auto polarized and auto photochromic.) The tablet like touch screen device contains software modules enabling the user to switch between cameras, zoom-in on certain portions of the displayed camera views, take and view images/videos, delete stored images/videos, enhance the images displayed, auto share images/videos with other devices, auto upload images/videos to online services and auto delete images/videos by simply manipulating controls and settings displayed on the touch screen.

In summary, the illustrated embodiments can now be understood to include an audiovisual monitoring system on a vehicle sun visor comprising: a "polarized front" view camera configured to capture view of a vehicle's external environment, a portion of which is typically blocked when the sun visor is in use; a "see me" view camera configured to capture view of the person sitting in front of the sun visor; a "rear passengers" view camera or a set of such cameras configured to capture view of the passengers sittings in the back seats of the vehicle; other potential camera views, a computer communicating with and controlling the cameras; and a tablet like LCD touch screen device electronically communicated to the computer and displaying the views captured by the cameras.

The computer is controlled by software allowing a user to communicate to the computer by manipulating controls appearing on the touch screen.

The computer is controlled by software allowing a user to direct the computer to selectively display a view from either the polarized front view, see me, or rear passengers view cameras onto the LCD touch screen.

The audiovisual monitoring system further includes a memory for capturing an image and/or video from the polarized front view, see me, or rear passengers view cameras.

The computer includes a software module therein for selectively controlling touch screen brightness.

The computer includes a software module therein for selectively generating a "Take Photos/Videos" control signal directed to a selected camera.

The computer includes a software module therein for selectively generating a "Save Settings" control signal directed to each camera.

The computer includes a software module therein for generating a "Reset Settings" control signal directed to each camera.

The computer includes a software module therein for selectively generating a zoom in/out control signal directed to the selected camera.

The computer includes a software module therein to enable/disable connectivity features like Wi-Fi, Bluetooth, Cellular, etc.

The computer includes a software module therein for generating an "auto upload/share" signal for the photos/videos stored on the sun visor's LCD touch screen device.

The computer includes a software module therein for generating an 'Auto delete after share/upload' signal for the photos/videos stored on sun visor's LCD touch screen device.

The computer includes a software module therein to allow the user to set the 'Default webcam/camera' view, which would be displayed whenever the sun visor's LCD touch screen is turned on.

The computer includes a software module therein to automatically turn on the sun visor's LCD touch screen display when the sun visor cover is pulled up/opened and automatically turn off the sun visor's LCD touch screen display when the sun visor cover is pulled down/closed.

The "polarized front" view camera includes a lens therein that is both auto-polarized and auto-photochromic, and there would also be software modules present on computer that can apply the polarization and photochromic effects.

The audio visual monitoring system further includes a vehicle head-up display (HUD) system, and wherein the computer includes a software module for communicating with the vehicle head-up display (HUD) system. (Note: Purpose of the head-up display (HUD) system is to project information ('camera views', photos/videos, etc.) on the windshield of the vehicle. In some cases, even a special glass is used on the windshield, so the projected information from the 'HUD display' seems to be further away i.e. after the hood of the vehicle, avoiding any distraction for the driver.)

The computer includes a software module enabling a camera view that's displayed on the sun visor's LCD touch screen or the stored photos/videos on the sun visor's LCD touch screen to be displayed on the head-up display (HUD) system. This functionality would allow the users to keep looking straight on their windshield itself, and they would not have to look at the sun visor's LCD touch screen display for different camera views or the stored photos/videos.

The computer includes a software module that selectively shuts down the sun visor's LCD touch screen after a predetermined time period while the HUD system is activated.

The computer includes a software module therein to manually turn on the sun visor's LCD touch screen, after it's shut down due to activation of the HUD system, by tapping on that sun visor's LCD touch screen with a finger/hand. (Note: In this case, the sun visor's LCD touch screen would turn on for a predetermined short time period and then turn off again.)

The computer includes a software module therein to keep the sun visor's LCD touch screen display continuously turned on, while the HUD display is already on, by pressing continuously on the sun visor's LCD touch screen for a predetermined time period.

The computer includes a software module therein to enable video chat/conference functionality on the sun visor system, which would allow the users to talk and share/exchange their video, i.e. any of the sun visor's camera views, in real-time with anyone else in the world that have video chat capable devices.

The tablet like LCD touch screen device on the sun visor includes the 'Polarized front view' camera on the device itself, 'See me' camera on the device itself, an on/off switch to either turn on or turn off the touch screen display, a speaker for playback of stored videos, a volume control to increase or decrease the volume for playback of any stored videos, a headphone jack for individual listening to audio of any stored videos, a microphone for recording the audio in the videos, and an Audio/video out/Digital terminal that would allow the user to connect to a computer using a USB data cable and transfer any photos/videos stored on the sun visor's LCD touch screen device. Note: The above mentioned features on the sun visor's LCD touch screen device are just for exemplary purposes, however, as technology advances in future, additional ports and/or options can be added to this LCD touch screen device to enhance the use of these devices.

The system described above would continue to work/function even when the vehicle isn't turned on i.e. the sun visor's LCD touch screen device would run using its built-in rechargeable battery in this case, and battery symbol would be displayed on its LCD touch screen to indicate the amount of remaining battery.

The tablet like LCD touch screen device on the sun visor would be detachable, so any of the audio visual monitoring system functions while attached to the vehicle's sun visor would also continue to work while the LCD touch screen device is detached. Note: While detached, the sun visor's LCD touch screen device would continue to work using its built-in rechargeable battery, and battery symbol would be displayed on its LCD touch screen to indicate the amount of remaining battery.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The disclosure can be better visualized by turning now to the following drawings.

BRIEF DESCRIPTION OF THE DRAWINGS

FIG. 25 illustrates that when a user buckles their seat belt, which has a sensor installed in the seat belt buckle, then the sun visor can be configured to automatically comes down or be deployed and also automatically opens the cover of the sun visor, which in turn causes the display screen of the sun visor to turn on.

The disclosure and its various embodiments can now be better understood by turning to the following detailed description of the preferred embodiments which are presented as illustrated examples of the embodiments defined in the claims. It is expressly understood that the embodiments as defined by the claims may be broader than the illustrated embodiments described below.

DETAILED DESCRIPTION

Figure 1:
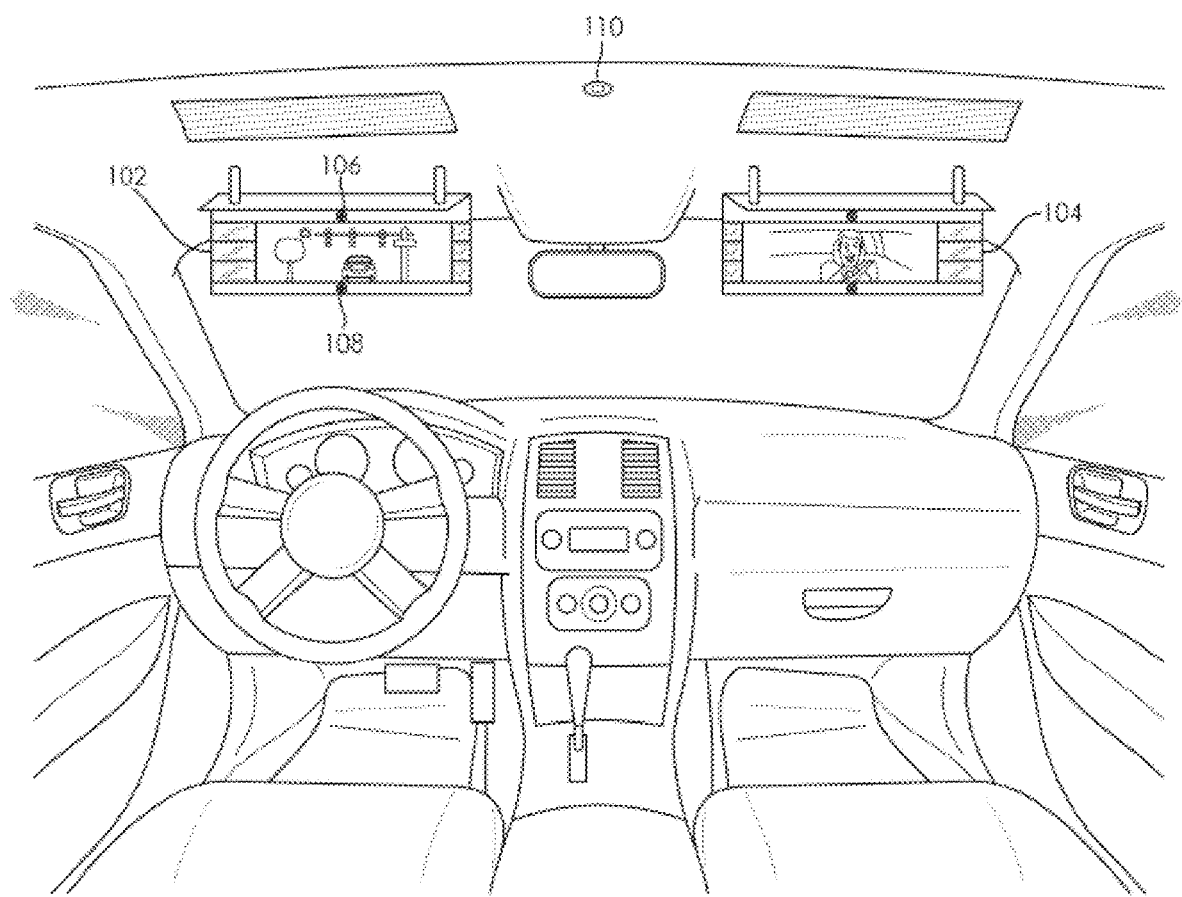
FIG. 1 is a diagram which illustrates the multi-functional LCD touch screen device built into both the driver side and the front passenger side sun visors, which would replace the existing sun visor mirrors. In addition, it also illustrates the exemplary locations of the cameras that would be installed for the 'Polarized front view', 'See me view' and the 'Rear passengers view'.

As shown in FIG. 1, this solution would replace the mirror on the vehicle's sun visor with multi-functional LCD touch screen device 102, 104. Each of those LCD touch screen devices would have multiple built-in cameras 106, 108 and an interface to external cameras 110, ability to display any of those camera views, ability to take pictures and videos and later view those on LCD touch screen, ability to share those photos/videos with another device or upload them to central location, and using auto polarization and auto photochromic lens on a camera as well as using software module an ability to auto-reduce the glare or bright light, so the objects (for example: traffic lights) can be clearly visible on screen. Even for those vehicles that currently don't have an existing mirror on their sun visors, this solution would add a multi-functional LCD touch screen display on those sun visors too. (Note: the size of the LCD touch screen display can either be the full size of the sun visor or can even be a small portion of that sun visor.)

According to an embodiment of the present invention, the camera has a polarized lens which allows the camera to capture a polarized image. Alternatively, the camera may have a polarized image sensor, or a polarizing filter may be affixed to the vehicle windshield or a polarizing film may be applied over the lens of the camera. One or ordinary skill in the art would recognize that any method of polarizing the image captured by the camera could be used to achieve polarization without departing from the spirit and scope of the present invention.

It is to be clearly understood that either a single LCD touch screen device or a plurality of such devices built in or affixed to one or more sun visors and communicated with one or more of the cameras is also within the scope and spirit of the invention. Also, it is to be clearly understood that either a single or plurality of sun visors with LCD touch screens can exist in any part of the vehicle i.e. front, back, right, left or top side of the vehicle, and that's within the scope and spirit of the invention. Please note that depending upon the side of the vehicle where the sun visor exists, some functionalities or camera views on the sun visor's LCD touch screen devices might be different. For example: rear seat sun visors might not display the 'rear passengers' camera view, instead it might display the front seat passengers using one or more 'front passenger' cameras.

For reference, FIG. 1 also provides an illustrative interior view of a vehicle containing the sun visor's visual system, including the other components of the vehicle like steering wheel, center console, gear shifter, dashboard with dashboard accessories, rear-view mirror, and front windshield.

According to an embodiment of the present invention, one or more rear passenger view cameras may be placed elsewhere in the vehicle and interface with the sun visor device through a standard external camera interface.

The external camera interface may be wired or wireless. A wired external camera interface may be USB, Firewire, a proprietary camera interface, or any other kind of interface. A wireless external camera interface may be Bluetooth, Wi-Fi, Zigbee, or any other standard or proprietary wireless communication protocol. One or ordinary skill in the art would recognize that any external camera interface may be used without departing from the spirit and scope of the present invention.

According to an embodiment of the present invention, throughout this specification the invention described herein may be referred to as a computer, system, sun visor device, automotive visualization system interchangeably. The user directs the system to perform various available user actions. Throughout the specification and claims, user actions used to control the system may be referred to as commands, instructions, directions, input, gestures, or actions. These actions may be performed by pressing buttons, turning knobs, moving sliders, touching the touch-sensitive screen of the device, double tapping, dragging, pinching, sliding or any other gestures commonly used to interact with a touch screen-device. One or ordinary skill in the art would recognize that any user action may be used to interact with the computer, sun visor device, or automotive visualization system.

Figure 2A:
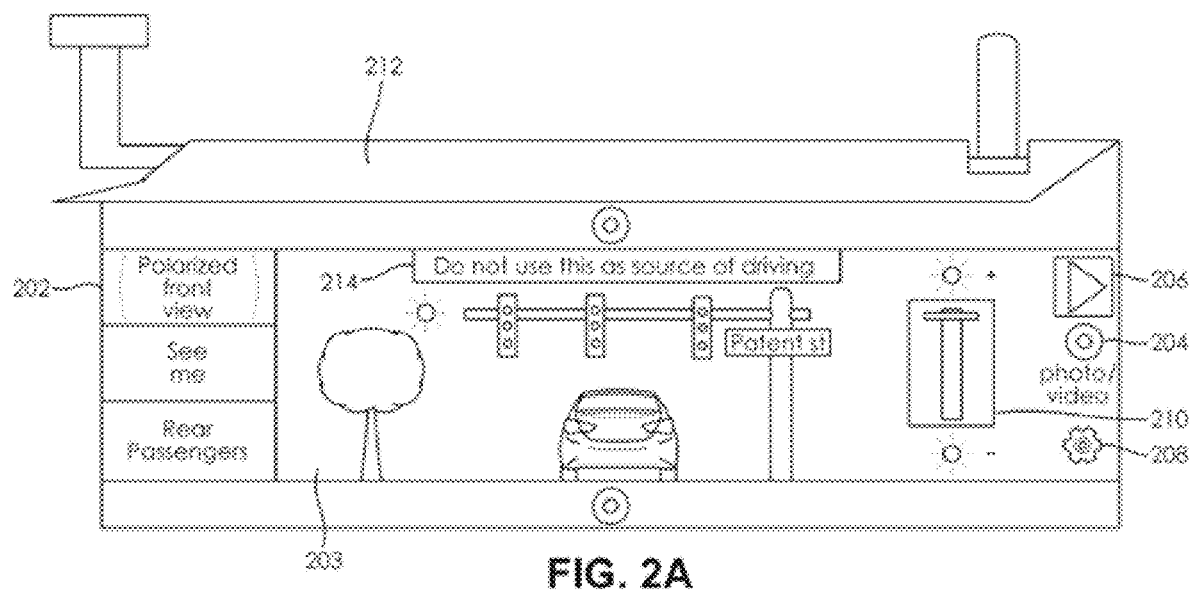
FIG. 2A is a diagram which illustrates the view displayed when the 'Polarized front view' camera is selected on the sun visor's LCD touch screen. In addition, it also illustrates some of the common functions/features of the sun visor's touch screen display. For example: ability to take and upload photos/videos of any camera views using 'Take Photo/Video' button, ability to review photos/videos of any camera views using 'Review Photos/Videos' button, ability to access general settings using 'Settings' button, ability to reduce bright light on screen using 'Brightness adjuster', ability to close the sun visor using a sun visor's cover, etc.
Figure 5:
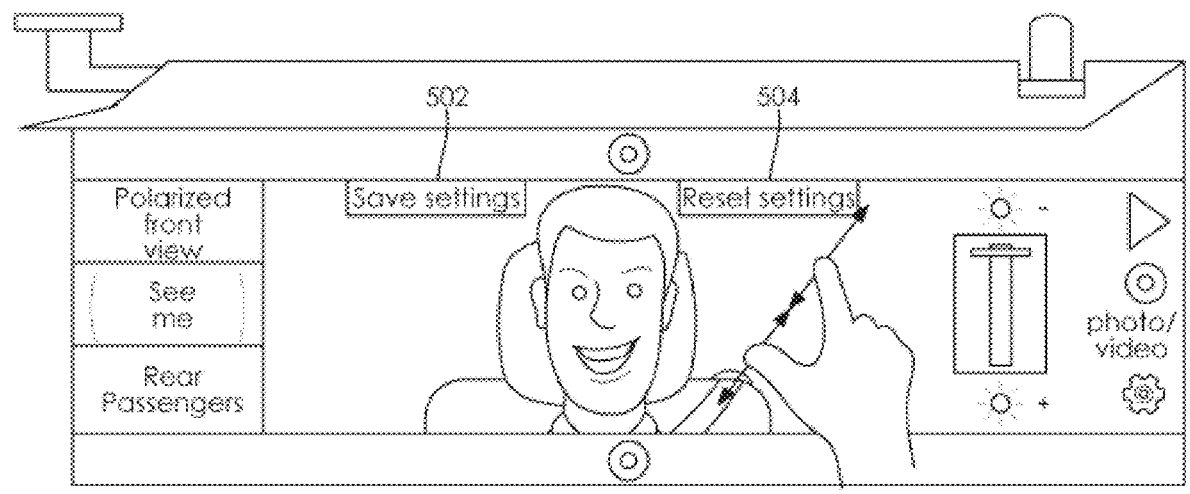
FIG. 5 is a diagram which illustrates the zoom software module. As shown, the software module would allow the user to slide two fingers across the LCD touch screen to zoom in or out of a portion of the currently displayed camera view/image. It also illustrates that if a user touches the sun visor's touch screen display while a camera view is displaying on the screen, then the following two options 'Save settings', 'Reset settings' would automatically appear at the top of the screen for approximately 10 seconds and then those options would disappear after those 10 seconds until the user taps/touches the screen again. (Exception: If there were multiple rear passenger cameras displaying on the sun visor's touch screen for the 'Rear passengers' view, then the 'Save settings' and 'Reset settings' options would be disabled on that screen.) 'Save settings' option would allow the user to save any settings for an individual camera view and those settings would be automatically applied in future whenever the user opens that camera view again. Example of settings that would be saved: brightness, zoom in, zoom out, camera angle for top, left, bottom, right, etc. 'Reset settings' option would allow the user to reset any settings previously stored for an individual camera view back to their original settings. Example of settings that would be reset: brightness, zoom in, zoom out, camera angle for top, left, bottom, right, etc.
Figure 7A:
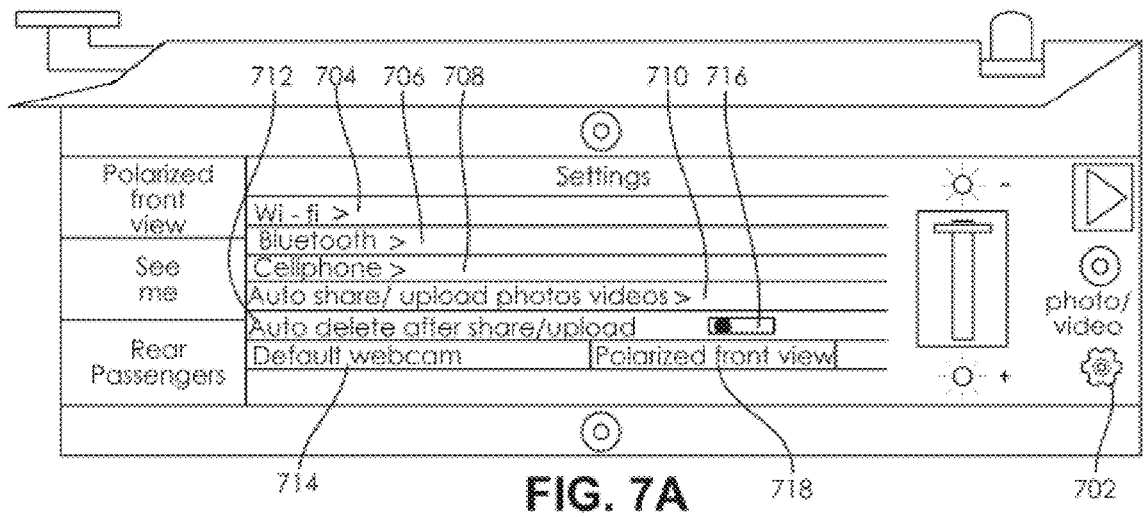
FIG. 7A illustrates an exemplary 'Settings' screen on the sun visor's multi-functional touch screen device. This screen would allow the users to either setup or enable/disable features like Wi-Fi, Bluetooth or Cellular. Also, there would be additional options like 'Auto share/upload photos videos', 'Auto delete after share/upload', 'Default webcam/camera', etc.
Figure 7B:
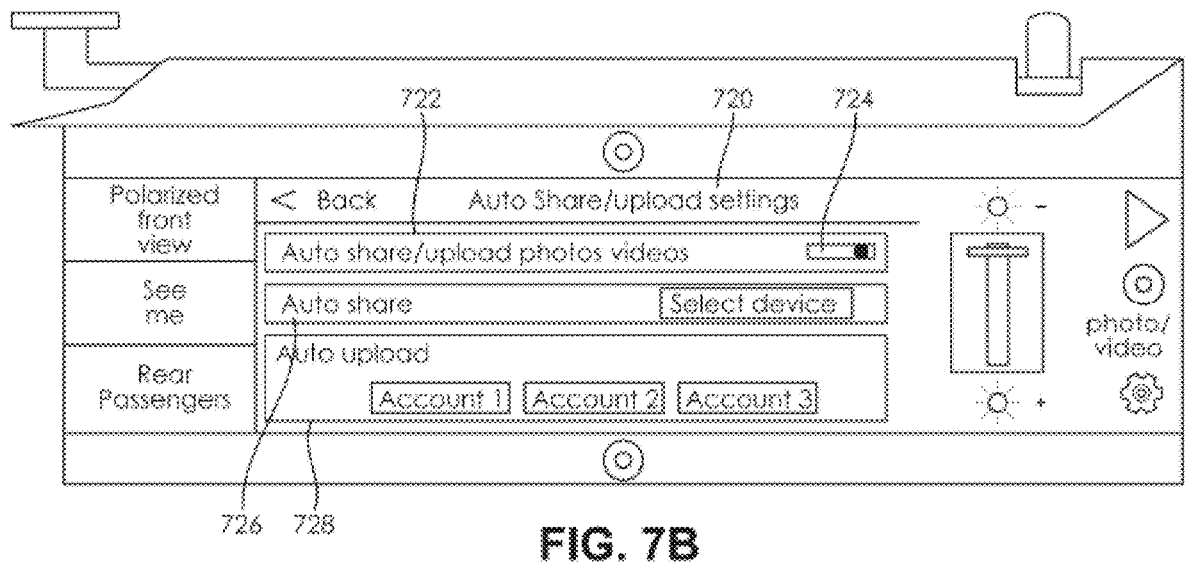
FIG. 7B illustrates an exemplary 'Auto share/upload settings' screen, which is sub-part of the 'Settings' screen on the sun visor's multi-functional touch screen device. This screen would allow the users to either setup 'Auto share' or 'Auto upload' options for photos/videos on the device.
Figure 9:
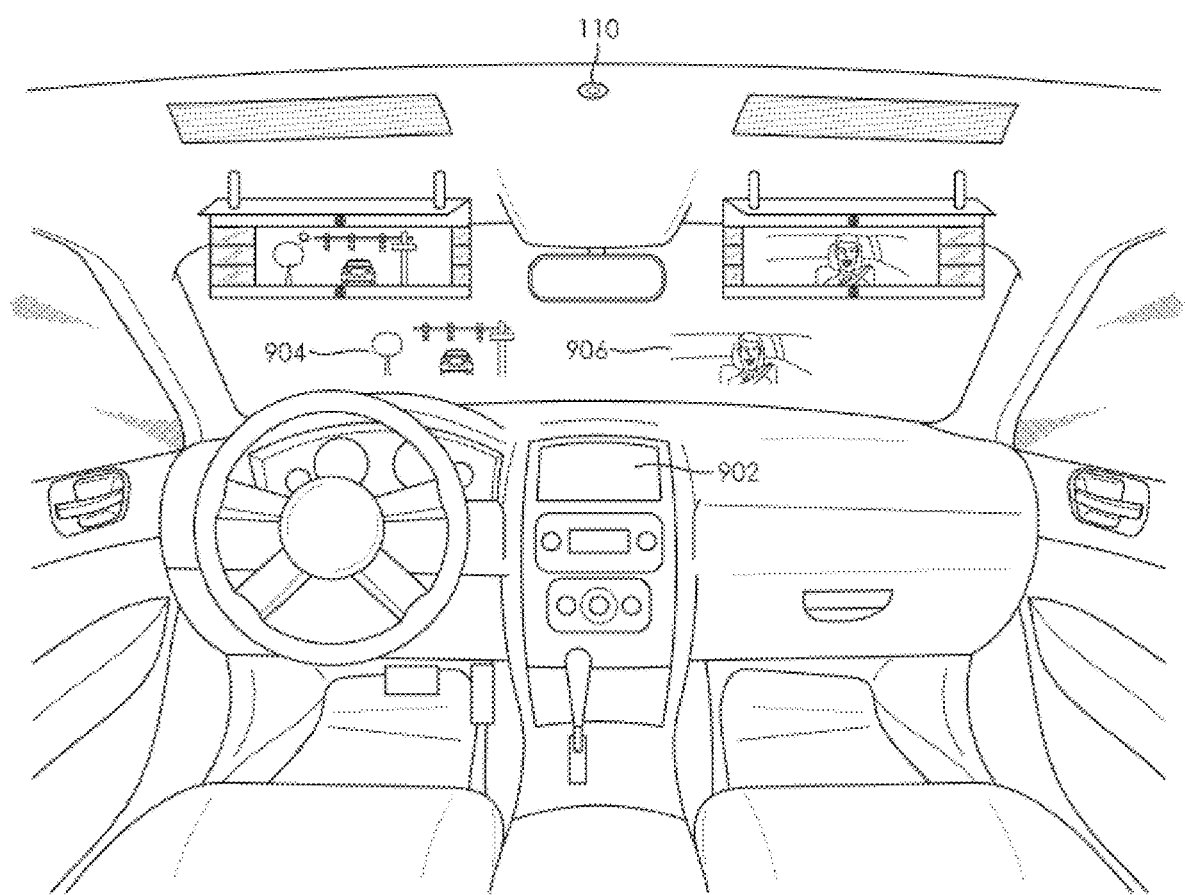
FIG. 9 is a diagram which illustrates the operation of the system in connection to a Head-up Display system installed within the vehicle.

The tablet like LCD touch screen devices 102 and 104 each consist of an LCD touch screen, several built-in cameras, interface to external cameras and a computer communicated to the LCD touch screen. The computer includes software modules stored in a memory therein allowing a user to manipulate controls displayed on the LCD touch screen to direct the operation of the system. As shown in FIG. 1 and FIG. 2A, included in these software modules are programs allowing the user to select which of the camera views to display at any given time, direct a selected camera to capture still images or videos by selecting the "Take Photos/Videos" control 204 displayed on the LCD touch screen, display captured still images or videos by selecting the "Review Photos/Videos" control 206 displayed on the LCD touch screen, adjust settings for each of the cameras by selecting the "Settings" control 208 displayed on the LCD touch screen. In addition, as shown in FIG. 5, included in the software modules are programs allowing the user to save settings for each of the cameras by selecting the "Save Settings" control 502 displayed on the LCD touch screen, reset settings for each of the cameras by selecting the "Reset Settings" control 504 displayed on the LCD touch screen, zoom in or out of a portion of the currently displayed camera view by sliding two fingers away from each other (to zoom-in) or toward each other (to zoom-out) on the desired portion of the view displayed on the LCD touch screen as shown in FIG. 5. In addition, as shown in FIG. 7A and FIG. 7B, software modules also include programs that allow the user to automatically upload or share still images and/or video captured by each camera to an online account or a Bluetooth enabled device by activating the "auto upload/share" function. In addition, as shown in FIG. 9, for vehicles equipped with heads-up display systems 904, 906, the computer would include software modules enabling the computer to display the selected camera view on the head-up display (HUD) system 904, 906, thereby minimizing distractions for the driver. In such a vehicle, the computer includes software modules that direct the sun visor's LCD screen to shut down after a specified number of seconds while the HUD system 902 is activated, enable the user to direct the computer to turn the LCD screen back on after it is shut down due to activation of the HUD system 902 by tapping the sun visor's LCD screen, and allow simultaneous operation of the sun visor's LCD screen and the HUD system by pressing continuously on the sun visor's LCD screen for a specific number of seconds.

According to an embodiment of the present invention, the system provides a graphical user interface (GUI) which allows the user to interact with and control the system through a touch screen interface. The GUI includes a selection region on the left side of the display with three software buttons for switching between the different views, including a front view, a rear passenger view, and a "see me" view, which uses the "see me" camera to simulate a mirror. If more cameras are included or interfaced with the sun visor system, a button will be present in the GUI for switching the view corresponding to that camera. One or ordinary skill in the art would recognize that any number of buttons could be used without departing from the spirit and scope of the present invention. On the right side is a user action region containing action areas for capturing images and videos, viewing captured images and videos, accessing system settings, and adjusting brightness. In the center of the display area of the display apparatus, between the view selection region and the user action region, is the image viewing area. The image viewing area displays the camera feed from any one or more of the available cameras, captured images, or other user control and settings interfaces. Throughout this specification the term image or images may refer to still images, video images, recorded images, or live images.

According to an embodiment of the present invention, the system automatically transfers captured images and/or videos to another location over a wireless connection. The other location may be a central server providing a data storage or transmission service, a cellphone, tablet, another automotive visualization system in a nearby vehicle, or any other wireless device within communication range of the system. The wireless connection may be Bluetooth, 802.11 Wi-Fi, cellular, LTE, or other wireless communication technologies. One or ordinary skill in the art would recognize that any wireless communication technology may be used to transfer captured images and/or videos without departing from the spirit and scope of the present invention.

As shown in FIG. 1, the preferred embodiment of the invention would include multiple set of cameras each displaying a specific camera view. By selecting the corresponding control displayed on the LCD touch screen on the tablet like device, the user directs the computer to display still images and/or video images from the selected camera onto the sun visor's LCD touch screen. FIG. 2A depicts the view 203 displayed when the "polarized front view" control 202 is selected by the user, and in FIG. 2B, the polarized front view camera 216 is shown how it's visible from the front of the vehicle. For this application, "polarized front view" refers to a view of the vehicle environment located in front of the vehicle and including traffic lights, street signs, and traffic ahead of the vehicle, which would typically be blocked when a conventional sun visor is in use. This camera has a lens that is both auto polarized and auto photochromic, and there would also be software modules on computer that can apply polarization and photochromic effects on the camera view. In the preferred embodiment, the "polarized front view camera" 108 is placed near the bottom-center of the sun visor's tablet like device as shown in FIG. 1.

According to an embodiment of the present invention, polarization and/or photochromic effects may be used to remove glare from the image captured by the camera. Software may be used to apply polarization or photochromic effects to remove glare produced by bright light sources in view of the camera. Other software methods, such as local dimming, or software-implemented photographic filters may be used to reduce glare. One or ordinary skill in the art would recognize that any software method that reduces glare may be used to reduce glare without departing from the spirit and scope of the present invention. One of ordinary skill in the art would recognize that the camera features of polarization and photochromic effects could be applied to any camera described herein without departing from the spirit and scope of the present invention.

According to an embodiment of the present invention, a camera is installed in the back face of the sun visor which points toward the outside of the vehicle when the sun visor is deployed. Deploying the sun visor consists of moving the sun visor from an inactive position to an active position, or a stowed position to an un-stowed position, or a folded position to an unfolded position. Although this position might not face the front of the vehicle when the sun visor is not in use, the camera placed in the back of the sun visor would move into a position that faces the front of the vehicle whenever the sun visor is deployed. Alternatively the camera may be installed behind the rear view mirror, at the top of the windshield, outside the vehicle, or in the back side of the device's display, pointing through the sun visor toward the front of the vehicle. One or ordinary skill in the art would recognize that a camera could be installed in any position that faces the front of the vehicle, even if it only faces the front of the vehicle at certain times.

According to an embodiment of the present invention, when the camera is installed in the back face of the sun visor such that it moves into a position that faces the toward front of the vehicle when the sun visor is deployed, a switching mechanism may be used to switch on the camera and/or the display when the sun visor is deployed. The switching mechanism, may be a mechanical button, a software button, an optical sensor, a magnetic switch, a capacitive sensor or any kind of sensor or switch capable of sending a signal or opening or closing a circuit when the sun visor is deployed. One or ordinary skill in the art would recognize that any kind of switching mechanism could be used without departing from the spirit and scope of the present invention. The switching mechanism may be positioned on the dashboard, on the steering wheel, incorporated into the vehicle's computer user interface, placed in the ceiling, or built into the sun visor hinge. One or ordinary skill in the art would recognize that the switching mechanism could be placed anywhere without departing from the spirit and scope of the present invention.

According to an embodiment of the present invention, the switching mechanism may also be used to activate the rear camera view or see-me camera view. For the see-me camera in particular, the switching mechanism may be incorporated into a cover or flap that covers the display, such as the cover or flap that covers the mirror on a traditional sun visor. One of ordinary skill in the art would recognize that the switching mechanism, wherever it is placed, may be used to activate any of the camera views available in the sun visor system without departing from the spirit and scope of the present invention.

According to an embodiment of the present invention, the LCD touch screen may be substituted with any kind of display apparatus. This may be an OLED screen, a plasma screen, an E-ink display, a Head Up Display, or any other kind of display. One or ordinary skill in the art would recognize that any display apparatus may be used without departing from the spirit and scope of the present invention.

Figure 3:
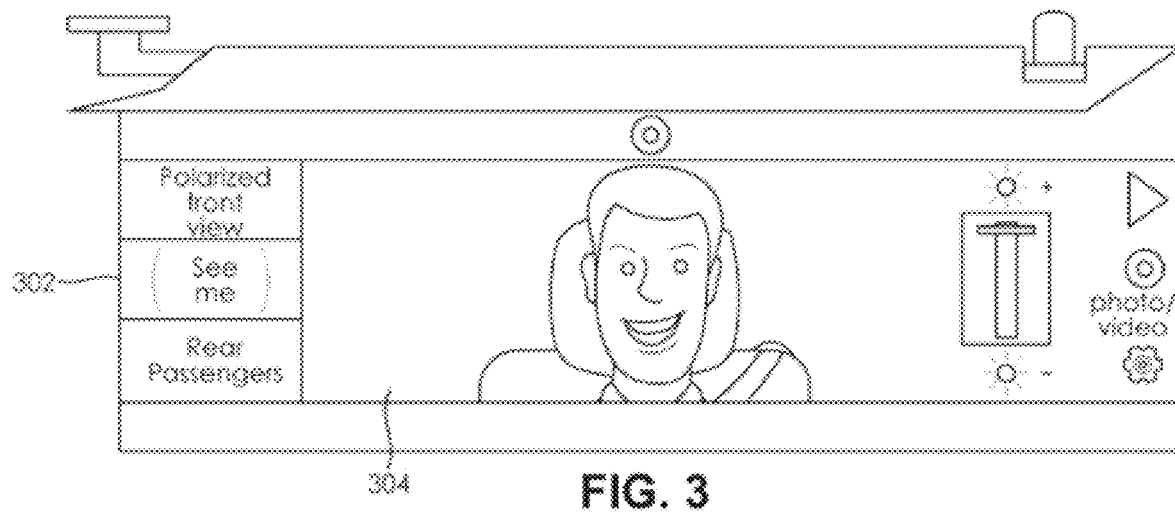
FIG. 3 is a diagram which illustrates the view captured when the 'See me view' camera is selected on the sun visor's LCD touch screen. This 'See me' camera would be displayed on the screen when a user taps on the 'See me' button that's available on the left side of the sun visor's touch screen display.

FIG. 3 depicts the view 304 displayed when the "see me view" control 302 is selected. For this application, "see me view" refers to a view of the front-seated driver or the passenger, who is directly sitting in front of that camera. In the preferred embodiment, this "see me camera" 106 is placed near the top-center of the sun visor's tablet like device as depicted in FIG. 1.

Figure 4A:
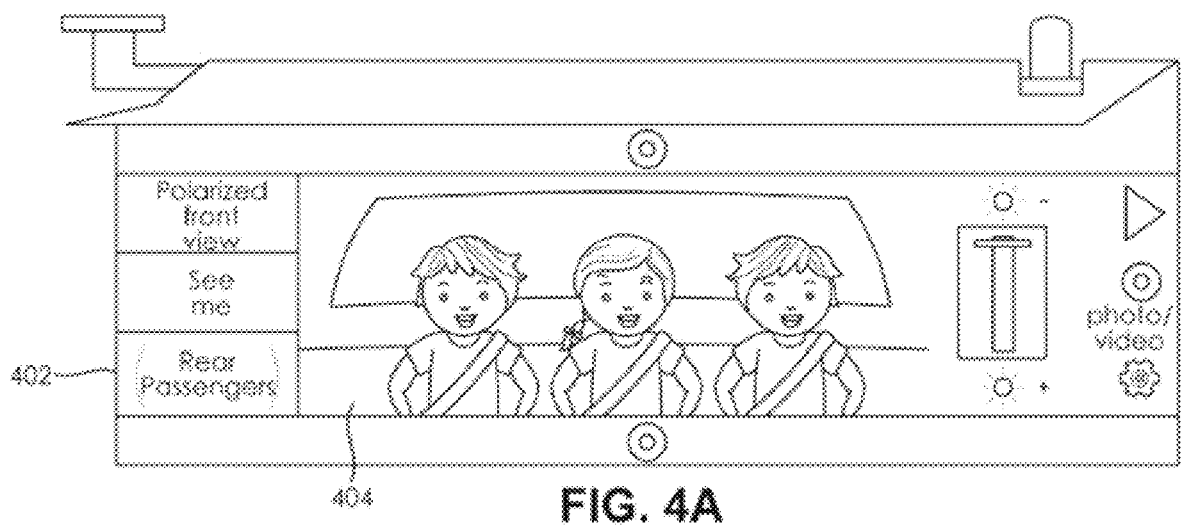
FIG. 4A is a diagram which illustrates the view captured by a single 'Rear passengers' camera when the "rear passenger view" camera is selected on the sun visor's LCD touch screen.
Figure 4B:
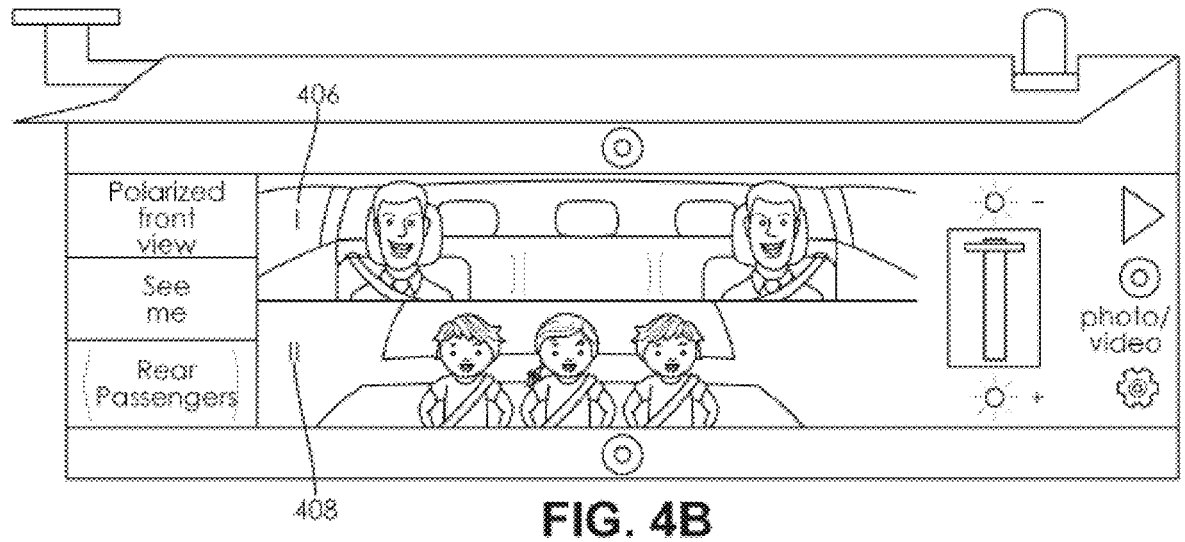
FIG. 4B is a diagram which illustrates the view captured when 'Rear passengers' camera is selected on the sun visor's LCD touch screen where there are multiple 'rear passenger view' cameras installed in the vehicle. This figure shows that since there are multiple rear passenger cameras installed in the vehicle for displaying either single rear passenger row or multiple rear passenger rows, therefore, the main screen would be automatically split (either vertically and/or horizontally) on the 'Rear Passengers' camera view and would display all the 'Rear passengers' cameras. (Note: If the user wants to enlarge one of the rear passenger cameras, then they would be able to double tap on that camera view on the touch screen display to enlarge it. However, if the user wants to restore an already enlarged rear passenger camera, then they would be able to double tap on that camera view on the touch screen display to restore it again i.e. all rear passenger cameras would be visible again on the screen.)

FIGS. 4A and 4B depict the view 404 displayed when the "rear passenger view" control 402 is selected. For this application, "rear passenger view" refers to a view of any of the rear-seated passengers. In the preferred embodiment, this "rear passengers" camera is placed on the ceiling/roof of the vehicle. As shown in FIG. 4B, the preferred embodiment includes multiple "rear passenger views" 406, 408, displaying that the system is capable of showing an additional row of rear seated passengers where the vehicle has more than one row of rear seated passengers.

FIG. 5 shows a user operating the zoom function. The software module would allow a user to use two fingers to zoom in or out on a portion of the sun visor's LCD screen.

Figure 6:
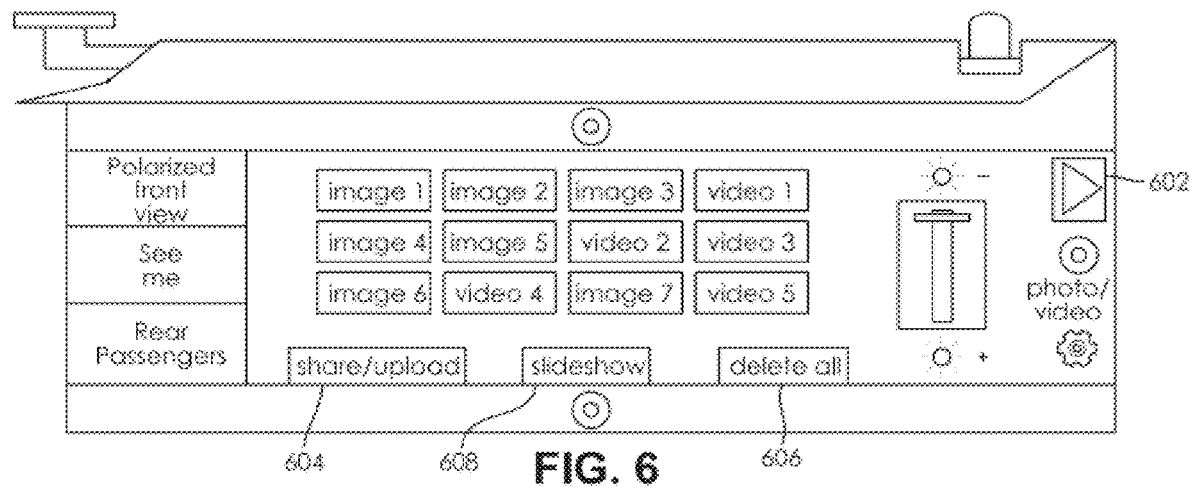
FIG. 6 is a diagram which illustrates the display presented on the LCD screen when the 'Review Photos/Videos' control is selected on the sun visor's LCD touch screen. This screen would allow the users to view any photos or videos that were previously taken by that device. Also, there would be options available on this screen to either view photos/videos in a slideshow, ability to delete all photos/videos or manually share/upload individual photos/videos.

FIG. 6 illustrates the preferred embodiment of the "Review Photos/Videos" module 602. A user would be able to view stored images in a slide show by selecting the slideshow control 608, share/upload content using the "share/upload control 604, and delete all stored content using the delete all control 606.

Here are the common features that would be available on the sun visor's touch LCD screen device regardless of which camera view is displayed on the screen—

As shown in FIG. 2A, FIG. 3, and FIG. 4A, there would be buttons available on the left side of the touch screen display ('Polarized Front View' 202, 'See me' 302, 'Rear passengers' 402) to go to any of the camera views. (Note: There can also be additional camera views that can be integrated or interfaced with the sun visor's LCD touch screen device and displayed on it. For example: 'Rear polarized view' camera can also be displayed on the sun visor's LCD touch screen, so when the vehicle is being reversed, it would display the rear view of the vehicle on the sun visor's LCD touch screen, and that view would also be auto polarized and auto photochromic.)

As shown in FIG. 5, on the sun visor's touch screen display, a user would be allowed to touch and move the camera view up, down, right, left, or even zoom in or zoom out based on their needs. (Exception: If the same rear passenger camera is connected to all the sun visors, then when both the driver and the front passenger have 'Rear passengers' camera up on their touch screen display, then only the first person that opened the 'Rear passengers' camera would be allowed to move the camera view up, down, right, left, or even zoom in or zoom out on their sun visor's touch screen display. In this case, a note would be displayed to the second person that they don't have permission to move the 'Rear passengers' camera because it's already open on the other sun visor's touch screen display, but they would at least be able to see the camera view that the first person was already watching. For example: If the driver had already opened one of the rear passenger cameras on their sun visor's touch screen display, and thereafter, the front passenger also tries to bring up that same rear passenger camera on their sun visor's touch screen display, then the latter would still be able to view the camera, however, all the options to move, zoom, etc. would be disabled for the latter until the person that opened the rear passenger camera first closes it on their display). Note: To begin with, if there were separate rear passenger cameras attached to each sun visor, then the rear passenger view functionality can also be independent on each sun visor like the other camera views. In fact, the same concept would apply to any cameras that are connected to the sun visor's LCD touch screen.

As shown in FIG. 2A, on the sun visor's touch screen display, a user would have the ability to adjust the brightness of the screen using a brightness adjuster 210, so they can avoid being distracted with bright light while driving. Note: The brightness adjuster would have a transparent background on the sun visor's touch screen display for any of the camera views.

As shown in FIG. 5, if a user touches the sun visor's touch screen display while a camera view is displaying on screen, then the following two options 'Save settings' 502, 'Reset settings' 504 would automatically appear at the top of the screen for a set amount of time, for example 10 seconds, and then those options would disappear after that time until the user taps/touches the screen again. (Exception: If there are multiple rear passenger cameras displaying on the sun visor's touch screen for the 'Rear passengers' view, then the 'Save settings' and 'Reset settings' options would be disabled on that screen. Note: only when a user enlarges one of the rear passenger cameras by double tapping on it, then the 'Save settings' and 'Reset settings' options would be re-enabled on the screen.) 'Save settings' option would allow the user to save any settings for an individual camera view and those settings would be automatically applied in future whenever the user opens that camera view again. Some example of settings that would be saved include: brightness, zoom in, zoom out, camera angle for top, left, bottom, right, etc. 'Reset settings' option would allow the user to reset any settings previously stored for an individual camera view back to their original settings. Some example of settings that would be reset include: brightness, zoom in, zoom out, camera angle for top, left, bottom, right, etc. Note: This functionality to save or reset the camera view settings can also be easily extended to multiple users if more than one person were planning to use the vehicle.

As shown in FIG. 2A, 'Take Photo/Video' option 204 would be available on the sun visor's touch screen display, which would allow the users to take photos or videos of either of the camera views displayed on the sun visor's LCD touch screen.

User would be allowed to select if they wish to take a photo or a video for the displayed camera view. When 'Photo' option is selected that's next to 'Take Photo/Video' control, it would allow the user to take photo of the camera view that's visible on the touch screen display by simply tapping once on the round circle above the 'Photo' button. When 'Video' option is selected that's next to 'Take Photo/Video' control, it would allow the user to take video of the camera view that's visible on the touch screen display by simply tapping once on the round circle above 'Video' button, which would start recording, and then another tap on the round circle above 'Video' button would stop recording.

There would be built-in memory on the sun visor's touch screen device (For example: 64 GB), which would allow to locally store photos and videos taken by that device.

As shown in FIG. 2A and FIG. 6, 'Review Photos/Videos' option 206, 602 would be available on the sun visor's touch screen display, which would allow the users to view any photos or videos that were previously taken by that device. Note: some examples of the options available on the 'Review Photos/Videos' screen would include an option to view photos/videos in a slideshow 608, ability to delete all photos/videos 606, manually share/upload individual photos/videos 604, etc. While reviewing the individual photos/videos on the 'Review Photos/Videos' screen, a user would be able to use Bluetooth, cellular or Wi-Fi features to either manually share the photos/videos to another device or upload them to central online location. Note: using the Bluetooth feature, a user would also have the ability to manually share photos/videos from one sun visor's touch screen device to another sun visor's touch screen device. In fact, even vehicles standing/driving close to each other would be able to connect with each other using Bluetooth, etc. and share photos/videos and display those on their sun visor's LCD touch screen.

As shown in FIG. 2A, a sun visor's touch screen display would automatically turn on when the sun visor cover 212 is pulled up/opened, and on the other hand, the sun visor's touch screen display would automatically turn off when the sun visor cover 212 is pulled down/closed.

Figure 8:
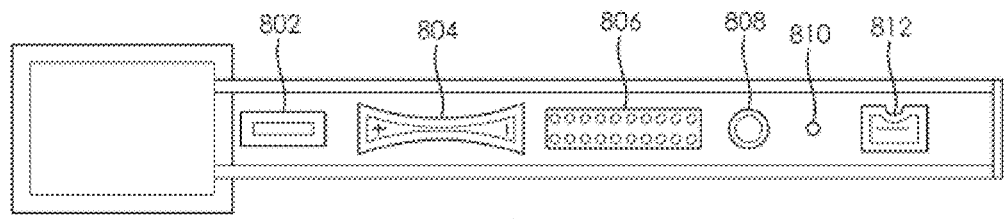
FIG. 8 illustrates an exemplary side view of the sun visor's multi-functional touch screen device. The following options would be available on the side view—an on/off switch to either turn on or turn off the touch screen display, a speaker for playback of stored videos, a volume control to increase or decrease the volume for playback of any stored videos, a headphone jack for individual listening to audio of any stored videos, a microphone for recording of audio while taking videos, and an Audio/video out/Digital terminal that would allow the user to connect to a computer using a USB data cable and transfer photos/videos stored on the sun visor's LCD touch screen device. Note: The above mentioned features on the side of the sun visor's LCD touch screen device are just for exemplary purposes, however, as technology advances in future, additional ports and/or options can be added to this LCD touch screen device to enhance the use of these devices.

As shown in FIG. 8, there would be an on/off switch 802 to either turn on or turn off the sun visor's LCD touch screen display.

As shown in FIG. 8, there would be a volume control 804 to increase or decrease the volume for any videos playing on the sun visor's LCD touch screen display.

As shown in FIG. 8, there would be a speaker 806 to listen to the audio of any videos on the sun visor's LCD touch screen display.

As shown in FIG. 8, there would be a headphone jack 808 for individual listening to audio of any videos on the sun visor's LCD touch screen display.

As shown in FIG. 8, there would be a microphone 810 to record the audio along with the videos on the sun visor's LCD touch screen display.

As shown in FIG. 8, there would be Audio/video out/Digital terminal 812 that would allow the user to connect to another computer device using a USB data cable or other transfer means. Once the sun visor's touch screen device and the other computer are connected, a user would be able to transfer any photos/videos from sun visor's touch screen device to that computer. (Note: It would be possible for a user to detach the entire sun visor or the sun visor's touch screen device from the vehicle and transfer any photos/videos from that sun visor's touch screen device to another computer using a USB connection or other available transfer means.)

Figure 10:
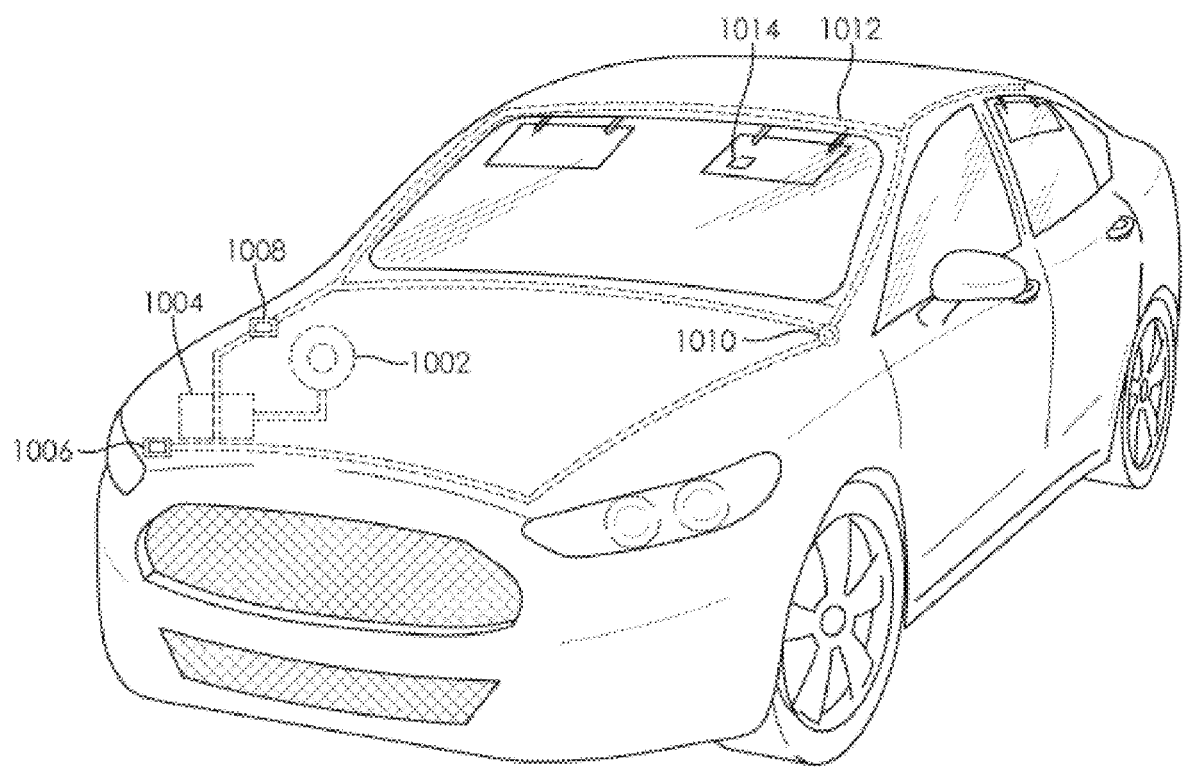
FIG. 10 is a diagram of the power connection from the sun visor device into the vehicle's power system.

As shown in FIG. 10, the charging system for the sun visor device would mainly include the vehicle's alternator 1002, voltage regulator 1006, the vehicle battery 1004, a battery fuse 1008, a built-in rechargeable battery 1014 on the sun visor device itself, and the associated wiring and its harness 1010.

While the vehicle's engine is running and the sun visor device is connected to the sun visor hinge system 1012, the vehicle's alternator 1002 would supply the necessary power to the sun visor device. However, if the capacity of the alternator 1002 is exceeded, then the vehicle's battery 1004 would supply the necessary power to the sun visor device, even though the vehicle's engine might be running. In this case, it would be indicated to the user that the vehicle's battery 1004 is being utilized to supply the power to the sun visor device.

If the vehicle's engine isn't running, however, the sun visor device is connected to the sun visor hinge system 1012, then the vehicle's battery 1004 would supply the necessary power to the sun visor device. Note: it would also be indicated to the user that the vehicle's battery 1004 is being utilized to supply the power to the sun visor device. However, if the vehicle's battery 1004 is about to fully drain out i.e. no more capacity, then rather than using the vehicle's battery 1004, the sun visor device would use its built-in rechargeable battery 1014 even though the sun visor device is connected to the sun visor hinge system. In this case, it would be indicated to the user that the rechargeable battery 1014 on the sun visor device itself is being utilized to supply the power to the sun visor device.

If the sun visor device is no longer connected to the sun visor hinge system 1012, then regardless if the vehicle's engine is running or not, the rechargeable batteries 1014 within the sun visor device would supply the necessary power to the sun visor device. In addition, it would be indicated to the user that the rechargeable battery 1014 on the sun visor device itself is being utilized to supply the power to the sun visor device.

According to an embodiment of the present invention, any power that's supplied to the sun visor device system would pass through the voltage regular 1006 to control the amount of voltage passed through. Similarly, there would also be a battery fuse 1008 to protect over current being passed through. Note: It is to be clearly understood that any other mechanisms to control the amount of voltage or current that's passed through to the sun visor device system would be within the scope and spirit of the invention. According to an embodiment of the present invention, the wiring 1010 from the alternator and the battery would run parallel through the sides of the engine, and then from the space available between the vehicle's side mirror and the front windshield over to the dashboard of the vehicle, which would be further extended to supply the power to the sun visor hinge system 1012 on the ceiling of the vehicle. Similarly, the associated wiring can also be extended to the rear seat sun visors, if present. Note: It is to be clearly understood that there are many different ways to run the wiring from the alternator and the battery to the sun visor device in a vehicle, and that's within the scope and spirit of the invention.

According to an embodiment of the present invention, wiring 1010 from the vehicle's alternator 1002 or the battery 1004 can also be extended to the sun visor device's switching on/off mechanism or the HUD system that's interfaced with the sun visor device system.

According to an embodiment of the present invention, the power from the vehicle's alternator 1002 or the battery 1004 would be sent to one side of the sun visor hinge system 1012 to charge the sun visor device when connected i.e. both sides/hooks of the sun visor hinge system would not need to be have the power coming in and this would allow the user to snap out the sun visor from one side of the sun visor hinge system and turn the sun visor towards the side window and still continue to get the sun visor device to keep charging. Note: It is to be clearly understood that there are many different ways to either charge the rechargeable batteries within the sun visor device or directly supply electricity or power to the sun visor device such as supplying power using both sun visor hinges or using one sun visor hinge, wireless charging, solar charging, etc., and all those would be considered within the spirit and scope of the present invention.

One of the principles that can be used to wirelessly charge the sun visor device is the principle of magnetic resonance or inductive power transfer (IPT), wherein an electrical current can be passed from the charging unit to the sun visor device through the use of a loop of coiled wires around a bar magnet to induce an electromagnetic field, which can then be used to wirelessly transfer a charge. One or ordinary skill in the art would recognize that any other principle that can enable wireless charging of the sun visor device would also be considered within the spirit and scope of the present invention.

Figure 18:
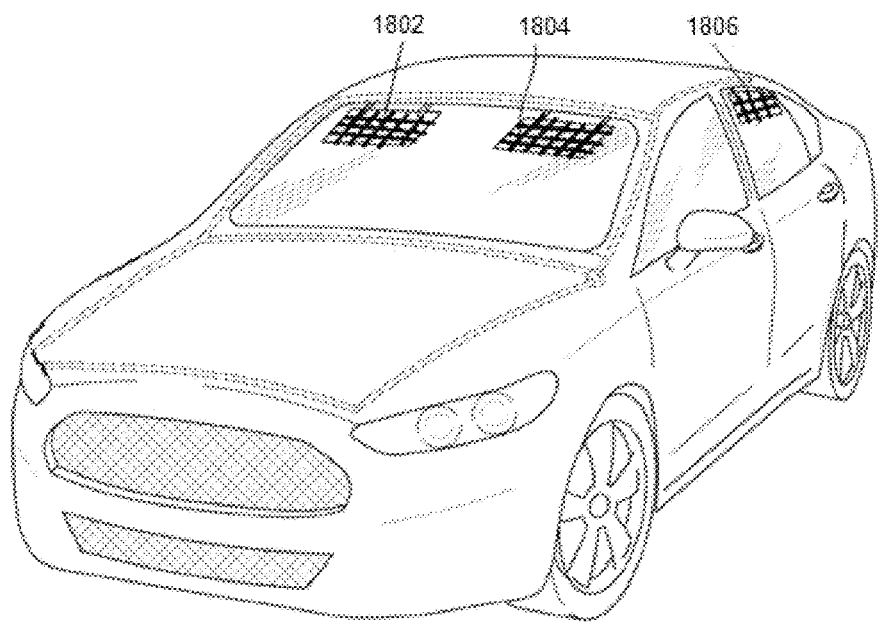
FIG. 18 illustrates an exemplary panel of solar cells at the back of sun visors available in the vehicle, which can help to charge the sun visor system using solar charging.

According to an embodiment of the present invention, as shown in FIG. 18, a panel or series of solar cells 1802, 1804, 1806 can be installed at the back of the sun visor device or the sun visor itself such that whenever the sun visor is deployed or pulled down, the solar cells 1802, 1804, 1806 on the back would face the outside of the vehicle, and if sun was present, then they would generate electricity or power that can be used by the sun visor device. Such power generated by solar cells can be directly used or stored in a connected battery bank for later use, and the amount of power stored or drawn from the battery bank can be controlled using a charge controller that's present either in a stand-alone device or integrated within the battery bank itself. A voltage regulator would also be included in the charging circuit so the sun visor device doesn't get over voltage or over charged. One or ordinary skill in the art would recognize that the solar panel to generate solar power can also be located in other parts of the vehicle, which can supply the power to the sun visor device, and that would still be considered within the spirit and scope of the present invention. In addition, one or ordinary skill in the art would recognize that any other ways that can enable solar charging of the sun visor device would also be considered within the spirit and scope of the present invention.

According to an embodiment of the present invention, the sun visor device receives power from the electrical system of the vehicle. This power may be passed from the vehicle to the sun visor device in a variety of ways. In one embodiment, a primary inductive charging coil is embedded in the ceiling of the vehicle and a secondary inductive charging coil is embedded in either the sun visor or the housing of the sun visor device itself. When the sun visor is stowed, the secondary charging coil comes into proximity with the magnetic field generated by the primary charging coil and produces an electric current that is used to charge the sun visor device. In this particular embodiment, deploying the sun visor disconnects the sun visor device from the inductive power source and it runs on the internal rechargeable battery.

According to another embodiment of the present invention, a flexible ribbon cable passes from the vehicle interior through the housing of the sun visor hinge to provide power and data connection to the sun visor device. In yet another embodiment, electrical leads are built into the hinge system with rotatable contacts on the vehicle interior end of the hinge and the sun visor end of the hinge. These contacts allow the hinge to be repositioned in the stowed or deployed position while still providing power through the hinge to the sun visor device. One or ordinary skill in the art would recognize that power may be provided to the sun visor device through any means without departing from the spirit and scope of the present invention.

Here are some additional details about the 'Polarized front view' camera, which can be activated though the sun visor's touch screen display—

Figure 2B:
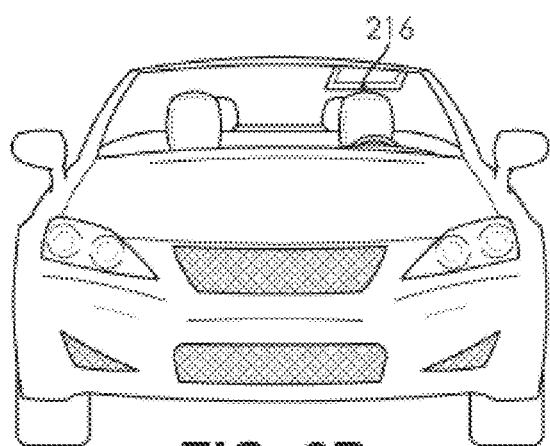
FIG. 2B is a diagram which shows the 'polarized front view' camera on the sun visor's touch screen display from outside the vehicle. As shown, this camera would be externally facing and therefore visible from in front of the vehicle.

As shown in FIG. 1, FIG. 2A and FIG. 2B, for exemplary purposes, 'Polarized front view' camera 108 is located near the bottom-center of the sun visor's touch screen device. Note: this 'Polarized front view' camera would actually be facing towards the front of the vehicle i.e. external view. Therefore, if the sun visor was pulled down and a user went outside the vehicle and looked, then they would still be able to see 'Polarized front view' camera 216 near the bottom-center on the back side of the sun visor's touch screen device.

As shown in FIG. 2A, by default the intent of this camera would be to display on the main screen 203 the traffic lights, information boards, street names, etc., which are usually higher up on the road and aren't usually visible when a traditional sun visor is pulled down. Note: By being able to view the above mentioned information on the sun visor's touch screen display, a user wouldn't have to look from the sides of their sun visor to get that information.

This 'Polarized front view' camera would have lens that has both auto polarization and auto photochromic effect and also there would be software modules, which would help to automatically reduce glare and also darken/lighten the view depending upon the outside light. For example: Even if the sun was right in front of the vehicle, then also a user would still be able to look at the external things like traffic light, street names, etc. using the 'Polarized front view' camera. In addition, even during night time, a user would still be able to get external information using the 'Polarized front view' camera. Note: Since most of the windshields have ultraviolet protection built in them, the photochromic effect mentioned above would even take place in the visible light that's without the ultraviolet rays.

As shown in FIG. 2A, this 'Polarized front view' would be the default camera view when the sun visor's touch screen display is turned on. In addition, the 'Polarized front view' button 202 on the left side of the touch screen display would be highlighted on the screen. (Note: As shown in FIG. 7A, a user would have the ability to change the screen's default camera 714, 718 by going to the 'Settings' screen available on the sun visor's touch screen display.)

Note: As shown in FIG. 2A, for safety purposes, sun visor that's in front of the driver of the vehicle would display the following disclaimer whenever the 'Polarized front view' camera is activated on the sun visor's LCD touch screen— "Do not use this view as your source of driving" 214 (Note: Any other multi-functional sun visors present in the vehicle, except the driver's sun visor, wouldn't display the above mentioned disclaimer message since those users aren't driving.)

Here are some additional details about the 'See me' camera view, which can be activated though the sun visor's touch screen display—

As shown in FIG. 1 and FIG. 3, for exemplary purposes, 'See me' camera 106 is located near the top-center of the sun visor's touch screen device.

Note: This 'See me' camera can be placed at an angle, so by default its intent would be to display maximum view/body of the person, who's sitting inside the vehicle in the front of that camera, on the main screen 304 of the sun visor's touch screen display.

As shown in FIG. 3, 'See me' button 302 on the left side of the touch screen display would be highlighted when this 'See me' camera view is displayed on the screen.

Here are some additional details about the 'Rear passengers' camera views, which can also be activated though the sun visor's touch screen display—

As shown in FIG. 1 and FIG. 4A, for exemplary purposes, 'Rear passengers' camera/s 110 would be located near the ceiling/roof of the vehicle. Depending upon the size of the vehicle, either one or two cameras would be installed for each rear passenger row, and if the vehicle has more than two rows of seating, then additional cameras would also be added for each additional row of rear passengers. These one or multiple rear passenger cameras would together create the view for the 'Rear passengers' camera screen 404 on the sun visor's touch screen display.

a. For example: As shown in FIG. 4A, if only one camera is present for displaying the rear passenger row in the vehicle, then only that camera would be displayed when 'Rear Passengers' view is opened. However, as shown in FIG. 4B, if there were multiple cameras present for displaying either single rear passenger row or multiple rear passenger rows, then the screen would be split (either vertically and/or horizontally) on the 'Rear Passengers' camera view and would display all the rear passenger cameras 406, 408 on the screen. If the user wants to enlarge one of the rear passenger cameras, then they would be able to double tap on that camera view on the touch screen display to enlarge it. However, if the user wants to restore an already enlarged rear passenger camera, then they would be able to double tap on that camera view on the touch screen display to restore it again i.e. all rear passenger cameras would be visible again on the screen.

Note: These rear passenger cameras 110 can be placed at an angle, so by default their intent would be to display the maximum view of the people sitting inside the vehicle on rear passenger seats.

As shown in FIG. 4A, 'Rear passengers' button 402 on the left side of the touch screen display would be highlighted when any of the rear passenger camera view is displayed on the sun visor's LCD touch screen.

Figure 12:
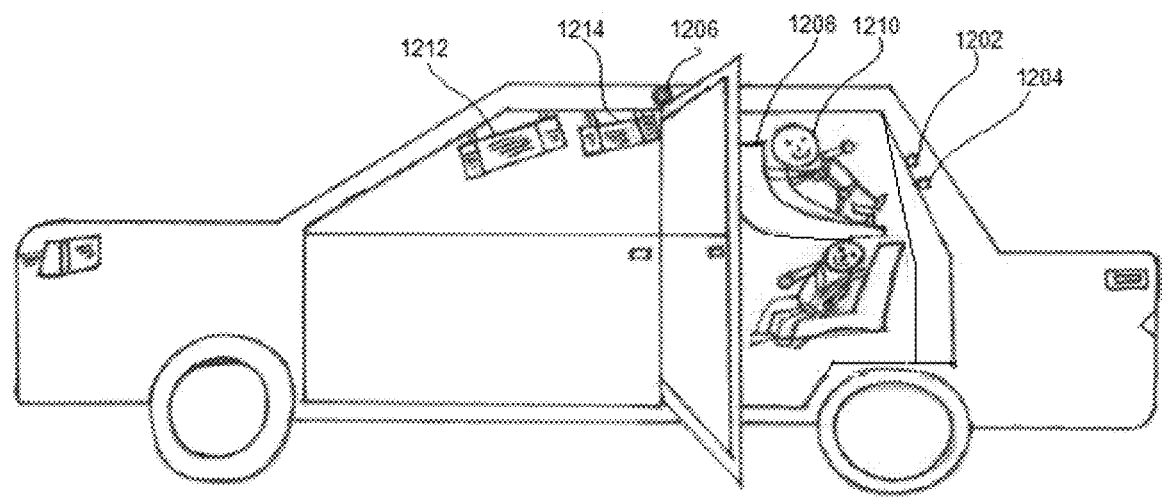
FIG. 12 is a diagram which illustrates how the sun visor system can use the rear seat sensor and the rear seat cameras to detect and capture the rear facing passengers sitting in the rear facing child seat as well as the front facing rear passengers sitting in the rear row of the vehicle.
Figure 13:
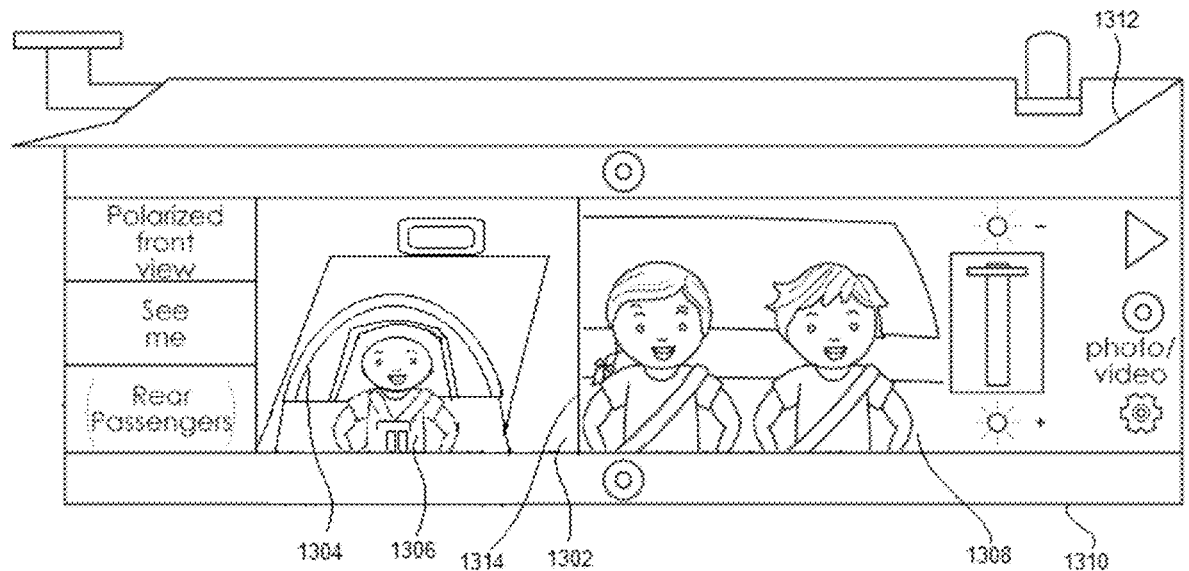
FIG. 13 is a diagram of an exemplary 'Rear passengers' view on the sun visor's LCD screen, which not only shows the image of the child sitting in a rear facing child seat, but at the same time, also shows image of other rear seat passengers that are facing towards the front of the vehicle.

According to an embodiment of the present invention, as shown in FIG. 12 and FIG. 13, if the vehicle has a rear facing child seat installed, then using the rear seat sensor 1202 that's located on the ceiling near the headrest of the rear seat, it would automatically recognize the installed rear facing child seat 1208 and the rear seat passenger 1210 sitting in it, and send instructions via the computer software to the rear facing passenger capturing camera/cameras 1204 to automatically display the image of the child i.e. the image of the rear seat passenger 1306 on the selected one or multiple sun visors' 1212, 1214 'Rear Passengers' view 1302 i.e. monitor baby in the rear facing child seat. Note: Images of any of the remaining front facing rear seat passengers 1308 would also be displayed on the 'Rear Passengers' view 1302 using one or multiple rear passenger cameras 1206. One or ordinary skill in the art would recognize that the rear seat sensor 1202 mentioned above can also try to locate the sitting position or a particular body part (for example: eyes) of the rear seat passenger 1210 to discern if they are front facing or rear facing, and accordingly send the instructions via the computer software to the rear passengers' associated camera/cameras to automatically display those rear facing passengers, for example: child, on the sun visor display, and in addition, display the other rear seat passengers that are already front facing.

According to an embodiment of the present invention, instead of a rear seat sensor 1202 to detect a child sitting in rear facing car seat, the sun visor system can also comprise of an object detection software module, wherein when the users click on 'Rear passengers' button on the sun visor system to see the 'Rear passengers' view on the display screen of the sun visor, then a software module within the sun visor system would automatically try to detect any children sitting in the rear facing car seat on the image captured by the rear passenger cameras. If any children sitting in a rear facing car seat are detected, then the sun visor system would automatically communicate that information to the vehicle computer along with the location of the child's car seat within the vehicle. The vehicle computer would further send the instructions to activate rear facing passenger capturing camera/cameras 1204, which would be located in the vehicle such that they can capture front image of the rear facing children sitting in the rear facing car seats. An example of the location of such rear facing passenger capturing camera can be in the ceiling of the vehicle near the head rest of the rear seat, so it can easily capture front image of the rear facing children. However, one or ordinary skill in the art would recognize that such rear facing passenger capturing cameras can also be located or installed in any other place in the vehicle as long as they can capture front image of the rear facing children, and that would be within the spirit and scope of the present invention. The said rear-facing passenger capturing cameras 1204 would be able to automatically position themselves to capture images of rear facing children sitting in those rear facing car seats and display them on the 'Rear facing child' camera view on the sun visor's display screen, wherein the said display screen on the sun visor can also automatically split in order to show together both the 'Rear passengers' camera view, displaying the regular image of the rear passengers, and the 'Rear facing child' camera view, displaying image of any rear facing children sitting in rear facing car seats. One or ordinary skill in the art would recognize that the said object detection software module of the sun visor system would be able to identify the difference between an empty car seat and the car seat with rear facing children sitting in it, and only when the said car seat with rear facing children sitting in it are identified, then the software module would send the trigger to the vehicle computer to capture image of the rear facing children and show it on the display screen of the sun visor.

Figure 14:
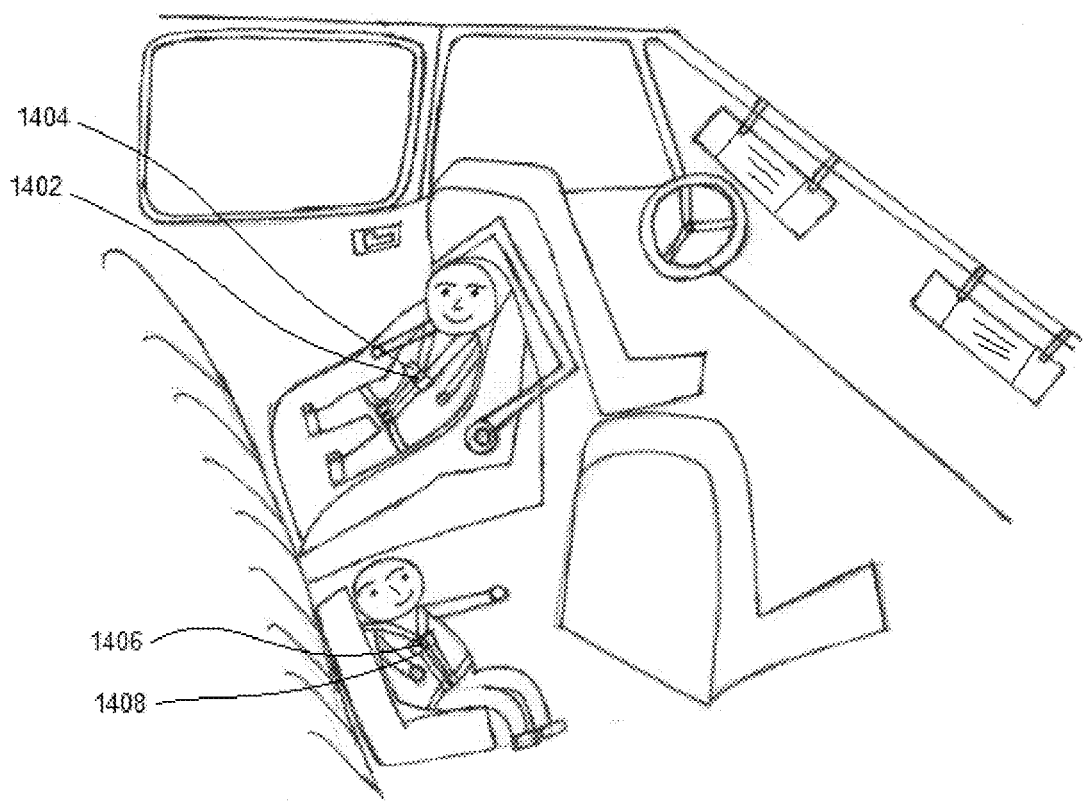
FIG. 14 is a diagram which illustrates an exemplary sensor in the center of the chest clip of the rear facing child car seat and the front facing child car seat, wherein if the chest clip of car seat is buckled, then the sensor gets activated and communicates that information to the vehicle computer, which further instructs the vehicle sun visor to display the 'Child seat' view or the 'Rear passenger' view on its display screen.

According to an embodiment of the present invention, as shown in FIG. 13 and FIG. 14, when the vehicle has a child seat in it, then there can be sensors 1402, 1406 installed in the chest clip 1404, 1408 of the child's car seat (front facing or rear facing car seat), wherein if the chest clip 1404, 1408 is buckled, then the associated sensor 1402, 1406 would communicate that information to the vehicle computer along with that car seat's direction, whether it's front facing or rear facing car seat, as well as the location of the child car seat within the vehicle. The vehicle computer would further send the instructions to the rear passenger camera/cameras so that they can know where the child seats are located in the vehicle and what's their direction, so the cameras can automatically position themselves to capture and display images of both the rear facing passengers 1306 sitting in the car seats and any other front facing passengers 1308 that are sitting in the rear seat of the vehicle in a combined 'Rear passengers' view 1302 on the sun visor's display screen. Note: Instead of the sensors 1402, 1406 installed in the chest clip 1404, 1408 of the child's car seat, the said sensors can also be installed in the lap clip of the child's car seat, and that would be considered within the spirit and scope of the present invention.

Figure 15:
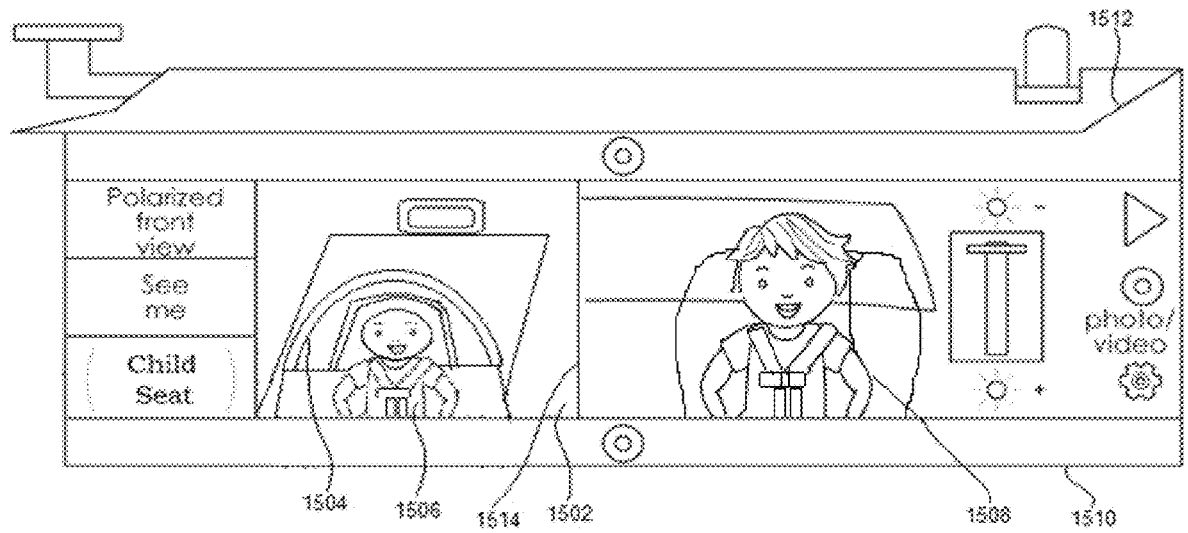
FIG. 15 is a diagram of an exemplary 'Child seat' view on the sun visor's LCD screen, which displays an image of any of the children sitting in either the rear facing child seat or the front facing child seat within the vehicle.

According to an embodiment of the present invention, as shown in FIG. 15, one or ordinary skill in the art would recognize that either when a sensor in the ceiling or the sensor in the chest clip of the car seat or an object detection software module identifies a child sitting in the car seat of the vehicle as well as the direction of the car seat, instead of displaying the 'Rear Passengers' view 1302 on the sun visor's display screen, 'Child seat' camera view 1502, which just displays the images of the children, either rear facing children 1506 sitting in the rear facing child car seat 1504 or the front facing children 1508 sitting in the front facing car seat, can also be automatically displayed on the sun visor's display screen, and that would also be considered within the spirit and scope of the present invention. One or more rear passenger cameras can be used to capture the image of the children sitting in the car seat/seats, either front facing or rear facing, and display them on the sun visor's 'Child seat' camera view 1502. Such 'Child seat' camera view 1502 would allow the users sitting in the front to be able to easily monitor the children sitting in the rear seats. Note: When a user manually deploys or pulls down the sun visor 1510, they will need to open the cover of the sun visor 1512, which would automatically turn on the display screen of the sun visor, and then the users will be able to click on the 'Child seat' button on the left side of the sun visor device to display the 'Child seat' camera view 1502 on the sun visor's display screen.

As shown in FIG. 14, one or ordinary skill in the art would recognize that the sensors installed in the chest clip of the child's car seat would be able to communicate with the vehicle computer in a number of ways such as using a wireless receiver that's plugged into the OBD port of the vehicle, built-in wiring that transmits information from sensor to the vehicle computer, Bluetooth enabled sensor that can communicate with vehicle computer, using radio frequency, Wi-Fi, cellular, LTE, other wireless communication technologies, etc, without departing from the spirit and scope of the present invention.

As shown in FIG. 13, FIG. 14 and FIG. 15, when the chest clip 1404, 1408 of the child's car seat is buckled and the associated sensor 1402, 1406 communicates that information to the vehicle computer, in that case the vehicle computer can also send the instruction to the selected sun visors (for example: front row sun visors) 1310, 1510 to automatically come down or be deployed and also automatically open the cover 1312, 1512 of the sun visor, which would automatically turn on the display screen on the sun visor, and display either the 'Rear Passengers' camera view 1302 or the 'Child seat' camera view 1502 on the display screen. The 'Rear Passengers' camera view 1302 would not only display the image of the regular front facing passengers 1308 sitting in the rear seat, but it would also show any rear facing children 1306 sitting in the rear child seat/seats 1304 using multiple rear passenger cameras, wherein images of multiple rear passenger cameras would be stitched or merged 1314 together to show the combined 'Rear passengers' camera view 1302. The 'Child seat' camera view 1502 would just display the images of the children, either rear facing children 1506 sitting in the rear facing child car seat 1504 or the front facing children 1508 sitting in the front facing car seat, using multiple rear passenger cameras, wherein images of multiple rear passenger cameras would be stitched or merged 1514 together to show the combined 'Child seat' camera view 1502.

For example, if there was a child sitting in a rear facing child car seat on the left side, and two other rear passengers (adults) were sitting in each of the center and the right side of the rear seat respectively, then one of the rear passenger cameras would capture an image of the two front facing passengers, and another rear passenger camera would capture an image of the rear facing child from the opposite direction, and then both the rear passenger camera images would be stitched or merged together such that it looks like a single 'Rear passengers' image of all rear passengers sitting in a row. Such 'Rear passengers' image view would be displayed on the sun visor's display screen.

In another example, if there was a child sitting in a rear facing child car seat on the left side of vehicle's rear seat, and another child sitting in a front facing child sear on the right side of rear seat, then one of the rear passenger cameras would capture an image of the child sitting in front facing car seat, and another rear passenger camera would capture an image of the child sitting in rear facing seat from the opposite direction, and then both the rear passenger camera images would be stitched or merged together such that it looks like a single 'Child seat' camera view image of both children sitting in the rear passenger row.

In another example, if there were two children sitting in a rear facing child car seats on the extreme left and right side of vehicle's rear seat, and another front facing passenger (adult) was sitting in the center of the vehicle's rear seat, and if there were only two rear passenger cameras installed in the vehicle, then one of the rear passenger cameras would capture an image of the front facing passenger (adult) sitting in the center seat, and another rear passenger camera would capture an image from the opposite direction such that it includes the view of both the rear facing children, and then both the rear passenger camera images would be merged together such that the combined image shows both the rear facing children on the left and right sides as well as the front facing passenger in the center. In other words, it would look like a single 'Rear passengers' image of all rear passengers sitting in a row.

According to an embodiment of the present invention, when the chest clip 1404, 1408 of the child's car seat is unbuckled while the vehicle is running or being driven, then the associated sensor 1402, 1406 in the chest clip of the child's car seat would send that information to vehicle computer, which would further instruct the sun visor system that rather than immediately turning off or replacing the camera view on the display screen of the sun visor, the display screen should continue to show the 'Rear passengers' camera view 1302 or the 'Child seat' camera view 1502 for a short duration (for example: 30 seconds, 1 minute, etc), wherein if the child has accidentally or intentionally unbuckled the chest clip 1404, 1408 of the car seat, then the sun visor users in the front row would be able to continue to view the rear passengers rather than having to keep turning back. Additionally, the 'Rear passengers' camera view 1302 or the 'Child seat' camera view 1502 on the sun visor display would also try to alert the sun visor users via different mechanisms when the chest clip 1404, 1408 of the child's car seat is unbuckled such as an alert banner on the 'Rear passengers' camera view 1302 or the 'Child seat' camera view 1502, flashing alert banner on the 'Rear passengers' camera view or the 'Child seat' camera view, making different sounds, voice alert, etc. When the child seat's chest clip unbuckled alert was still there on the sun visor system, however, if the chest clip of the child's car seat is re-buckled, then the associated sensor 1402, 1406 in the chest clip 1404, 1408 of the child's car seat would communicate that information to the vehicle computer, which would thereafter instruct the sun visor system to remove the child seat's chest clip unbuckled alert from the sun visor's display screen or other voice alerts would be removed too.

A user would be able to set the default setting for which alerts they want to receive when the chest clip 1404, 1408 of the child's car seat is unbuckled while the vehicle is running or is in driving mode. A user would also be able to acknowledge the alert on the sun visor system so that the alert goes away, and therefore, stops alarming the users. Also, a user would have the ability to set the default setting for how long the 'Rear passengers' camera view 1302 or the 'Child seat' camera view 1502 should continue to display once the chest clip 1404, 1408 of the child's car seat is unbuckled. A user would also be able to set the default setting such that the display screen of the sun visor continues to display 'Rear passengers' camera view 1302 or the 'Child seat' camera view 1502 even when the chest clip of the child's car seat is unbuckled rather than stopping that view or replacing the view on the sun visor's display screen after some time, and that would also be considered within the spirit and scope of the present invention.

According to an embodiment of the present invention, when the chest clip 1404, 1408 of the child's car seat is unbuckled while the vehicle is running or being driven and if the sun visor's display screen was showing some other view other than 'Rear passengers' view 1302 or the 'Child seat' camera view 1502 at that time, then in that situation the associated sensor 1402, 1406 in the chest clip of the car seat would send the chest clip unbuckled information to vehicle computer, which would further instruct the sun visor system to display an alert on the existing view of the sun visor's display screen such as an alert banner or flashing alert banner on the top of existing view of the sun visor's display screen. In the case, while the child seat's chest clip unbuckled alert is displaying on the sun visor's display screen, and if the user taps or voice activates that banner alert, then the view on the sun visor's display screen would be automatically changed to 'Rear passengers' view 1302 or the 'Child seat' camera view 1502, so the user can view the rear passengers without having to turn back. An alternate is that the user can also set a default setting wherein if the chest clip 1404, 1408 of the child's car seat was unbuckled, then even if the view on the sun visor's display screen was a different view, the system would automatically change the view on the sun visor's display screen to show the 'Rear passengers' view 1302 or the 'Child seat' camera view 1502. Additionally, an alert banner can still be displayed on the top of the sun visor display screen to indicate or alert the users that the chest clip of the child's car seat has been unbuckled.

One of ordinary skill in the art would recognize that with the assistance of multiple rear passenger cameras 1204, 1206, the 'Rear passengers' camera view 1302 or the 'Child seat' camera view 1502 on the sun visor's display screen can automatically display any combination and number of rear facing car seats, front facing car seats, other front facing passengers that don't need a car seat, or empty seats, and all of those would be considered within the spirit and scope of the present invention. Such 'Rear passengers' view 1302 or the 'Child seat' camera view 1502 on the sun visor display screen would allow the users to easily monitor their baby/child in the child seats, whether the seat is rear facing or front facing, and the users no longer need to constantly turn back to monitor their children.

According to an embodiment of the present invention, if the user was already watching another camera view on sun visor's display screen, then rather than overriding existing view with 'Rear Passengers' view 1302 or the 'Child seat' camera view 1502 when the chest clip of the child's car seat is buckled, the display screen can also split equally and display both the previous view that the user was watching earlier as well as the 'Rear Passengers' view or the 'Child seat' camera view, and that would be considered within the spirit and scope of the present invention. A user would always have an option to enlarge a camera view on the sun visor's display to full screen or restore the camera view to display on the split screen of the sun visor display at any time.

Similar to the automatic deployment of sun visor 1310, 1510 along with the opening of the cover 1312, 1512 of the sun visor, which in turn causes the sun visor's display screen to turn on, there can also be automatic undeployment of sun visor system if the chest clip 1404, 1408 of the child's car seat is unbuckled, wherein the cover of the sun visor would be automatically closed, which in turn would automatically turn off the display screen of the sun visor, and then the sun visor itself would be reverted back to its original or undeployed position. In another embodiment of the present invention, there can also be automatic switching of the sun visor's display screen from 'Rear passengers' view 1302 or the 'Child seat' camera view 1502 to another camera view if the chest clip 1404, 1408 of the child's car seat is unbuckled without departing from the spirit and scope of the present invention. A user would also have a function or mechanism available in the sun visor system's settings screen, wherein they will be able to update or set which camera view the sun visor system would display by default when the chest clip of the child's car seat is either buckled or unbuckled.

An alternate for displaying the child seat, either rear facing or front facing child seat, on the display screen of the sun visor can be to display them on either the central navigation screen, vehicle dashboard screen, heads up display on the windshield or another similar display available in the vehicle, which would also be considered within the spirit and scope of the present invention.

Figure 16:
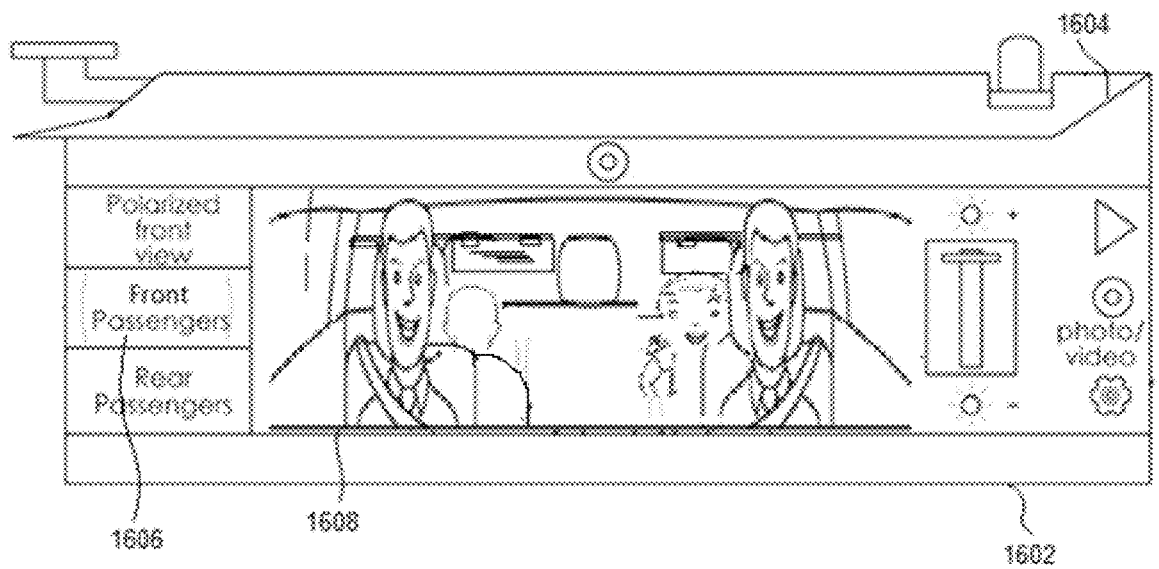
FIG. 16 is a diagram of an exemplary 'Front passengers' view on the sun visor's LCD screen, which displays the image of the passengers sitting in the front row. Such 'Front passengers' view would be usually viewed by the rear seat passengers, either front facing rear passengers or the rear facing rear passengers, on their rear seat sun visors, however, the 'Front passengers' view can also be viewed by a front passenger to see another passenger sitting in front row if they don't want to turn and see that front row passenger.

According to an embodiment of the present invention, as shown in FIG. 14 and FIG. 16, when the chest clip 1404, 1408 of the child's car seat is buckled, then the sensor 1402, 1406 in the chest clip of the child's car seat would communicate that information to the vehicle computer, wherein the vehicle computer would further send the instruction to the associated rear seat sun visor or sun visors 1602 to automatically come down or be deployed such that they are visible to the child sitting in the rear facing or the front facing child seats. Sun visor system would also automatically open the cover 1604 of such rear seat sun visor or visors, which would in turn cause the display screen of those rear seat sun visors to turn on, and automatically display the 'Front passengers' camera view 1608 on the display screen showing the front passengers image to the children sitting in the front or rear facing car seats. In short, this would allow the children sitting in the rear seats, who traditionally only see the back of the front passengers or sometimes don't even see the front passengers when the children are sitting in the rear facing seat, to be able to easily see the front passengers' image using the 'Front passengers' camera view 1608 on the rear sun visor's display screen. Note: 'Front passengers' button 1606 on the left side of sun visor's display screen would be automatically highlighted when the 'Front passengers' camera view 1608 is being displayed on the sun visor's display screen.

Such 'Front passengers' view would be usually viewed by the rear seat passengers, either front facing rear passengers or the rear facing rear passengers, on their rear seat sun visors, however, the 'Front passengers' view can also be viewed by a front passenger to see another passenger sitting in front row if they don't want to turn and see that front row passenger.

According to an embodiment of the present invention, there can be a parental controls provided to the front passengers to be able to fully control the sun visor device or sun visor system on the rear seat sun visor/visors such as remotely change the camera view on the display screen of the rear seat sun visor, turn off the display screen of the rear seat sun visor, adjust the volume on the rear seat sun visor device, open or close the cover of the sun visor, deploy or undeploy the sun visor, etc.

Figure 17:
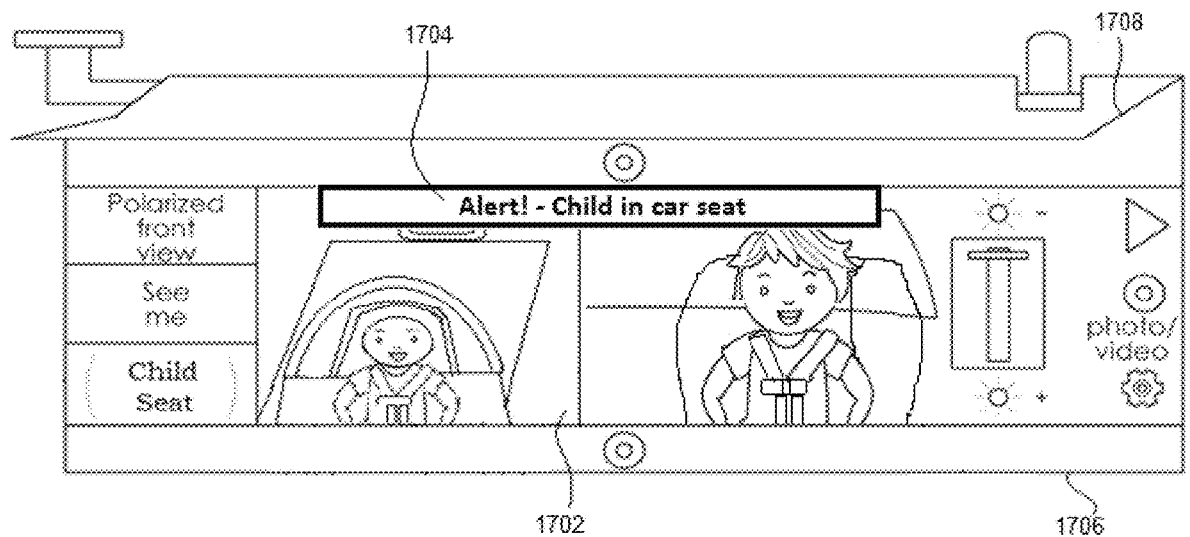
FIG. 17 illustrates an exemplary alert banner on the top of the sun visor's LCD screen to alert the vehicle users that a child is still sitting in car seat while the vehicle's ignition is turned off.

According to an embodiment of the present invention, as shown in FIG. 14 and FIG. 17, when the vehicle's ignition is turned off, but the chest clip 1404, 1408 of the child's car seat is buckled, then the sensor 1402, 1406 in the chest clip of the child's car seat would send that information to vehicle computer, which would further instruct the selected sun visors 1706 (for example: both front row sun visors) to deploy, if not already deployed earlier, and then alert or remind the front passengers that the child is sitting in the rear car seat using different mechanisms such as an alert banner 1704 or a flashing alert banner on display screen of the sun visor, raising the cover 1708 of the sun visor and displaying either 'Rear passengers' camera view or 'Child seat' camera view 1702 on the sun visor's display screen, sun visor system making different sounds, blinking lights on sun visors device, sending a text message to user, etc. This would help to remind the users that the child is sitting in the rear car seat of the vehicle, so the users don't forget them in the vehicle, especially on the very hot or cold days, which can sometimes even be fatal.

When the alert, for example, an alert banner 1704 about the child sitting in the rear car seat was still there on the sun visor system, however, during that time if the chest clip 1404, 1408 of the child's car seat was unbuckled, then the car seat sensor 1402, 1406 would communicate that information to the vehicle computer, which would thereafter instruct the sun visor system to remove the alert, for example, an alert banner 1704 about the child sitting in the rear car seat from the sun visor's display screen and/or also remove any associated voice alerts or any other similar alerts.

Note: In the above mentioned scenario, when the vehicle's ignition is already turned off, the sun visor system would run on batteries in order to remind the users that the child is sitting in the rear passenger car seat. However, after a short duration (for example: 30 seconds, 1 minute, etc) as set by the user, the cover 1708 of the sun visor would automatically close, which would in turn cause the display screen of the sun visor to automatically turn off, and then the sun visor 1706 itself would also be automatically moved back to its original undeployed position. One or ordinary skill in the art would recognize that rather than closing or undeploying of the sun visor system automatically after the said short duration when the vehicle ignition is turned off, instead it can also be linked to the locking of the vehicle, wherein when the vehicle is locked, then the cover 1708 of the sun visor would automatically close, which would in turn cause the display screen of the sun visor to automatically turn off, and then the sun visor 1706 itself would also be automatically moved back to its original undeployed position, and that would be considered within the spirit and scope of the present invention.

A user would be able to set the default setting for which alerts they want to receive using the sun visor system when the chest clip of the child's car seat is still buckled i.e. child is still sitting in the rear car seat of the vehicle, however, the vehicle ignition is turned off. A user would also be able to acknowledge the alert on the sun visor system, for example, by tapping or clicking the alert 1704 on the sun visor display, acknowledging the voice alert, etc) so the alert would go away, and therefore, stops alarming the users. A user would also be able to set the default setting such that the display screen of the sun visor automatically shows the 'Rear passengers' view or the 'Child seat' camera view 1702 when the chest clip 1404, 1408 of the child's car seat is still buckled but the vehicle's ignition is turned off, and that would also be considered within the spirit and scope of the present invention.

This invention would also include a 'Settings' screen that can be accessed through the multi-functional LED touch screen display—

As illustrated in FIG. 7A, for exemplary purposes, on the touch screen display of a sun visor, there would be a 'Settings' option 702, which when clicked would open the 'Settings' screen.

As illustrated in FIG. 7A, on the 'Settings' screen, users would have an option to either setup or enable/disable features like Wi-Fi 704, Bluetooth 706 and Cellular 708.

As illustrated in FIG. 7A and FIG. 7B, there would be an 'Auto share/upload photos videos' option 710 available on the 'Settings' screen. When a user clicks on the 'Auto share/upload photos videos' option, they would be taken to a new screen named 'Auto share/upload settings' 720. On the 'Auto share/upload settings' screen, if the user enables 724 the 'Auto share/upload photos videos' field 722, then the following two options would become visible—one for auto share settings 726 for sharing photos/videos with another Bluetooth device and second for auto upload settings 728 for uploading photos/videos to a central online location using Wi-Fi or cellular. For the former, a user would be able to select an already connected Bluetooth enabled device for the auto share to take place, and for the latter, a user would be able to select and set up the online accounts/services that allow to store photos/videos at a central online location. Note: It's up to the user if they want to set up both auto share and auto upload, or just one of them, or none. Note: Since both the sun visors' touch screen devices have Bluetooth functionality, therefore, any of the photos/videos taken using one of the sun visor's touch screen device can also be shared with another sun visor's touch screen device itself either automatically or manually as long as the Bluetooth devices are connected to each other. In short, sharing photos/videos from a sun visor's touch screen device to any Bluetooth enabled devices i.e. smartphones, tablets, smartwatches, etc. would be possible.

As illustrated in FIG. 7A, there would be an 'Auto delete after share/upload' option 712, which would be initially grayed out by default. However, when the user enables the 'Auto share/upload photos videos' field 722 on the 'Auto share/upload settings' screen 720, then this 'Auto delete after share/upload' option 712 would be visible i.e. would be no longer grayed out. If the user enables (turns on) 716 this 'Auto delete after share' option 712, then the system would automatically delete any photos/videos present on sun visors' touch screen device after they have been successfully shared and/or uploaded depending upon the user's selection. Note: If both auto share and auto upload are set up, then the system would complete both of those tasks successfully before deleting any photos/videos from the sun visor's touch screen device.

As illustrated in FIG. 7A, there would be a 'Default camera' field 714 available on the 'Settings' screen with 'Polarized front view' camera 718 set as the default camera. A user would be allowed to change this 'Default camera' field 714 to either 'See me' camera, or the 'Rear passengers' camera, or another camera that's connected to the sun visor's touch screen device. Note: Once the 'Default camera' field has been changed on this Settings screen, the newly selected camera view would remain as the default view for any future use until the user updates it again.

Here are some additional notes regarding this invention—

When a sun visor remains plugged to the sun visor slot of the vehicle, it would receive the electrical connection from the vehicle for its touch screen device to function as well as to recharge its built-in battery. However, when a sun visor isn't plugged to the sun visor slot of the vehicle, the sun visor's touch screen device would run on its built-in rechargeable battery until the battery runs out.

A user would be able to access/operate the sun visor's multi-functional touch screen display even when the vehicle isn't turned on i.e. the sun visor's touch screen device would run using its built-in rechargeable battery in this case, and battery symbol would be displayed on its screen to indicate the amount of remaining battery.

A user would be able to pull out/detach the entire sun visor or the sun visor's LCD touch screen device from the vehicle and would be able to take photos/videos using its built-in cameras or transfer any photos/videos from that sun visor's touch screen device to another computer using a USB connection 812 or other similar transfer means. (Note: The sun visor's touch screen device would run on its built-in rechargeable battery while out of the sun visor slot of the vehicle.)

Figure 11:
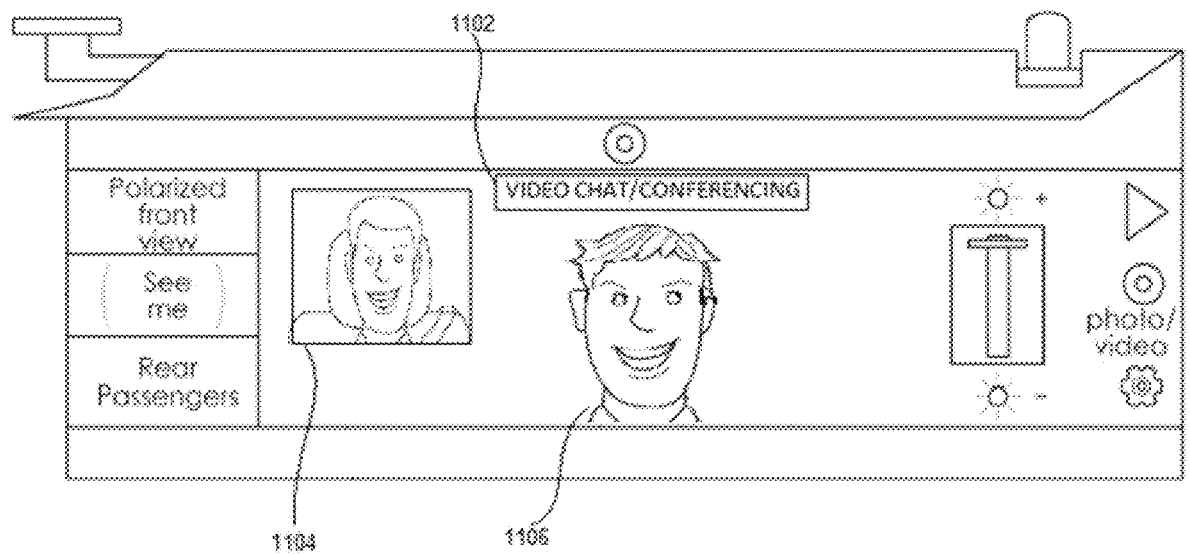
FIG. 11 is a diagram of an exemplary video chat/conference functionality available on the sun visor LCD screen, which allows the users to talk and share/exchange their video, i.e. any of the sun visor's camera views, in real-time with anyone else in the world that have video chat capable devices.

According to an embodiment of the present invention, as shown in FIG. 11, there would be video chat/conference functionality 1102 available on the sun visor system, which would allow the users to talk and share/exchange their image/video 1104, i.e. any of the sun visor's camera views, in real-time with any other people 1106 in the world that have video chat capable devices. Such video chat/conference functionality would mainly use the sun visor's LCD touch screen, any of the associated cameras, computer software module, wireless connection, etc to share/exchange the video with other people. However, one or ordinary skill in the art would recognize that such video chat/conference functionality 1102 can also comprise of other components like centralized server, server client interfaces, etc. and those would still be within the spirit and scope of the present invention. The sun visor's LCD touch screen would have the necessary controls and the associated computer software modules to enable or disable the video chat/conference functionality on the sun visor system.

Note: While using the video chat/conference functionality, the vehicle user would be able to share/exchange any of the sun visor's camera views with the other people. The wireless connection mentioned above may be Bluetooth, 802.11 Wi-Fi, cellular, LTE, or other wireless communication technologies. One or ordinary skill in the art would recognize that any wireless communication technology may be used to enable the video chat/conference functionality without departing from the spirit and scope of the present invention.

Note: Similar to any video chat/conference applications (for example: Facetime application on iOS operating system), there would also be features available on the sun visor's video chat/conference functionality to add/remove or enter details of users with whom the vehicle user wants to do video chatting/conferencing. A user would also be able to set up an automatic sync of their contacts from their smartphones to the sun visor device such that a user doesn't have to set up all contacts again on their sun visor device. A user would be able to click on any of the manually added or synced contacts on the video chat/conference application of the sun visor device and request or initiate the video chat/conference. One or ordinary skill in the art would recognize that the sun visor's video chat/conference system can also comprise of other common features that might assist with the video chat/conference functionality, and that would be within the spirit and scope of the present invention.

Figure 19:
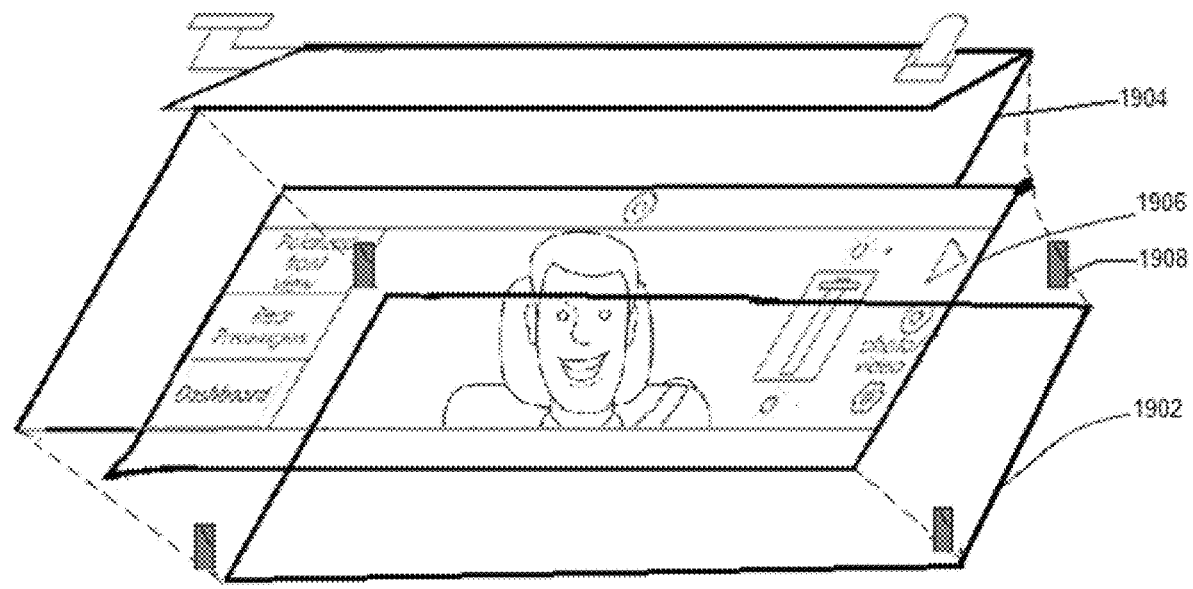
FIG. 19 illustrates a sun visor device with a two-way mirror or sometimes also referred as a one-way mirror, which looks transparent but is partially reflective and partially transparent, attached/embedded in the front of the sun visor device, and a LCD installed behind that two-way mirror, wherein if the LCD is turned on or activated using a switching mechanism, then the LCD screen would be visible through the two-way mirror attached in front of the sun visor device. Figure also displays an exemplary capacitive touch screen sensor within the sun visor device, wherein if the user touches the two-way mirror on the sun visor, then it would capture those touch actions and transmit those actions to the LCD.

According to an embodiment of the present invention, as shown in FIG. 19, a two-way mirror 1902 or sometimes also referred as a one-way mirror, which is partially reflective and partially transparent, can be attached or embedded in the front of the sun visor device 1904, and a LCD screen 1906 can be installed behind that two-way mirror, wherein if the LCD screen 1906 is turned on or activated using a switching mechanism, then the LCD screen 1906 would be visible through the two-way mirror 1902 attached or embedded in front of the sun visor device 1904. There would also be one or multiple sensors placed such as a capacitive touch screen sensor 1908 within the sun visor device 1904 such that if the user touches the two-way mirror 1902 on the sun visor device 1904, then it would capture those touch actions and transmit those actions to the LCD screen 1906 as if the user was touching the LCD screen itself.

In the situation, wherein the LCD screen 1906 is turned off or deactivated using a switching mechanism, then the two-way mirror 1902 attached or embedded in front of the sun visor device would look like a regular reflective mirror on the sun visor. In other words, if a user doesn't want to use the digital smart features of the sun visor, then they can simply turn off or deactivate the LCD screen 1906 using a switching mechanism, wherein the reflective component of the two-way mirror 1902 would still continue to act as a traditional or a regular mirror on the sun visor device 1904. Also, in the situation where the vehicle isn't turned on, and the LCD screen 1906 on the sun visor isn't receiving any power and also isn't running on batteries, then the two-way mirror 1902 attached or embedded in front of the sun visor device would continue to act as a traditional or regular mirror due to its reflective properties.

One or ordinary skill in the art would recognize that the switching mechanism to turn on/off or activate/deactivate the LCD screen 1906 on the sun visor, such that instead of the reflection of the two-way mirror 1902, the LCD screen 1906 becomes visible on the sun visor device 1904, can be accomplished in many different ways such as using a button, a flip switch, touch screen option, voice control, gestures, motion sensor, coupled or integrated with opening/closing of the cover of the sun visor, other similar switching mechanisms, etc, and all of those would be considered within the spirit and scope of the present invention.

According to an embodiment of the present invention, a user would also be able to use voice commands instead of operating the digital sun visor by touching the sun visor's LCD touch screen. For example: using a voice command, a user would be able to change the camera view on the sun visor's LCD screen from 'Polarized Front View' to 'See Me' view, turn on or turn off the sun visor's LCD screen, start or stop video chat, change the sun visor mirror to traditional mirror view instead of the digital LCD screen, request to deploy or undeploy the sun visor system, request to turn on or off the sun visor's display screen, etc. One or ordinary skill in the art would recognize that the voice commands mentioned above are just exemplary, and that each and every component of the sun visor device can be set to be voice command controlled without departing from the spirit and scope of the present invention.

Figure 20:
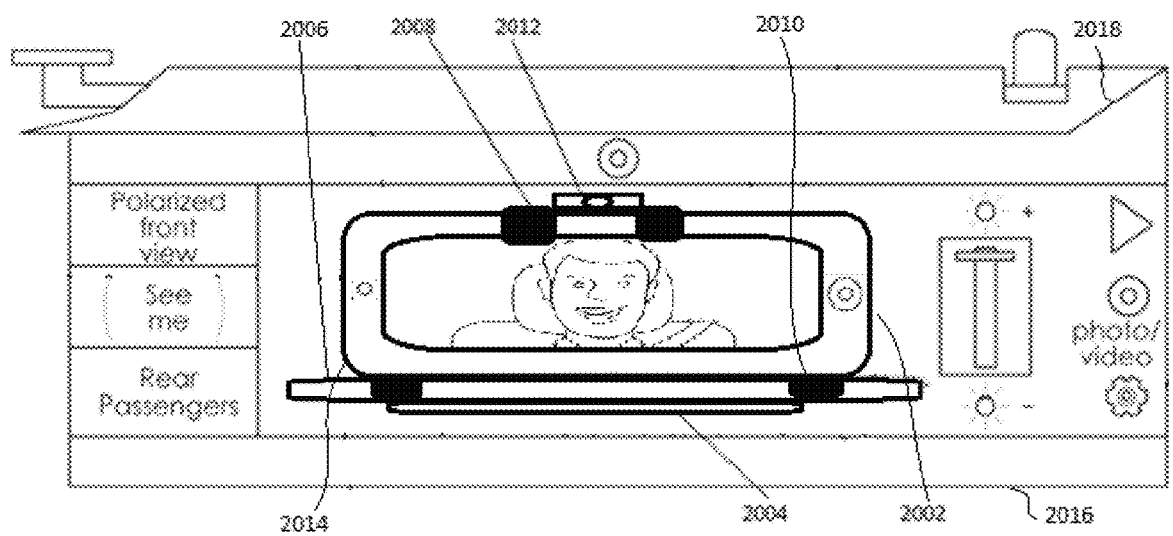
FIG. 20 is a diagram which illustrates that a sun visor system can also comprise of a smart device holder, wherein a smart device such as smartphone, tablet, etc, which have a display screen, can be mounted or attached to the sun visor using the said smart device holder.

According to an embodiment of the present invention, as shown in FIG. 20, any smart device 2014 that has a display screen can also be mounted or attached to the sun visor 2016. On the sun visor, there would be a smart device holder 2002, which would comprise of a base plate 2004 embedded on the sun visor 2016, one or multiple curved support structures 2006, 2008 at the top and/or bottom of the base plate along with rubber like padding 2010 embedded within the curved support structures 2006, 2008, a release/lock button 2012 associated with either top or bottom curved support structures 2006, 2008 wherein by pressing the release/lock button 2012, the curved support structures 2006, 2008 can be extended or reduced in height and by releasing the release/lock button 2012, the curved support structures 2006, 2008 would be locked in place, and therefore, when the curved support structures 2006, 2008 are closely touching the edges of the smart device 2014, it would help to secure the smart device 2014 on the smart device holder 2002 of the sun visor 2016. Since the curved support structures 2006, 2008 can be extended or reduced in height using the release/lock button 2012, it would help to hold smart devices 2014 of different sizes like a tablet, different size smartphones, etc on the smart device holder 2002 of the sun visor 2016. When a smart device is enclosed within its protective case or cover, it can still be secured on the smart device holder of the sun visor. Note: A smartphone or tablet are the most common smart devices that can be mounted or attached to the sun visor, however, there are other smart devices that would also be considered within the spirit and scope of the present invention.

For example: As part of this invention, a smartphone or tablet can be mounted or attached to the sun visor 2016 by placing them in between the curved support structures 2006, 2008 on the smart device holder 2002 of the sun visor 2016 and securing them using a release/lock button 2012 associated with those curved support structure or structures 2006, 2008.

According to an embodiment of the present invention, the said base plate 2004 embedded on the smart device holder 2002 of the sun visor can also have holes on it, wherein if the smart device 2014 is mounted or attached to the smart device holder 2002 of the sun visor 2016, and the smart device's camera is aligned to match the said base plate's hole, then it would also allow visibility of the external area in front of the vehicle using that hole. In this embodiment of the present invention, behind the said base plate of the smart device holder of the sun visor, there would also be another solid plate or a layer of the sun visor itself such that the hole on the said base plate would usually remain covered. However, when the smart device is mounted or attached on the smart device holder of the sun visor, then the solid plate or the layer of sun visor behind the said base plate's hole would be automatically moved such that the hole would no longer be covered and would allow the mounted smart device's camera to view the external area in front of the vehicle. Along the same lines, when the smart device is later unmounted or removed from the smart device holder of the sun visor, then the solid plate or the layer of sun visor behind the said base plate's hole would automatically move again such that the hole on the said base plate gets covered and doesn't allow the see through functionality.

In this embodiment of the present invention, there can also be a polarized filter screen, polarized film or a polarized lens either behind or fitted within the hole of the said base plate of the smart device holder of the sun visor, which would help to polarize the front view captured by the camera. One or ordinary skill in the art would recognize that any method of polarizing the image captured by the camera could be used to achieve polarization without departing from the spirit and scope of the present invention.

One or ordinary skill in the art would recognize that either using manual function such as hand slider, etc or using automatic methods, the hole on the said base plate of the smart device holder of the sun visor would be adjustable in height or width such that it can align with the camera of different smart devices having different shapes and sizes and even having different placement of cameras on such smart devices.

According to an embodiment of the present invention, rather than using the built-in cameras of the smart device, there can also be a custom application on the smart device that would be able to connect and display image from external cameras installed within different part of the vehicle. In that situation, a user would just need to mount or attach the smart device to the smart device holder of the sun visor, and then open the custom application on smart device to be able to view different camera views such as 'Front polarized' view, 'See me' view, 'Rear passengers' view, etc.

According to an embodiment of the present invention, the said smart device holder 2002 of the sun visor 2016 can also comprise of a charging or docking station on one end, wherein when the smart device 2014 is mounted or attached to the sun visor, the charging port of the smart device will be docked or plugged into the said charging station, and therefore, the smart device 2014 would automatically get charged whenever it's mounted or attached to the smart device holder 2002 of the sun visor 2016.

According to an embodiment of the present invention, the said smart device holder of the sun visor can also comprise of a wireless charging pad, wherein when the smart device is mounted or attached to the sun visor, the smart device would automatically get charged whenever it's mounted or attached to the smart device holder of the sun visor. One or ordinary skill in the art would recognize that with advancements in technology, remote wireless charging of smart device when it's mounted or attached to the sun visor would also be considered within the spirit and scope of the present invention. One or ordinary skill in the art would recognize that other ways of charging such as solar charging, etc, would also be considered within the spirit and scope of the present invention.

It is to be clearly understood that the rubber like padding 2010 embedded within the curved support structures 2006, 2008 of the smart device holder 2002 of the sun visor 2016 are optional, however, they are intended to provide strong grip and would also help to avoid scratches on smart device 2014 when the smart device 2014 is secured on the smart device holder 2002 of the sun visor 2016.

One or ordinary skill in the art would recognize that a smart device can be mounted or attached to the sun visor in a number of ways as well as the smart device holder on the sun visor can also comprise of different set ups and can be installed on the sun visor in a number of ways too, wherein all of those would be considered within the spirit and scope of the present invention.

One or ordinary skill in the art would recognize that in addition to smartphone and tablet, other smart devices like smart watch, smart lcd, smart mirror, mini computer screen, etc, can also be mounted or attached to the sun visor, and that would be within the spirit and scope of the present invention.

According to an embodiment of the present invention, there would also be machine learning or artificial intelligence built within the sun visor system, wherein the system would continuously learn, adapt and try to help the users. For example, if children were sitting in the rear seat of the vehicle, then the system would automatically identify them using various mechanisms like object detection software module, facial recognition, sound recognition, sensor on the chest clip of the car seat, etc. and automatically deploy the sun visor in addition to opening the cover of the sun visor for the front passengers, which would in turn cause the display screen of the sun visor to turn on and then display the rear seat camera view on the sun visor's display screen. An occupant recognition module integrated into the sun visor system could include one or more of the above components to identify particular occupants in the vehicle. Another example of the machine learning system is that if the sun visor user frequently turns on the 'see me' camera view on the sun visor's display screen, then the machine learning system or artificial intelligence system of the sun visor would track that behavior and in future when the user turns on the display screen of the sun visor, it would automatically display the 'see me' camera view to the user.

One of ordinary skill in the art would recognize that in addition to the machine learning examples mentioned above regarding the sun visor, any additional similar machine learning solutions would also be considered within the spirit and scope of the present invention. In other words, the machine learning system or the artificial intelligence system of the sun visor would be capable of continuous learning and providing continuous feedback or solutions to the users such that it can constantly help the users.

According to an embodiment of the present invention, a user would be able to bring up multiple camera views on the sun visor display screen by simultaneously putting their fingers on multiple camera buttons/selections in the navigation section of the sun visor's display screen. When the user makes such multiple camera selections simultaneously, the display screen of the sun visor would split equally depending upon the number of the views selected by the user, and automatically display those selected camera views in each split section of the display screen of the sun visor. For example, if the user selects two camera buttons by putting two fingers simultaneously on the camera views in the navigation section of the sun visor's display screen, then the view area of the sun visor display screen would split in two sections and display the selected camera views individually in each split section of the main screen. One or ordinary skill in the art would recognize that a user can bring up multiple camera views on the sun visor screen by putting their multiple fingers, i.e. two or more fingers, simultaneously on multiple camera buttons/selections in the navigation section of the sun visor's display screen, and that would be considered within the spirit and scope of the present invention. An alternate to simultaneously putting fingers on multiple camera buttons/selections in the navigation section of the sun visor's display screen can be to put a finger on one camera button and hold it there for few seconds, which would highlight that button and bring up that camera view on the sun visor's display screen, however, the user would then be allowed to select another camera button, which if selected, then it would display both the previously selected camera view and the newly selected camera view on the display screen of the sun visor. Similarly, while pressing the second camera button, user can hold their finger on the button for few seconds, which would even allow them to select a third camera button thereafter, and so on.

When multiple camera views are displayed on the sun visor display screen, and if a user wants to rearrange the camera views to be shown in a particular sequence, either horizontally or vertically, then they would be able to do so using drag and drop feature, wherein a user can select a camera view on main screen and drag and drop it to another section of the screen, which would exchange or rearrange the position of the camera views as per user's preference. Note: once a user drags camera view to another section of the screen, however, before they drop it or lift their finger from the screen, guiding gridlines would be displayed on the screen to show the users how the camera view will be rearranged. Such guiding gridlines would help the user to know the rearrangement possibilities, so if they don't like the potential rearrangement, then they can take a different course of action.

Figure 21:
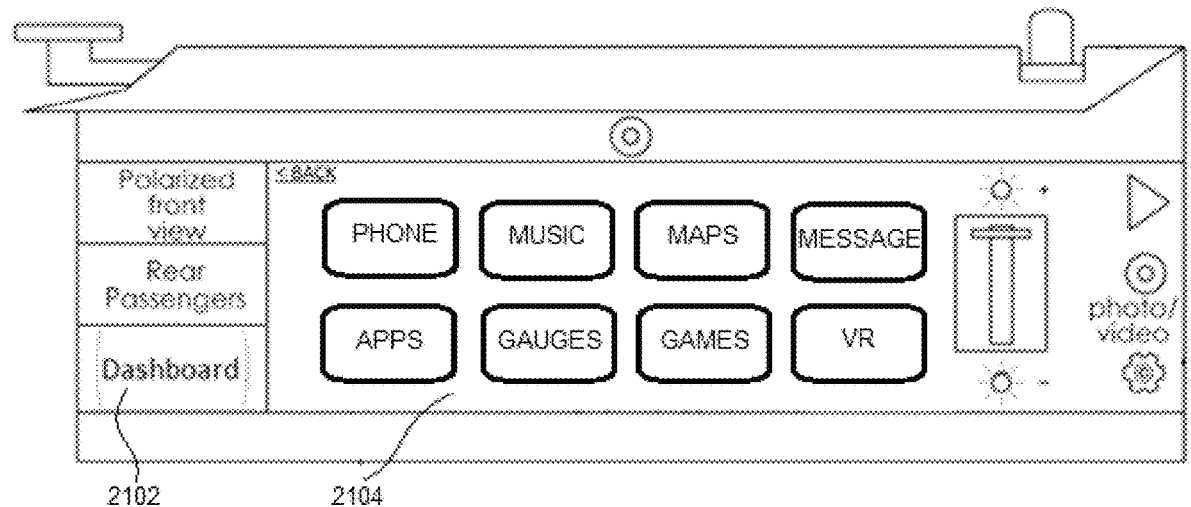
FIG. 21 is a diagram of an exemplary 'Dashboard' page/screen on the LCD display area of the sun visor, wherein it illustrates that the sun visor system can also have the vehicle's common dashboard features or systems integrated in it such as navigation system, back up camera or rear camera view, radio, music, games, phone, apps, gauges, messages, virtual reality, etc would be accessible via the said 'Dashboard' page/screen on the sun visor system. A user would be able to select the 'Dashboard' button in the left navigation area of the sun visor system, which would open the 'Dashboard' page/screen in the view area of the sun visor system.

According to an embodiment of the present invention, as shown in FIG. 21, the sun visor system can also have other common vehicle dashboard features or systems integrated in it such as navigation system, back up camera or rear camera view, radio, music, games, phone, apps, gauges, messages, virtual reality, etc. A user would be able to select the 'Dashboard' button 2102 on the display screen of the sun visor system, which would open the 'Dashboard' page 2104 in the view area of the sun visor system, wherein the integrated vehicle dashboard features or systems would be accessible through that 'Dashboard' page 2104. In other words, all the common features that are usually accessible through the central display screen on the vehicle dashboard would also be accessible through the sun visor system. Similar to the central display screen on the vehicle dashboard, there would be a list of such available features listed on the display screen of the sun visor device, wherein a user would be able to select and use them, or even go back and forth between different screens. Any of the basic components that are necessary to integrate the above mentioned features or systems within the sun visor device would be considered within the spirit and scope of the present invention. For example, for integrating the navigation system, the sun visor device would also comprise of a built-in gps. In addition, the users would also be provided with the ability to enter the destination address on the navigation screen of the sun visor's display screen in order to get the directions for that destination, and those would be considered within the spirit and scope of the present invention.

Figure 22:
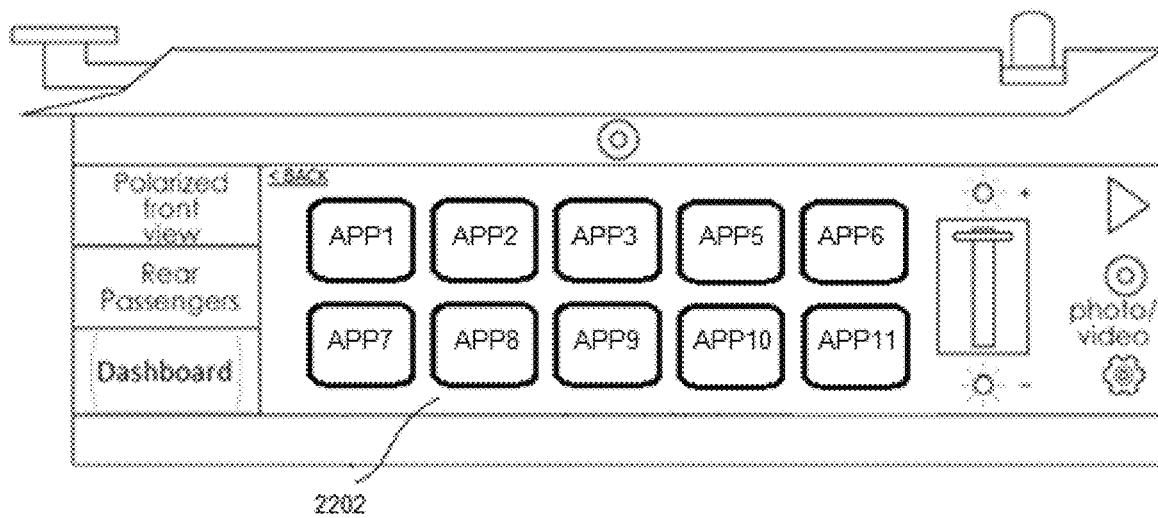
FIG. 22 illustrates that the sun visor system can also have an 'Apps' page/screen available on the LCD display screen of the sun visor, which would display a list or icons of integrated applications such as Facebook, Twitter, Youtube, etc on that sun visor's display screen. The said integrated applications can also be opened on the said LCD display screen of the sun visor.

According to an embodiment of the present invention, as shown in FIG. 21 and FIG. 22, other applications can also be integrated within the sun visor system such as Facebook, Instagram, WhatsApp, Twitter, Youtube, Pinterest, Dropbox, social networking related applications, banking related application, career related applications, etc. Users will be able to click on 'Apps' icon available on the 'Dashboard' page 2104 on the display screen of the sun visor, which would open a new 'Apps' page/screen and list or display icons of available integrated applications 2202 on the said display screen. Similar to a tablet or a smartphone, users will be able to open any of the integrated applications 2202 on the sun visor's display screen itself. One or ordinary skill in the art would recognize that in addition to the exemplary applications listed above, other similar applications that aren't listed above can also be integrated with the sun visor system, and that would be considered within the spirit and scope of the present invention.

Figure 23:
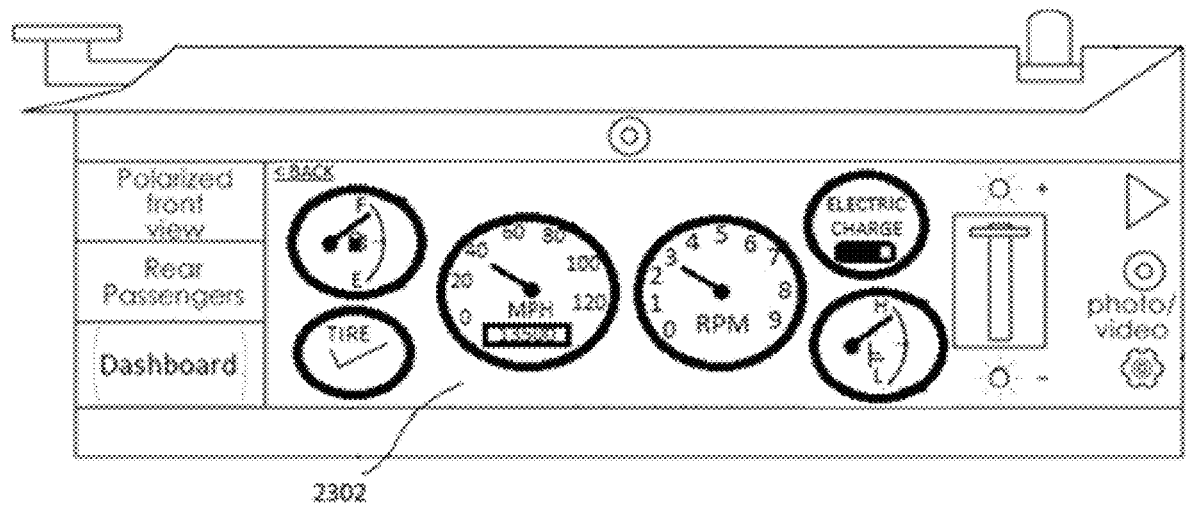
FIG. 23 illustrates that the sun visor system can also have 'Gauges' page/screen available on the LCD display screen of the sun visor, which would display a list or icons of integrated gauges such as speedometer, odometer, fuel gauge, electric charge, tachometer, pressure gauge, etc. on the said display screen of the sun visor system. Users will be able to click on any of the available gauges to see more details about that gauge on the sun visor's display screen itself.

According to an embodiment of the present invention, as shown in FIG. 21 and FIG. 23, various gauges 2302 such as speedometer, odometer, fuel gauge, electric charge, tachometer, pressure gauge, etc. can also be integrated and displayed on the display screen of the sun visor system. The vehicle computer would usually gather various gauges related data from its built-in memory as well as other sensors installed in different part of the vehicle, and it will continuously communicate that information to the sun visor device, which would display that information on its display screen. Users will be able to click on 'Gauges' icon available on the 'Dashboard' page 2104 on the display screen of the sun visor, which would open a new 'Gauges' page/screen and allow the users to view different gauges 2302 on that screen. Users will be able to click on any of the available gauges to see more details about that gauge on the sun visor's display screen itself.

According to an embodiment of the present invention, similar to users being able to take photos/videos of the camera views available on the sun visor system, a user would also be able to take photos/videos or take screenshots of any systems or applications available via the dashboard page of the sun visor's display screen either by pressing the 'Take photo/video' button available on the right side of sun visor's display screen, or even using preset hand gestures that instructs the sun visor device to take screenshot of its display screen. Users would be able to set or update their hand gestures for taking the photos/videos or screenshots at any time in the settings section of the sun visor device. The said screenshots would be stored on the sun visor device's built-in memory, and similar to photos/videos functionality on the sun visor system, the said screenshots can also be automatically or manually transferred to the user's smart device such as smartphone, tablet, etc. Ability to take such photos/videos or screenshots of the sun visor's display screen would help the users, wherein they won't need to write down information or try to take photos using other devices. For example: many users often write down the reading from the odometer or take its photo using other devices, however, with the photo/video or screenshot function available on the sun visor device itself, users would be able to take the screenshot of the sun visor's display screen while the odometer information is being displayed on the 'Gauges' section under the 'Dashboard' page of the sun visor system.

According to an embodiment of the present invention, one of the camera views of the sun visor system can also be a panoramic view of the internal area of the vehicle. When a user deploys or pulls down the sun visor, they will need to open the cover of the sun visor, which would automatically turn on the display screen on the sun visor, and then they will be able to click on the 'Internal panoramic view' button on the left side of the sun visor system to display the panoramic view of the internal area of the vehicle on the sun visor's display screen.

According to an embodiment of the present invention, additional camera views of the sun visor system can also comprise of a panoramic view of the front external area of the vehicle, or a panoramic view of the rear external area of the vehicle, or a panoramic view of the top external area of the vehicle, or a panoramic view of 360 degree, 270 degree, 180 degree, or similar degree external area of the vehicle. For example: when a user deploys or pulls down the sun visor, they will need to open the cover of the sun visor, which would automatically turn on the display screen on the sun visor, and then they will be able to click on the 'External Front—panoramic view' button on the left side of the sun visor system to display the panoramic view of the front external area of the vehicle on the sun visor's display screen, and so on.

One of ordinary skill in the art would recognize that such internal or external panoramic views mentioned above can be created by stitching together a series of photos that are either taken by single camera at different angles or directions, or photos taken by multiple cameras, and all of those would be considered within the spirit and scope of the present invention.

Figure 24:
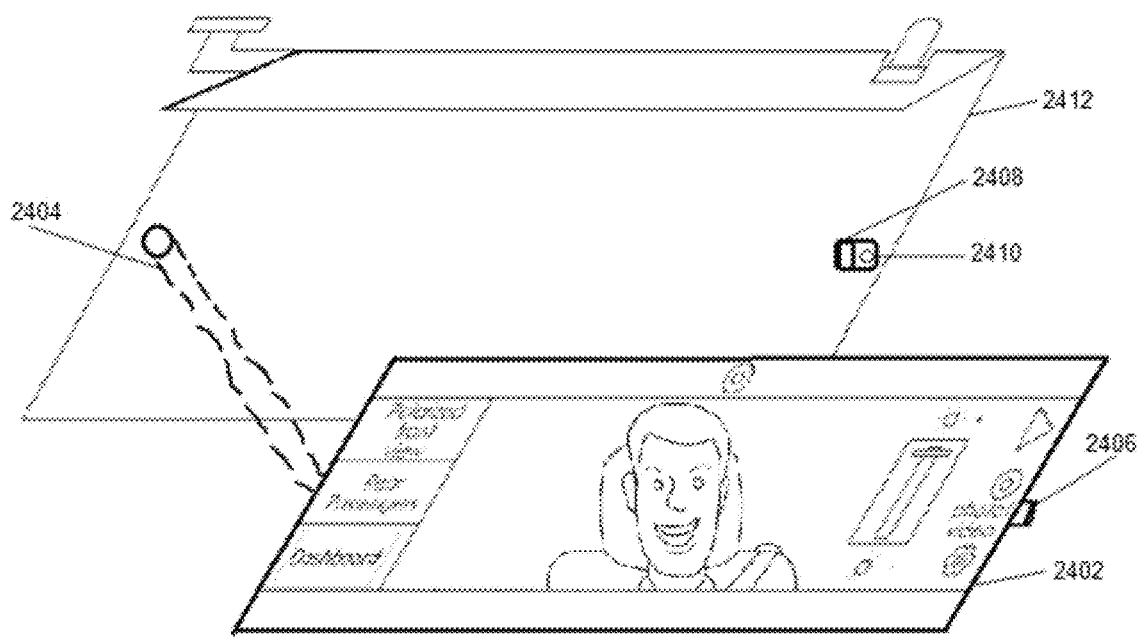
FIG. 24 illustrates that the display apparatus on the sun visor can be connected to the sun visor using a retractable wire on one end, wherein if the user wants then they can pull the tablet like display apparatus out of the sun visor closer to them, and once they are done, then the retractable wire would pull the display apparatus back to its regular position on the sun visor. There is also a clip or locking extension at the opposite end of the display apparatus, which helps to clip or lock the display apparatus on the sun visor. In addition, there is a release button, wherein when the release button is pressed, it would unclip or unlock the sun visor's display apparatus from the sun visor from one of the sides, however, the other side would still remain connected to the sun visor using the said retractable wire.

According to an embodiment of the present invention, as shown in FIG. 24, the display apparatus 2402 on the sun visor can also be connected to the sun visor 2412 itself using a retractable wire 2404, wherein if the user wants then they can pull the tablet like display apparatus 2402 out of the sun visor 2412 closer to them, and once they are done, then the retractable wire 2404 would pull the display apparatus 2402 back to its regular position on the sun visor 2412. There can also be a clip or locking extension 2406 at the opposite end of the display apparatus 2402 as compared to the end that's connected with retractable wire, wherein once the display apparatus 2402 is retracted back to its regular position on the sun visor 2412, then it can be clipped or locked to the locking mechanism 2408 on the sun visor 2412, so the display apparatus 2402 isn't hanging on one side. There can also be a release button 2410 on the sun visor 2412, wherein when the release button 2410 is pressed, it would unclip or unlock the sun visor's display apparatus 2402 from one of the sides, however, the other side would still remain connected to the sun visor 2412 using a retractable wire 2404.

One or ordinary skill in the art would recognize that the display apparatus on the sun visor can also be connected on both its sides using a retractable wire without departing from the spirit and scope of the present invention. In addition, it is to be clearly understood that when the sun visor device is pulled out of the sun visor using the retractable wire, the sun visor can still continue to remain in its position and continue to block the sun for the user. In another instance, the entire sun visor along with the sun visor device can also be allowed to be pulled close to the user, and that would be considered within the spirit and scope of the present invention.

According to an embodiment of the present invention, for any of the external camera views displaying on the sun visor's LCD screen, if there was a glare, bright light or sun light in that view, wherein making it difficult to see that view, then system would detect those and using software image processing, system would try to reduce glare or polarize the view and improve visibility for the users.

According to an embodiment of the present invention, the smart sun visors would also be able to auto deploy wherein there can be sun detecting sensors installed within or outside the vehicle such that if the sun light is detected either in direct view or side view of the users, then the sensor would communicate that information to the vehicle computer, and then the computer would send instruction to the sun visor to automatically come down or be deployed and also automatically open the cover of the sun visor, which would in turn cause the display screen of the sun visor to turn on. Since some of the external view is blocked due to the sun visor coming down, there can also be a feature to automatically show the polarized or image processed polarized like external view on the display screen of the sun visor when the sun visor is automatically deployed as mentioned above.

According to an embodiment of the present invention, the said sun detecting sensors can also work in conjunction with the traffic lights, wherein if the sun light is detected in direct view of the users and if the vehicle had to stop at the red traffic light, then the smart sun visors would auto deploy for the users facing the sun. However, if the traffic light turns green and the vehicle begins to move, then there can also be automatic closing of the cover of the sun visor, which would automatically turn off the sun visor's display screen, and then the sun visor itself would also be reverted back to its original or undeployed position. Users can also select a setting to keep the sun visors deployed until the detected sun is in view of the users, and therefore, not undeploy it after each traffic light.

One or ordinary skill in the art would recognize that there can be one or more sun detecting sensors installed within or outside the vehicle, wherein there can be an individual sun sensor for each sun visor, multiple sun sensors for each sun visor, or there can be single sun sensor that is associated to multiple sun visors, and all of those would be considered within the spirit and scope of the present invention. Similar to sun detecting sensors, there can also be bright light or glare detecting sensors placed within or outside the vehicle, which would be associated with the automatic deployment of sun visors, opening of their cover and turning on of the display screen, and would function similar to the sun detecting sensors as per the details mentioned above. Also, if the sun detecting sensor or glare sensor no longer detects sun, bright light or glare, then there can also be automatic closing of the cover of the sun visor, which would automatically turn off the sun visor's display screen, and then the sun visor itself would also be reverted back to its original or undeployed position.

Figure 25:
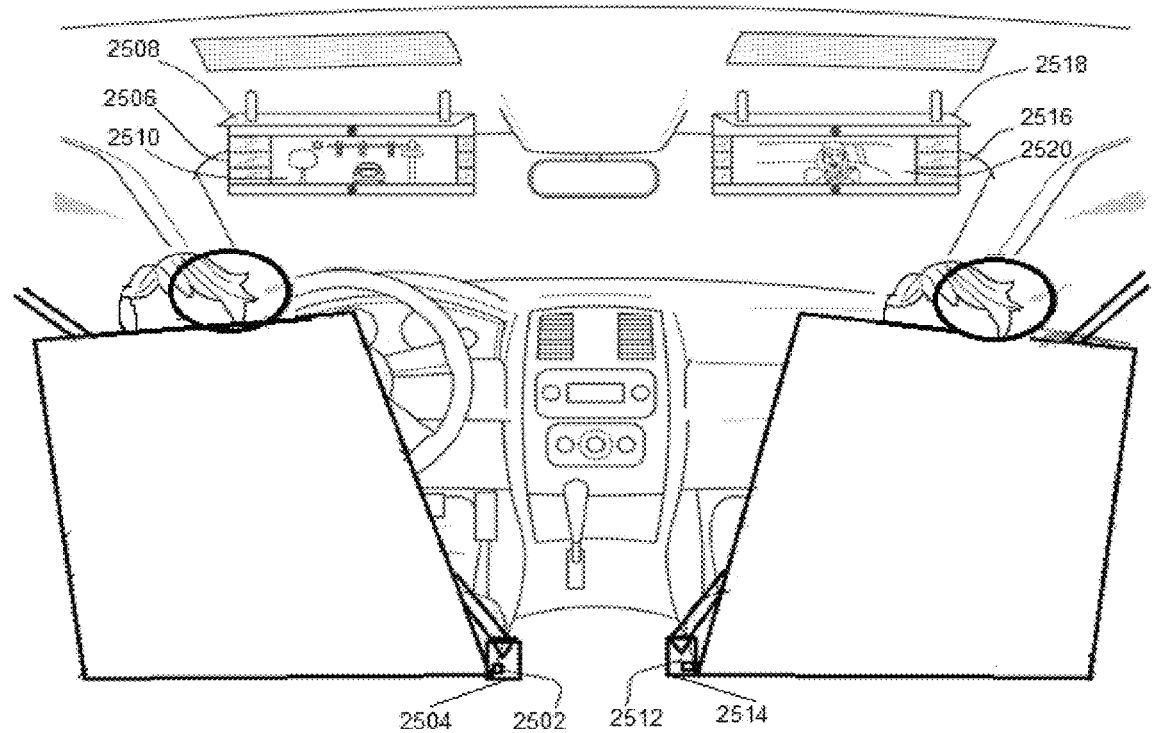

According to an embodiment of the present invention, as shown in FIG. 25, there can also be a sensor 2502, 2512 installed in the seat belt buckle 2504, 2514 of any passenger or driver seats wherein if the user buckles the seat belt, then the associated sensor 2502, 2512 would communicate that information to the vehicle computer, and then the computer would send instruction to the sun visor 2506, 2516 to automatically come down or be deployed and also automatically open the cover 2508, 2518 of the sun visor, which would in turn cause the display screen 2510, 2520 of the sun visor to turn on. However, if the sensor 2502, 2512 in the seat belt buckle 2504, 2514 detects that the seat belt has been unbuckled, then there would also be automatic closing of the cover 2508, 2518 of the sun visor, which would automatically turn off the sun visor's display screen 2510, 2520, and then the sun visor 2506, 2516 itself would also be reverted back to its original or undeployed position.

According to an embodiment of the present invention, when the vehicle's ignition is turned on by the user, sun visors in the vehicle can also be programmed to automatically come down or be deployed and automatically open the cover of the sun visor, which would in turn also cause the display screen of the sun visor to turn on. However, if the vehicle's ignition is turned off by the user then there would also be automatic closing of the cover of the sun visor, which would in turn cause the sun visor's display screen to turn off, and then the sun visor itself would also be reverted back to its original or undeployed position.

One or ordinary skill in the art would recognize that for any of the examples mentioned above where the sun visor, its cover and the associated display screen are automatically deployed or undeployed, the associated sensors would be able to communicate with the vehicle computer in a number of ways such as wireless receiver that's plugged into the OBD port of the vehicle, built-in wiring that transmit information from sensor to the vehicle computer, Bluetooth enabled sensor that communicates with vehicle computer, radio frequency, Wi-Fi, cellular, LTE, other wireless communication technologies, etc, without departing from the spirit and scope of the present invention.

One or ordinary skill in the art would recognize that for any of the examples mentioned above where the sun visor and its display screen are automatically deployed or undeployed, there would also be a function or setting available in the vehicle, wherein a user would be able to disable or enable such sun visor and its display screen's automatic deployment/undeployment feature. In addition, there would also be another function or setting available in the vehicle, wherein it would allow the users to define which of the sun visors along with their covers and associated display screens should automatically deploy/undeploy based on different user actions. For example: when there is only one passenger sitting in the driver seat of the vehicle, there is no need to automatically deploy/undeploy the sun visor system for the other passenger seats, and so on.

According to an embodiment of the present invention, based on the time of the day as well as external environment conditions detected by a sensor, brightness on the sun visor's display screen would be automatically dimmed so the high brightness doesn't hurt the eyes of the user and also make it easy for the users to be able to view outside the vehicle. For example, if it was late night, then the brightness of the sun visor's display screen would be automatically dimmed by the system. In another example, if there were dark clouds, wherein the external environment was dark, then the sensor on the sun visor system would detect the external environmental condition, and the vehicle computer would send the instruction to the sun visor system to automatically dim the brightness of the sun visor's display screen. One or ordinary skill in the art would recognize that the sensor used to detect the external environmental condition can be installed not only in the sun visor system but can also be installed in any other part of the vehicle as long as it can communicate the detected information to the vehicle computer, and that would be considered within the spirit and scope of the present invention. A user would also have the ability to enable or disable this automatic dimming of the sun visor's display screen on the 'Settings' page of the sun visor system.

Figure 26:
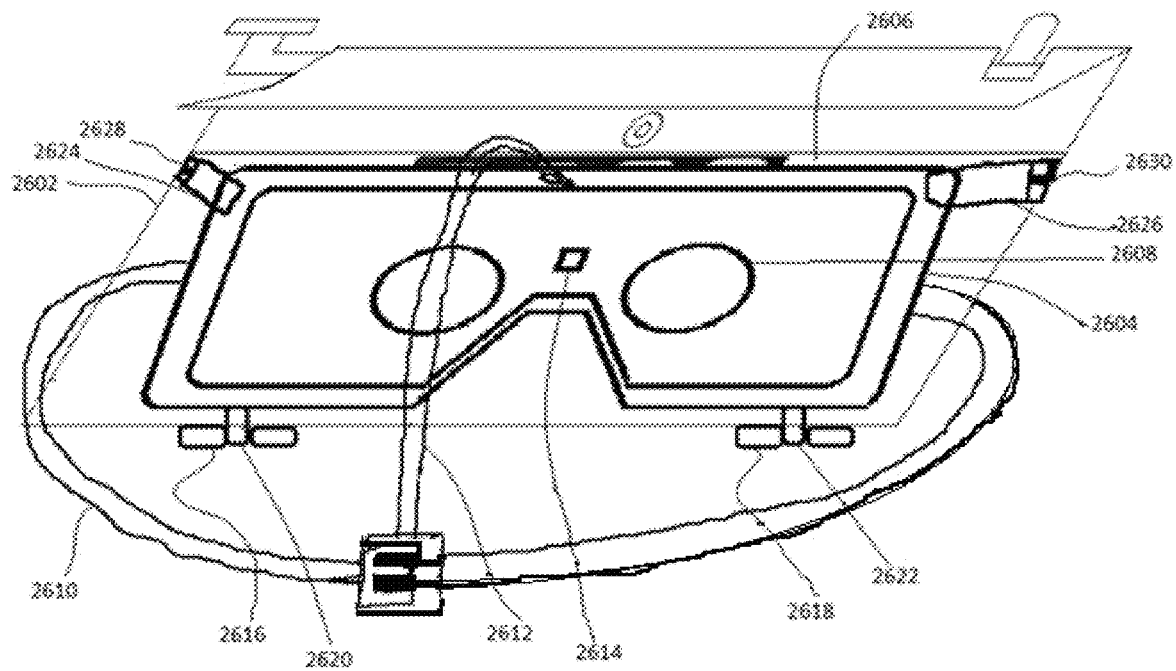
FIG. 26 illustrates that a sun visor device or the sun visor can have a virtual reality headset attached to it using a hinge mechanism, wherein the hinge mechanism would comprise of one or multiple hinges installed at the bottom of the sun visor device or the sun visor itself, and there would be a connecting rod that's connected to the said hinge mechanism on one end and connected to virtual reality headset on the other end. Using the hinge mechanism, the virtual reality headset can be either stowed at the back of the sun visor, or the virtual reality headset can also be brought in front of the sun visor and used in conjunction with either the sun visor's display screen or the smart device attached to the sun visor.

According to an embodiment of the present invention, as shown in FIG. 26, the sun visor device or the sun visor itself 2602 can also comprise of a virtual reality headset 2604 embedded or attached to it, wherein the users would be able to extend or pull the entire sun visor device close to their face and use the virtual reality headset, or the users would also be able to extend or pull the virtual reality headset out of the sun visor towards their face and use it, or the users would also be able to detach the virtual reality headset from the sun visor and use it. When the sun visor has a built-in display screen 2606, then that display screen 2606 would be used by the virtual reality headset 2604 for its display, and in situations when a smart device like smartphone is mounted on the sun visor, then the smartphone's display screen would be used by the virtual reality headset for its display. One or ordinary skill in the art would recognize that all the regular components of a virtual reality headset such as lens 2608, display screen holder, audio, side strap 2610, top strap 2612, proximity sensor 2614, touch pad, back button, enclosing, etc would also be present on the virtual reality headset 2604 embedded or attached to the sun visor. Such virtual reality headsets 2604 would also have the capability to display the holograms, wherein the 3D augmented reality images can be displayed to the users. At any time, a user would be able to either attach or detach the virtual reality headset 2604 from the sun visor device or the sun visor itself 2602.

According to an embodiment of the present invention, a virtual reality headset 2604 can also be attached to the sun visor device or the sun visor itself using a hinge mechanism 2616, 2618, wherein the hinge mechanism 2616, 2618 would comprise of one or multiple hinges installed at the bottom of the sun visor device or the sun visor itself 2602, and there would be a connecting rod 2620, 2622 that's connected to the said hinge mechanism 2616, 2618 on one end and connected to virtual reality headset 2604 on the other end. With the help of the said hinge mechanism 2616, 2618, the said connecting rod 2620, 2622 would be able to rotate 360 degrees alongside the sun visor device or the sun visor itself 2602, and since the virtual reality headset 2604 is connected to the connecting rod 2620, 2622 on one end, the virtual reality headset 2604 would also be able to rotate 360 degrees alongside the sun visor device or the sun visor itself 2602, wherein the virtual reality headset 2604 can be either stowed at the back of the sun visor 2602, or the virtual reality headset 2604 can also be brought in front of the sun visor 2602 and used in conjunction with either the sun visor's display screen 2606 or the smart device attached to the sun visor.

Note—At any time, a user would be able to either attach or detach the virtual reality headset 2604 from the sun visor device or the sun visor itself 2602. For example, the virtual reality headset 2604 would be attachable/detachable from the connecting rod 2620, 2622 itself such that virtual reality headset can be attached or removed from the smart sun visor assembly at any time. In another example, a virtual reality headset 2604 along with the connecting rod 2620, 2622 would be attachable/detachable from the hinges 2616, 2618 such that virtual reality headset can be attached or removed from the smart sun visor assembly at any time.

The said sun visor device or sun visor itself 2602 can also comprise of clips 2624, 2626 on its sides such that when the virtual reality headset 2604 is brought in front of the sun visor 2602, then the clips 2624, 2626 can be used to clip the virtual reality headset 2604 to either the sun visor device or sun visor itself 2602. Along the same lines, a user would also be able to unclip the virtual reality headset 2604 from the sun visor device or the sun visor itself 2602, and stow it at the back of the sun visor 2602. The said clips 2624, 2626 would be attached to sun visor device or sun visor itself 2602 using hinges or hinge mechanism 2628, 2630, wherein if the virtual reality headset 2604 is moved and stowed at the back of the sun visor, then clips 2624, 2626 on the sun visor device or sun visor itself 2602 would also be able to rotate 360 degrees and can also be used by users to clip the virtual reality headset 2604 at the back of the sun visor. When the display screen on the sun visor is smaller in length as compared to the sun visor itself, then the sun visor can also be configured such that the user would be able to bend or fold the sun visor on the sides. In addition, the sun visor assembly can also comprise of an extensible feature using extensible rods, retractable wire, etc., wherein a user would be able to pull the entire assembly of sun visor along with the virtual reality headset closer to their face, so they don't have to bend forward to use the virtual reality headset on the sun visor system. Along the same lines, once a user is done with their use of the sun visor system, they would also be able to push the entire assembly of sun visor along with the virtual reality headset back to its original position.

Here is an example of a virtual reality headset attached or embedded on the sun visor device or the sun visor itself. Suppose that a sun visor is pulled down or deployed in front of the user, then the sun visor device's display screen would be initially facing towards the user sitting within the vehicle, however, the attached virtual reality headset would be initially facing the external view of the vehicle, or in other words, it would be initially stowed at the back of the sun visor. When the user wants to use the virtual reality headset, they would simply bring the virtual reality headset from the back towards the front of the sun visor device or sun visor itself and clip it. A user would also be able to bend the sun visor on its sides if the display screen on the sun visor wasn't using up the entire space on the sun visor. Lastly, the user would be able to pull the entire assembly of sun visor along with the virtual reality headset closer to their face, so they don't have to bend forward to use the virtual reality headset on the sun visor system.

One or ordinary skill in the art would recognize that rather than hinges just being at the bottom of sun visor device or sun visor itself, one or multiple hinges can also be installed on the sides of the sun visor device or the sun visor itself such that the virtual reality headset can be connected to such side hinges, and that would also be considered within the spirit and scope of the present invention.

One or ordinary skill in the art would recognize that rather than manually pulling the virtual reality headset from back of the sun visor to the front, there can also be an automated button or switch provided on the sun visor device, wherein when the button or switch is activated, the virtual reality headset would automatically come in front of the sun visor, and when the button or switch is deactivated, the virtual reality headset would automatically move and stow at the back of the sun visor, and that would be considered within the spirit and scope of the present invention. In addition, clipping and unclipping of the virtual reality headset on the sun visor device or the sun visor can also be programmed to be automated, wherein it can be one of the actions when the above mentioned said automated button or switch is activated or deactivated.

A charging solution for the virtual reality headsets can also be provided on the sun visor device itself, wherein the sun visor device would comprise of a usb or a socket such that the charging wire or the usb charger of the virtual reality headset can be plugged into the sun visor device's usb or socket to charge the virtual reality headset. It is to be clearly understood that there are many different ways to either charge the rechargeable batteries within the virtual reality headsets or directly supply electricity or power to the virtual reality headsets such as supplying power via the sun visor device, other built-in car chargers, wireless charging, solar charging, etc., and all those would be considered within the spirit and scope of the present invention.

According to an embodiment of the present invention, the sun visor can also comprise of a compartment at the back, wherein if the user wants then they can store or secure the sun visor device or the virtual reality headset in the said compartment. Such compartment can also have solar charging or wireless charging enabled in it using a panel of solar cells, so whenever the sun visor device or the virtual reality headset is placed in the said compartment, they would automatically get charged. The said compartment at the back of the sun visor can also be used to store or secure other items such as sun glasses, gloves, documents, etc similar to a glove compartment in a vehicle, and that would be considered within the spirit and scope of the present invention.

Figure 27:
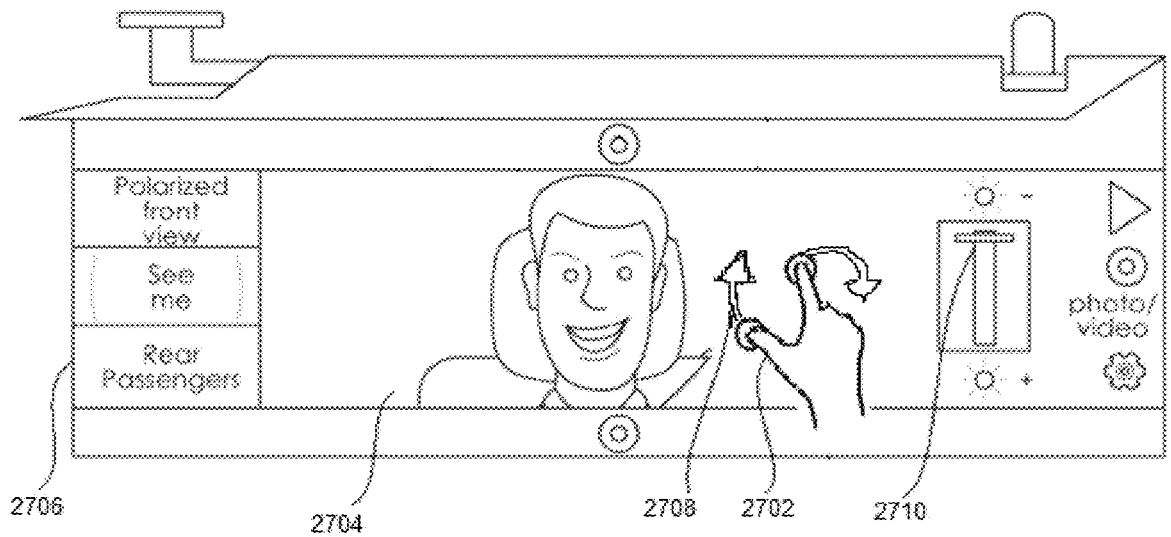
FIG. 27 illustrates that if the user touches two fingers on the display screen of the sun visor device and then rotates the fingers clockwise, then the user would be able to increase the brightness on the sun visor device's display screen rather than having to go and touch the specific brightness control button that's available on the sun visor system. In other words, based on specific or preset movement of either individual or simultaneous fingers on different parts of the display screen of the sun visor device, a user would be able to execute different functions within the sun visor system.

According to another embodiment of the present invention, as shown in FIG. 27, based on specific or preset movement of either individual or simultaneous fingers 2702 on different parts of the display screen 2704 of the sun visor device 2706, a user would be able to execute different functions within the sun visor system. For example: if the user touches two fingers 2702 on the display screen 2704 of the sun visor device 2706 and then rotates the fingers clockwise 2708, then the user would be able to increase the brightness 2710 on the sun visor device's display screen rather than having to go and touch the specific brightness control button that's available on the sun visor system. Similarly, if the user touches two fingers on the display screen of sun visor and then rotates the fingers counterclockwise, then the user would be able to decrease the brightness on the sun visor device's display screen, and so on. Similar to above example, other combination of individual or simultaneous finger touches at different locations on the sun visor device's display screen would be allowed to execute different functions on the sun visor device, and that would be considered within the spirit and scope of the present invention.

Figure 28:
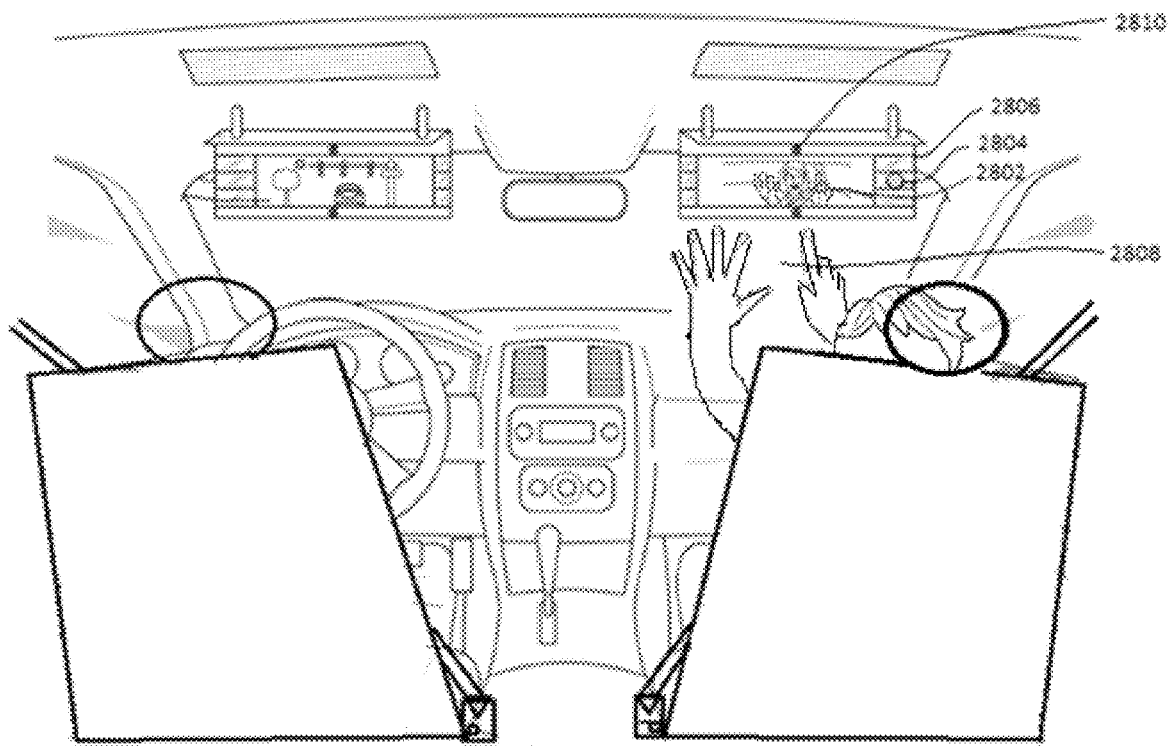
FIG. 28 illustrates that the sun visor system can comprise of a non-touch selfie function, which would allow the users to take selfie photos/videos without even touching the photo/video button on the sun visor device. Using either a single or combination of hand gestures, a user would be able to instruct the camera associated with the sun visor device to take the selfie photo/video after a few seconds (for example: 5 seconds) once instructed. In addition, a hand gesture can also comprise be raising of the hand or hands with a specific number of fingers raised, wherein the number of fingers raised would indicate the number of seconds that the camera associated with sun visor device should wait before taking the selfie photo/video. For example: as shown in the figure, when both hands with a total of six fingers are raised, then the camera associated with sun visor device would wait six seconds before taking the selfie photo/video.

According to an embodiment of the present invention, as shown in FIG. 28, the sun visor system would also comprise of a software module, which would allow the users to take selfie photos/videos 2802 without even touching the photo/video button 2804 on the sun visor device 2806. Such non-touch selfie function would be accomplished by either using a timer to take photos/videos or using a single or combination of hand gestures 2808 that instructs the camera 2810 associated with the sun visor device 2806 to take the selfie photo/video 2802 after a few seconds (for example: 5 seconds) once the user makes the authorized or required hand gesture 2808. This non-touch selfie function would be available for all camera views of the sun visor system, wherein a user would be able control if the non-touch selfie function would be enabled or disabled by default for different camera views via the settings screen of the sun visor system. There can also be a button or toggle available on the camera view itself wherein a user can enable or disable the non-touch selfie function.

Some examples of the hand gestures to instruct the camera 2810 associated with the sun visor device 2806 to take the selfie photo/video 2802 can be a 'V' symbol using two fingers, thumbs up, thumbs down, both hands up, rectangle made using two fingers of both hands, camera click action by showing an index finger and thumb as if the user was pressing the camera button commonly present on traditional digital cameras, etc. Another example of hand gesture 2808 can also be raising of the hand or hands with a specific number of fingers raised, wherein the number of fingers raised would indicate the number of seconds that the camera associated with sun visor device should wait before taking the selfie photo/video. For example: As shown in FIG. 28, if both hands were raised with total of six fingers raised, then the camera associated with sun visor device would wait six seconds before taking the selfie photo/video. To avoid the issue of sun visor's non-touch selfie function taking unasked photos/videos when a user didn't really intend to take them, instead of making an individual hand gesture as mentioned above, there can also be a combination of hand gestures set in the system to indicate or communicate to the non-touch selfie function to take photos/videos. For example, it can be set in the sun visor system that after making any of the above mentioned individual hand gestures, if the user flips or turns around that particular hand gesture to show the opposite side of their hand or hands, then that would be considered as double confirmation for the non-touch selfie function of the sun visor device to take the requested photo/video. A user would be able to set in the setting if they wish to enable either single or combination of hand gestures to be able to take non-touch selfie photos/videos using the sun visor device.

One or ordinary skill in the art would also recognize that similar to above mentioned hand gestures to indicate the camera associated with sun visor device to begin taking the selfie video, there can also be a variety of hand gestures that can be set in the sun visor system in order to indicate to the system to stop taking the video, and all of those would be considered within the spirit and scope of the present invention. One or ordinary skill in the art would recognize that an individual hand gesture or the combination of hand gestures used to instruct the camera associated with the sun visor device to take the photo/video can be made in many different ways and all of those would also be considered within the spirit and scope of the present invention.

According to an embodiment of the present invention, the sun visor system can also comprise of a software module, which would automatically identify the faces of the people using image recognition in any of the photos/videos taken using the sun visor system and would either automatically share those photos/videos with other pre-assigned people, or provide a feature to the user to be able to select which photos/videos should be shared.

According to an embodiment of the present invention, any of the camera views on the sun visor display screen would be expandable to full screen mode covering the entire display screen of the sun visor, wherein the navigation section listing different camera view buttons, or the setting button, etc would not take up screen space while a particular camera view is being displayed in the full screen mode. Similarly, a user would also be able to restore a camera view from the full screen mode to its regular size, wherein the navigation section listing different camera view buttons, settings button, etc would also be visible on the display screen of the sun visor. An alternate is that as soon as a user selects a particular camera view on the sun visor's display screen, it would automatically show that camera view in full screen mode covering the entire display screen of the sun visor. A user would be able to get out of such automatic full screen mode at any time and restore the camera view to regular size, wherein the navigation section listing different camera view buttons, settings button, etc would become visible on the display screen of the sun visor.

According to an embodiment of the present invention, the sun visor system mentioned in this invention would also comprise of a software module for a smart personal assistant, which would utilize different web services to be able to answer users' questions, inform about upcoming events at nearby locations, latest news, weather, make suggestions for restaurants, nearby gas stations, etc. One or ordinary skill in the art would recognize that such smart personal assistant of the sun visor device would act very similar to the smart personal assistant available on the smartphones. Moreover, the smart personal assistant of the sun visor system would also learn users' behavior using machine learning software, make recommendations and would constantly try to help the vehicle passengers while traveling in the vehicle. In order for the users to enable such smart personal assistant on the sun visor device, there can be a button, switch, fingerprint sensor, voice recognition software or other similar biometric recognition technology on the sun visor device.

The smart personal assistant on the sun visor system would also have the feature available to alarm or remind the user for the different reminders or tasks that the user had previously requested or set up in the system, or even the other tasks that smart personal assistant identifies based on its machine learning software. One or ordinary skill in the art would recognize that the smart personal assistant on the sun visor system would also be able to accomplish other tasks such as calling a friend's phone, calling 911 in case of emergency, play music, display photos/videos, open other applications on sun visor device, provide navigation instructions, etc, and would also include other regular features that are commonly provided by smart personal assistants on smartphones, and all of those would be considered within the spirit and scope of the present invention.

According to an embodiment of the present invention, when a user is sleepy while driving, then they will be able to request the smart personal assistant on the sun visor system to try to keep them awake. In this situation, the personal smart assistant would use the sensors and cameras associated with the sun visor device to monitor the user and do a number to things that can keep the user awake such as trigger an alarm, make noise, play music, play photos/videos, activate vibration on sun visor device, talk to the user to try and engage them in a conversation, call a user's friend if it's reasonable time of the day, suggest the user to rest if nothing is keeping the user awake, etc.

Figure 29:
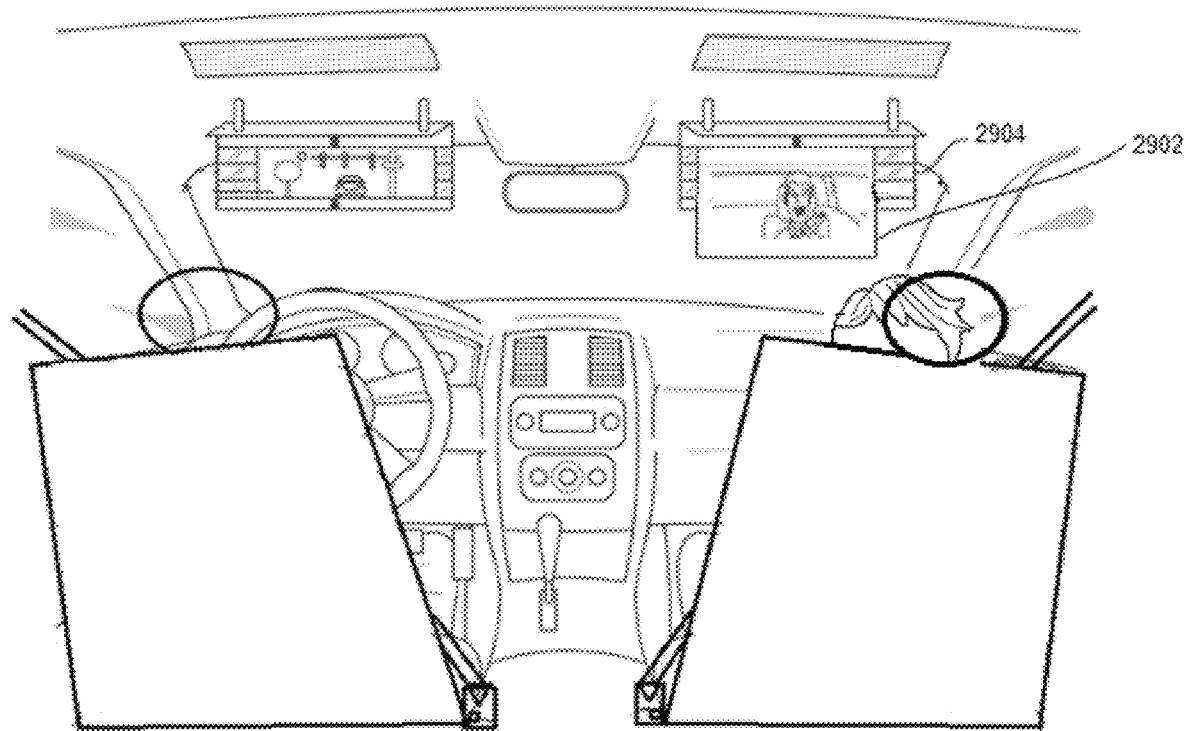
FIG. 29 illustrates that the sun visor device can also have a bigger display screen that can extend beyond the sun visor, wherein the said display screen on the said sun visor device would be foldable and/or unfoldable. When the users want, they would be able to extend the display screen by unfolding the screen on the sun visor device, and once the users are done using the extended display screen, they would be able to fold the display screen back on the sun visor device. In addition, the said foldable display screen of the sun visor device would comprise of dual side screens, wherein even if the display screen of the sun visor is folded in one or multiple folds, it would continue to show the display on the screen whether it's the front or back of the folded display screen.

According to an embodiment of the present invention, as shown in FIG. 29, the sun visor device 2904 can also have a bigger display screen 2902 that can extend beyond the sun visor, wherein the said display screen 2902 on the said sun visor device 2904 would be foldable. Once the users are done using the extended display screen 2902, they would be able to fold the display screen 2902 back on the sun visor device 2904. For example, the display screen on the sun visor device can be foldable in half from top to bottom, or foldable like a paper roll, or foldable in multiple folds either from top to bottom and/or left to right, etc. Similar to the display screen on the sun visor device being foldable, it would also be unfoldable. Users would be able to manually or automatically fold or unfold the display screen 2902 of the sun visor device 2904, wherein automatic unfolding or folding can be triggered in a number of ways such as using a touch button, voice activation, button or switch on sun visor device, hand gestures, power on/off of the sun visor system, turning on/off of the vehicle ignition, unlocking/locking of the vehicle, etc. When the sun visor's display screen is unfolded to make it a bigger screen, the display on the screen would still appear seamless to the users without any cuts or lines near the edges of each fold.

One or ordinary skill in the art would recognize that even when the display screen of the sun visor isn't extended beyond the sun visor, or in other words, the display screen isn't bigger than the sun visor, the said display screen of the sun visor would still be foldable or unfoldable, and that would be considered within the spirit and scope of the present invention.

According to an embodiment of the present invention, the said foldable display screen of the sun visor would comprise of dual side screens, wherein even if the display screen of the sun visor is folded in one or multiple folds, the display dimensions would automatically resize according to the folded display screen and would continue to show the display on the screen whether it's front or back of the folded display screen.

According to an embodiment of the present invention, when one of the internal camera views such as 'See me' view, 'Panoramic view', etc is displayed on the sun visor's display screen, however if it's dark inside the vehicle, then the light sensor would detect the darkness and turn on the associated light bulb or bulbs within the vehicle, so the camera view on the sun visor display screen can clearly display the image. Similarly, when an internal camera view such as 'See me' view, 'Panoramic view', etc is stopped or is no longer displayed on the sun visor's display screen, then the associated light bulb or bulbs that were previously turned on in the vehicle would be automatically turned off. One or ordinary skill in the art would recognize that depending upon the internal camera view activated on the sun visor's display screen, one or more light bulb or bulbs would be accordingly turned on within the vehicle. For example, if the 'See me' internal camera view was activated on the sun visor's display screen, then only the light bulb next to the user who was watching the 'See me' camera view would be turned on. In another example, if the 'Panoramic' internal camera view was activated on the sun visor's display screen, then one or multiple light bulbs would be turned on in the vehicle such that all passengers in the 'Panoramic view' can be easily visible. One or ordinary skill in the art would recognize that the said light bulb or bulbs can be located anywhere in the vehicle as long as they can make the associated image of the camera view clearly visible on the sun visor's display screen, and that would be considered within the spirit and scope of the present invention.

Figure 30:
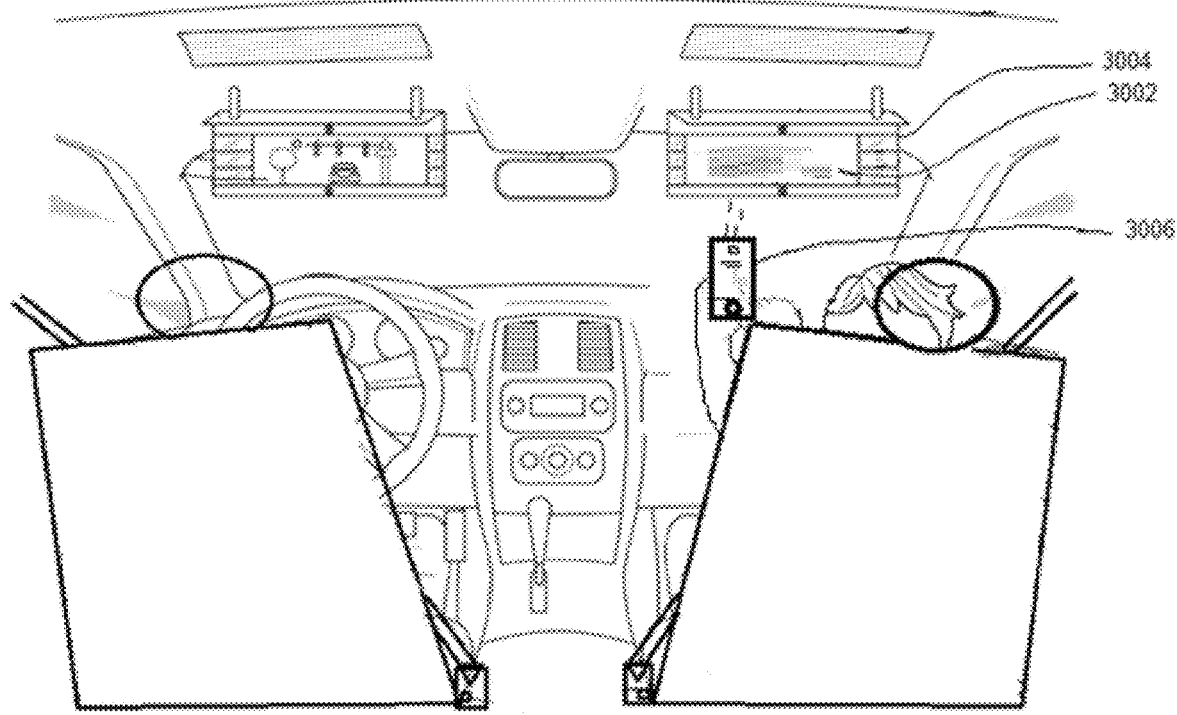
FIG. 30 illustrates that vehicle users can also wirelessly stream content from their smart devices such as smartphones, tablets, etc on to the display screen of the sun visor device. Users will be able to select either specific applications from their smart device for streaming on the sun visor's display screen, or the users will also be able to stream entire smart device's screen on the sun visor's display screen.

According to an embodiment of the present invention, as shown in FIG. 30, the sun visor device would also comprise of a built-in streaming hardware, which would allow the user to connect their smart devices 3006 such as smartphones, tablets, etc. and stream content from smart devices 3006 on to the display screen 3002 of the sun visor device 3004. The said built-in streaming hardware would either share some of the components already present within the sun visor device or it can separately comprise of its own components such as a system-on-a-chip processor, wireless receiver, Bluetooth, SD RAM, flash memory, WLAN wifi, cellular connection, FM module, etc.

The streaming mechanism used by said streaming hardware on sun visor device can comprise of a client and server software, wherein client software would be loaded on the smart devices 3006 or the applications on the smart devices and the server software would be loaded on the sun visor device 3004. Users will be able to select either specific applications from their smart device 3006 for streaming on the sun visor's display screen 3002, or the users will also be able to stream entire smart device screen on the sun visor's display screen. It is to be clearly understood that along with the screen, any associated audio can also be streamed from the smart device to the sun visor device so that the sun visor device will be able to play the associated audio. However, if the user doesn't want the audio to be streamed to the sun visor device i.e. they want to listen to audio using their smart device and just stream the screen on the sun visor device, then the users will be able to do so using the streaming options provided to them. The said streaming mechanism would allow all the front and the rear seat passengers to stream content from their individual smart devices on to their own sun visor device's display screen. One or ordinary skill in the art would recognize that a user would also be able to connect and stream the content from their smart device to multiple sun visor devices without departing from the spirit and scope of the present invention. For example, a passenger sitting in the front row of the vehicle can also connect to multiple sun visor devices installed on the rear seat row and stream a video for their kids on the rear seat sun visor devices.

One or ordinary skill in the art would recognize that an external streaming set-top box can also be connected to the sun visor device, for example, using the HDMI port of the sun visor device, which would function similar to the built-in streaming hardware mentioned above and allow users to stream content from their smart devices on to the display screen of the sun visor device, and that would be considered within the spirit and scope of the present invention.

According to an embodiment of the present invention, the display screen of the sun visor device can also act as a projector screen, wherein the users can connect their smart devices such as smartphones, tablets, etc to the sun visor device using either wired or wireless connection and project content from smart devices on to the display screen of the sun visor device.

According to an embodiment of the present invention, the sun visor device on the sun visor would be water resistant, wherein individual or combination of different methods can be used to accomplish said water resistance. For example, the sun visor device can be covered with nano particle water resistant coating inside and out to make it water resistant, or silicone can be applied over any edges to avoid the water from getting inside the sun visor device, or ultrasonic welding can also be used to join the panels together in order to avoid water from getting inside the sun visor device, and so on. One or ordinary skill in the art would recognize that any other water resistant methods can also be used as long as it helps to make the sun visor device water resistant, and that would be considered within the spirit and scope of the present invention.

Figure 31:
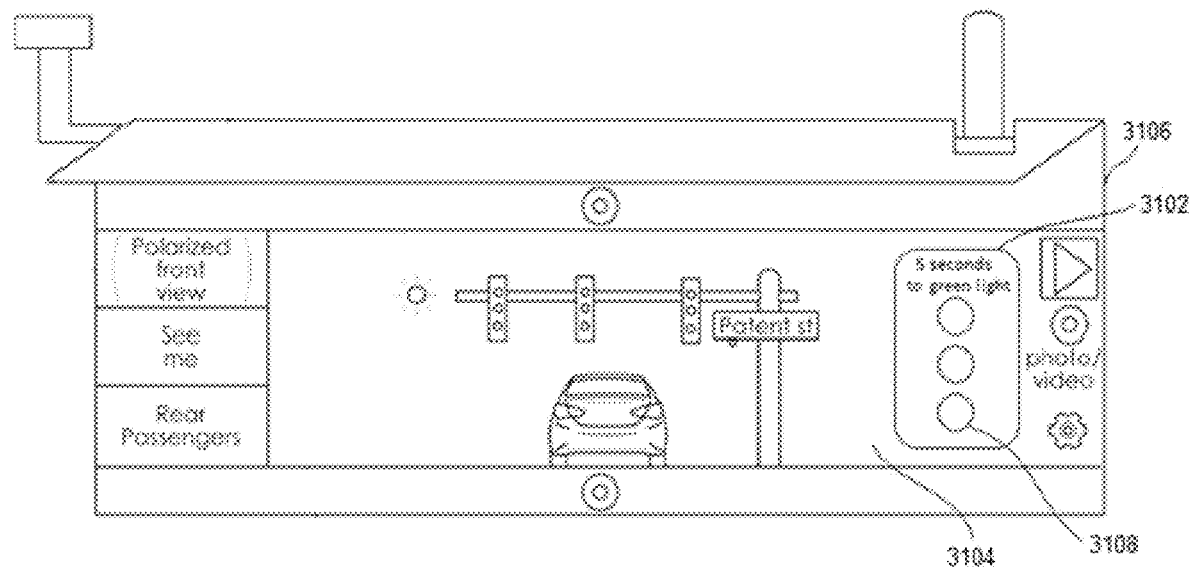
FIG. 31 illustrates that the sun visor device would automatically display a traffic light countdown timer (for example: '5 seconds to green light', '4 seconds to green light', etc) on the display screen of the sun visor device when the vehicle is stopped at a red traffic light, wherein the traffic light countdown timer would inform the users how much time is remaining before the traffic light would turn green. As shown in the figure, there is also a traffic light status image showing red, yellow and green lights, wherein the red light would be initially highlighted on the display screen of the sun visor device, and then when the traffic light countdown timer reaches zero, then the traffic light status image would automatically highlight the green light and remove the highlight from the red light.

According to an embodiment of the present invention, as shown in FIG. 31, the sun visor device would also comprise of a software module to automatically display a traffic light countdown timer 3102 (here are some examples: '5 seconds to green light', '4 seconds to green light', '3 seconds to green light', '2 seconds to green light', '1 second to green light', etc) on the display screen 3104 of the sun visor device 3106 when the vehicle is stopped at a red traffic light, wherein the traffic light countdown timer 3102 would inform the users how much time is remaining before the traffic light would turn green. The said traffic light countdown timer 3102 would gather the traffic light changing information from the public real-time databases provided by local government websites, web services or similar sources and technology. A user will be able to set in the settings if they wish to display the said traffic light countdown timer on either all camera views or just some of the selected camera views of the sun visor device. Users can also set that when the traffic light turns green, then the traffic light countdown timer would be automatically removed from the display screen of the sun visor device.

One or ordinary skill in the art would recognize that the traffic light countdown timer 3102 can also be set to continuously display on the display screen 3104 of the sun visor device 3106, wherein once a traffic light is crossed by the vehicle, the traffic light countdown timer would start displaying the countdown timer for the upcoming traffic light, and so on. To avoid any confusion, there would also be a traffic light status image 3108 showing red, yellow and green lights, wherein the red light would be initially highlighted on the display screen 3104 of the sun visor device 3106, and then when the traffic light countdown timer 3102 reaches zero, then the traffic light status image 3108 would automatically highlight the green light and remove the highlight from the red light.

There would be an additional safety check in the sun visor system, wherein if the traffic light countdown timer 3102 reaches zero, i.e. the traffic light status image 3108 highlights green light, however, the actual traffic light signal according to the sun visor's front camera view is different, i.e. the signal hasn't turned green, then the vehicle computer would immediately inform the users via different alerts such as displaying an alert on sun visor's display screen, voice alert, etc, so that an accident can be avoided. In the above mentioned situation, vehicle computer can even be programmed to automatically apply the brakes when a difference is found between the traffic light countdown timer and the actual traffic light signal view on the sun visor device. One or ordinary skill in the art would recognize that such traffic light countdown timer, traffic light status image, or the actual traffic light signal showing on the camera view can also be present on different dashboard screens available in the vehicle, and that would be still be considered within the spirit and scope of the present invention.

According to an embodiment of the present invention, the navigation system of the vehicle and the said traffic light countdown timer of the sun visor device can also be integrated together, wherein depending upon the upcoming directions of the navigation system and the associated traffic light, the traffic light countdown timer would automatically display the countdown timer for that upcoming traffic light. Such traffic light countdown timer can also be displayed on the navigation system itself along with map, street names, etc, wherein the navigation system itself can also be displayed on the sun visor's display screen itself.

According to another embodiment of the present invention, the sun visor device can also comprise of a fingerprint touch ID button, which would help to authorize users to be able to use the sun visor system and/or to load the sun visor system settings for that user. One or ordinary skill in the art would recognize that voice detection or other similar biometric recognition technology such as retina detection, etc, that can allow a user to authorize themselves on the sun visor system can also be used without departing from the spirit and scope of the present invention.

One or ordinary skill in the art would recognize that instead of any regular buttons on the sun visor device, the pressure sensing haptic buttons can also be used on the sun visor device without departing from the spirit and scope of the present invention.

Figure 32:
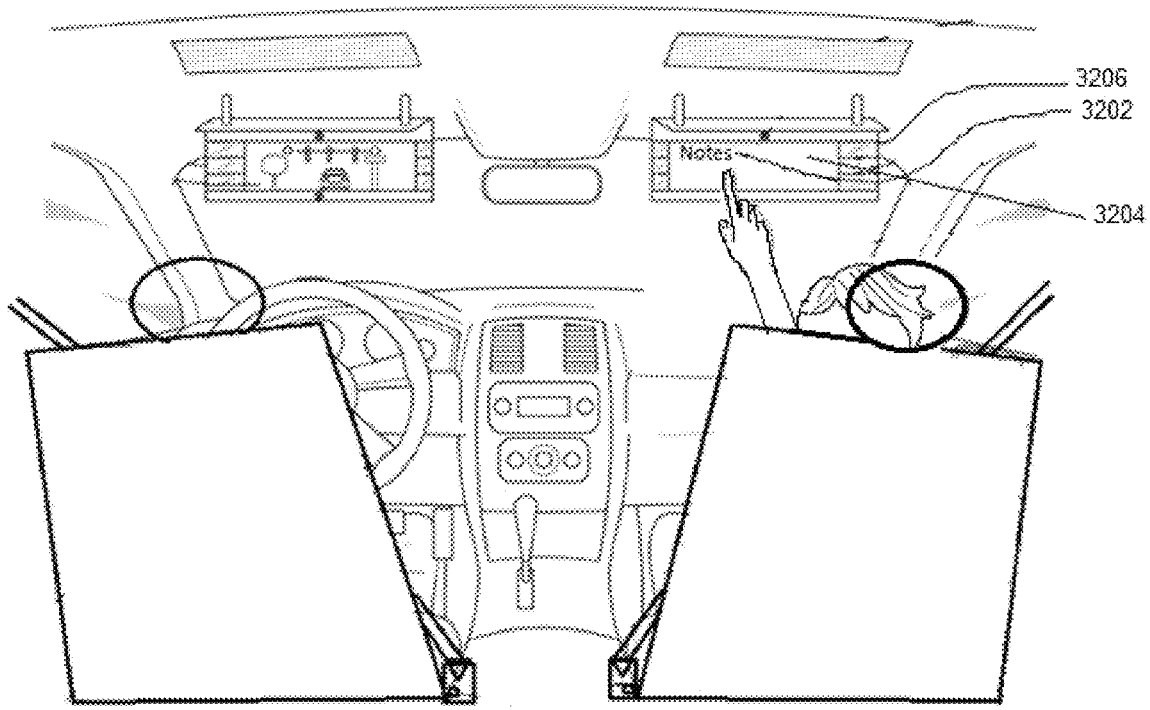
FIG. 32 illustrates that the sun visor device can comprise of a notepad software module, which would allow the users to write or take notes on the display screen of the sun visor device either using the keyboard available on the sun visor's display screen or by directly handwriting on the display screen using a finger.

According to an embodiment of the present invention, as shown in FIG. 32, the sun visor device would also comprise of a notepad software module, which would allow the users to write or take notes 3202 on the display screen 3204 of the sun visor device 3206 either using the virtual keyboard available on the sun visor's display screen, an external keyboard connected to the sun visor device, or by directly handwriting on the display screen using a finger or stylus. The said notes would be stored on the sun visor device's built-in memory, and similar to photos/videos functionality on the sun visor system, the said notes can also be automatically or manually transferred to the user's smart device such as smartphone, tablet, etc.

One or ordinary skill in the art would recognize that the smart sun visor device mentioned in this invention can be installed, embedded or mounted in the vehicle not only for the front seat sun visors but also for the rear seat sun visors, wherein even the center seat passengers can have their own smart sun visor device, and that would be considered within the spirit and scope of the present invention.

Figure 33:
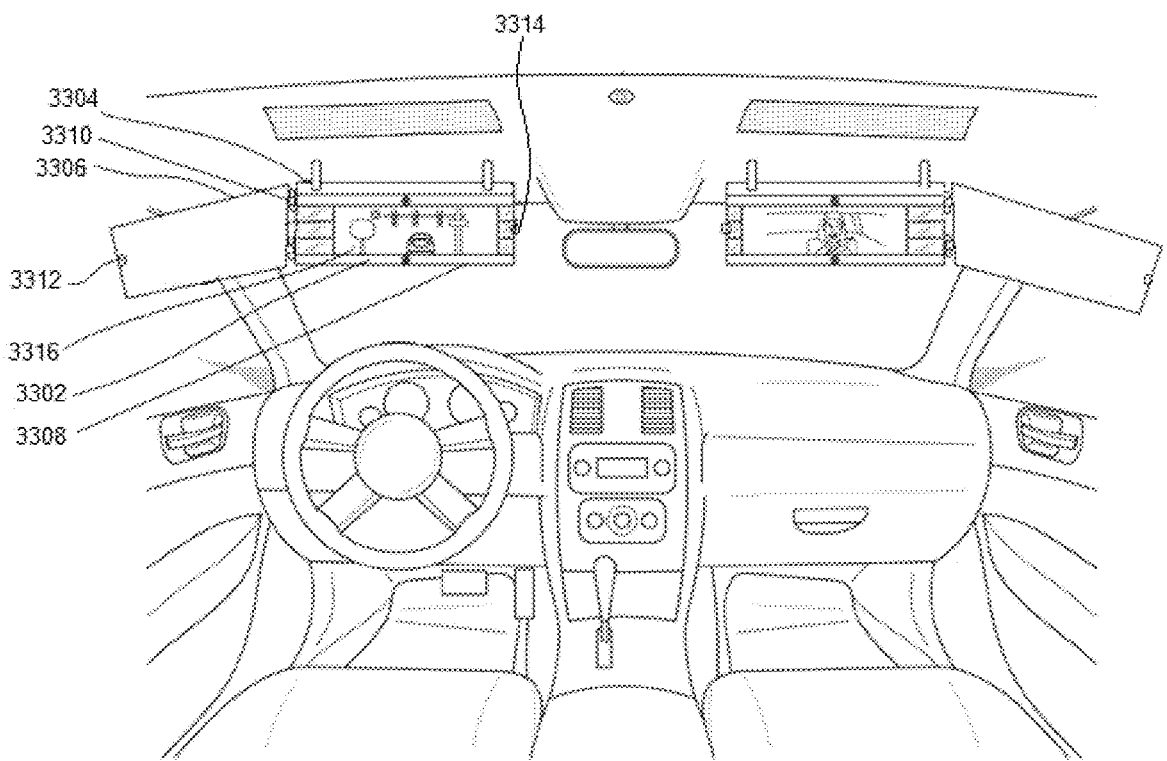
FIG. 33 illustrates that a sun visor device can be installed, embedded or mounted in the middle or in between the sun visor. The said sun visor would comprise of two layers, wherein the top layer would be connected to the bottom layer using a hinge mechanism on one of the sides, and the top layer would be temporarily attached to the bottom layer on the opposite side using an attaching mechanism such as a magnet, lock/release button, etc. The said top layer of the sun visor would act similar to the cover of the sun visor device, wherein once the sun visor is pulled down or deployed and the said top layer of the sun visor is unattached from the said bottom layer, then the sun visor device would become visible to the users.
Figure 34:
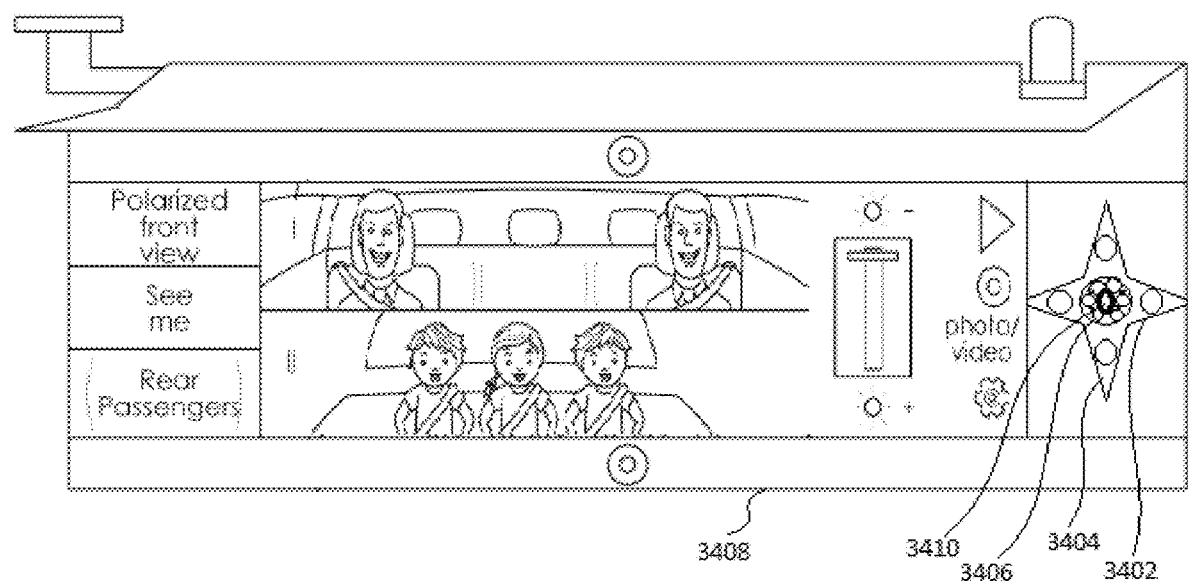
FIG. 34 illustrates a fidget spinner located on the right side of the display apparatus.

According to an embodiment of the present invention, as shown in FIG. 33, a sun visor device 3302 mentioned in this invention can also be installed, embedded or mounted in the middle or in between the sun visor 3304. The said sun visor would comprise of two layers, wherein the top layer 3306 would be connected to the bottom layer 3308 using a hinge mechanism 3310 on one of the sides, and the top layer 3306 would be temporarily attached to the bottom layer 3308 on the opposite side using an attaching mechanism 3312, 3314 such as a magnet, lock/release button, etc. The said sun visor device can be installed, embedded or mounted either inside the sun visor's top layer or on the sun visor's bottom layer depending upon the location of the sun visor within the vehicle. One or ordinary skill in the art would recognize that the top layer of the sun visor acts similar to the cover of the sun visor device, wherein once the sun visor 3304 is pulled down or deployed and the top layer 3306 of the sun visor is unattached from the bottom layer 3308, then the sun visor device 3302 would become visible to the users. The sun visor system would also comprise of a software module to automatically turn on the sun visor device's LCD touch screen display 3316 when the cover of the sun visor is opened i.e. the top layer 3306 of the sun visor is unattached from the bottom layer 3308, and the software module would automatically turn off the sun visor device's LCD touch screen display 3316 when the cover of the sun visor is closed i.e. the top layer 3306 of the sun visor is attached back to the bottom layer 3308.

An additional advantage of the multiple layers of the sun visor is that when the sun visor is pulled down or deployed, and the top layer of the sun visor is fully opened, then the two layers of the sun visor would automatically provide protection from the sun on two sides, which would help the users so they don't have to keep moving their sun visor from one side to another to protect from sunlight. In addition, based on the sun visor's location within the vehicle, the multiple layers of the sun visor would also allow the sun visor device to be installed on either one of those two layers of the sun visor such that when the sun visor is fully deployed with its top layer i.e. cover opened, then the sun visor device would always face the front of the user.

According to an embodiment of the present invention, a sun visor device on the sun visor can also slide down such that when the sun visor is slid, the sun visor device would start coming out of the sun visor's bottom boundary. However, near the bottom boundary of the sun visor, the slider on both sides of the sun visor would end such that the sun visor device can rest at the said bottom boundary when it's extended out of sun visor i.e. the sun visor device wouldn't fall out of the sun visor. It often occurs that people face the bright sun when the sun is visible in between the pulled down sun visor and the vehicle dashboard, however, this feature of the sun visor device, which slides down would indirectly provide an extended sun visor and block the bright sun from hitting user's eyes, and at the same time, the sun visor device can also display any camera view including polarized image of the front view on its screen that might be getting blocked either due to the pulled down sun visor or the slid down of the sun visor device.

The sun visor system would also comprise of a software module to automatically turn on the sun visor device's LCD touch screen display when the sun visor device is slid down from the sun visor, and the software module would also automatically turn off the sun visor device's LCD touch screen display when the sun visor device is slid up and stowed back to its original position on the sun visor.

A fidget spinner 3402 is a device that includes a metal or plastic structure, along with one or more bearing 3406 in the center, such that the metal or plastic structure can spin around its axis. The fidget spinner structure tends to be a multi-lobed 3404, however one of ordinary skill in the art would recognize that the fidget spinner structure can be any shape, such as a circle, square, rectangle, heart, X-shaped, triangle, etc, as long as there is one or more bearings in the center and the structure can spin around it.

According to an embodiment of the present invention, the sun visor device 3408 will include an attachment 3410 that will protrude from the left or the right side of the sun visor device 3408 and connect to the fidget spinner 3402 thereby securing the fidget spinner to attachment 3410. The fidget spinner 3402 will be attached parallel to the sun visor device 3408. The fidget spinner will be attached in such a way that the fidget spinner structure can spin on the surface of the sun visor device 3408 without touching the sun visor device 3408.

The fidget spinner 3402 can either be embedded into the sun visor device or it can be manually attached by a user of the sun visor device 3408. For example, when a fidget spinner 3402 is embedded on the sun visor device 3408, and the user lowers the sun visor in their vehicle, the embedded fidget spinner 3402 will become visible to the user and will be facing the user. Similarly, when the user raises the sun visor to its original position, the fidget spinner 3402 will face towards the ceiling of the vehicle and will no longer be visible to the user. In another example, in a manually attached fidget spinner scenario, a user will be able to attach their fidget spinner 3402 on the sun visor device 3408. In a manually attached fidget spinner, the fidget spinner will be removable and reattachable to the sun visor device 3408, such that the fidget spinner can be used separately from the device.

The fidget spinner 3402 will be attached on the right or the left side of the sun visor device 3408, however one of ordinary skill in the art would recognize that the fidget spinner 3402 can also be attached anywhere on the sun visor device 3408, such as on the top or bottom, front or back. The fidget spinner would be attached on an extension of an area on the sun visor device where the display screen is not placed. For example, if the display screen is on the right of the sun visor device 3408 then the fidget spinner will be attached on the remaining area of the sun visor device 3408 on the left. In another example, if the display screen is on the left of the sun visor device 3408 then the fidget spinner will be attached on the remaining area of the sun visor device 3408 on the right. However, one of ordinary skill in the art would recognize that the fidget spinner 3402 is not limited to this area, and can be attached on the display screen or some other part of the sun visor device 3408, or mounted anywhere inside the vehicle. One of ordinary skill in the art would recognize that there can be multiple fidget spinners attached to the sun visor device 3408, and that would be within the spirit and scope of the present invention. In addition, one of ordinary skill in the art will appreciate that the fidget spinner may be a virtual fidget spinner instead of a mechanical fidget spinner.

One or ordinary skill in the art would recognize that instead of any regular lens on the cameras associated with the sun visor device, dual lens camera system can also be used without departing from the spirit and scope of the present invention.

One or ordinary skill in the art would recognize that instead of the headphone jack on the sun visor device, Lightning tipped and/or Bluetooth connected headphones or other technological advanced headphones can also be used without departing from the spirit and scope of the present invention.

One or ordinary skill in the art would recognize that instead of LCD or LED touch screen on the sun visor device, OLED, Active Matrix Organic Light-Emitting Diode (AMOLED), etc or other future screen technology can also be used without departing from the spirit and scope of the present invention.

An alternate is that rather than displaying any of the camera views such as 'Polarized front view', 'See me', 'Rear passengers', 'Child seat', 'Front passengers', 'Rear view', 'Panoramic view', or any other camera views on the sun visor's LCD display screen, they can also be displayed on any other LCD or display screens available in any other part of the vehicle, and that would be considered within the spirit and scope of the present invention.

According to an embodiment of the present invention, a camera, display apparatus, computer processor, rechargeable battery, and non-volatile computer memory are incorporated into a housing to create a sun visor video device resembling a tablet PC. This sun visor device fits into a molded form within the sun visor and a cutaway for the camera opens toward the front of the vehicle. This sun visor video device can be removed or detached from the sun visor body and used to capture images, view images, share images, etc. independently of the sun visor. Alternatively, the sun visor device may attach to whatever sun visor hinge system is used in the vehicle, taking the place of the sun visor itself. The sun visor hinge system and the sun visor device may be configured to allow the sun visor device to be detached and reattached to the sun visor hinge system to allow the sun visor device to be used independently. Alternatively, the sun visor device of the present invention may have clips at the corners which allow the corners to wrap around, and clip onto, the edges or corners of the sun visor in a similar fashion to a cell phone case. The camera may be incorporated into one of the clips that wraps around the sun visor so that the camera can face the front of the vehicle when the sun visor is deployed. One or ordinary skill in the art would recognize that any method of removably attaching or mounting the sun visor device to the sun visor or sun visor hinge system may be used without departing from the spirit and scope of the present invention.

One or ordinary skill in the art would recognize that throughout this specification, 'sun visor device', 'sun visor system', 'smart sun visor', 'smart vehicle sun visor' or 'digital sun visor' phrases can be used interchangeably without departing from the spirit and scope of the present invention.

One or ordinary skill in the art would recognize that throughout this specification, the following phrases—"sun visor's display screen", "display screen of the sun visor system", "display screen of the sun visor", "display screen of the sun visor device" can be used interchangeably without departing from the spirit and scope of the present invention.

One or ordinary skill in the art would recognize that throughout this specification, 'LCD' or 'LED' words can be used interchangeably without departing from the spirit and scope of the present invention. One or ordinary skill in the art would recognize that the sun visor device or the sun visor system mentioned in this invention can be applicable to any vehicle, whether it's the traditional vehicles or the autonomous self-driving vehicles, and all of those would be considered within the spirit and scope of the present invention.

Many alterations and modifications may be made by those having ordinary skill in the art without departing from the spirit and scope of the embodiments. Therefore, it must be understood that the illustrated embodiment has been set forth only for the purposes of example and that it should not be taken as limiting the embodiments as defined by the following embodiments and its various embodiments.

Therefore, it must be understood that the illustrated embodiment has been set forth only for the purposes of example and that it should not be taken as limiting the embodiments as defined by the following claims. For example, notwithstanding the fact that the elements of a claim are set forth below in a certain combination, it must be expressly understood that the embodiments includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the embodiments is explicitly contemplated as within the scope of the embodiments.

The words used in this specification to describe the various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the embodiments.

What is claimed is:

1. An automotive audio visual system comprising:
   a plurality of cameras;
   a display apparatus comprising a display screen, wherein said display apparatus is integrated into a vehicle dashboard;
   a computer processor;
   non-volatile computer memory storing computer instructions configured to:
      receive an image from at least one of said plurality of cameras,
      display said image on said display apparatus in real time;
   wherein said plurality of cameras comprise: one or more rear cameras directed to a rear passenger seat of the vehicle; and
   wherein said display apparatus is configured to display a rear passenger view produced by one or more of said plurality of cameras, in response to user input, said rear passenger view comprising multiple rear passenger rows displayed in a split view mode such that each passenger row is displayed in a separately defined section of the display screen simultaneously,
   wherein said one or more of said plurality of cameras are configured to recognize certain hand gestures as input and said processor is configured to process said input as a command to take a selfie image of a user performing the hand gestures, wherein said hand gestures comprise the user raising a hand with one or more fingers extended, wherein the number of fingers extended indicates a countdown in seconds until the camera takes the selfie.

2. The automotive audio visual system of claim 1, wherein said computer instructions are configured to:
   generate multiple rear views displayed on said display apparatus arranged in a particular sequence, either horizontally or vertically, based on user input using drag and drop functionality, wherein said user can select a camera view on said display screen and drag and drop it to another section of said display screen, which would exchange or rearrange the position of said camera views on said display apparatus as per the user's preference.

3. The automotive audio visual system of claim 2, wherein said computer instructions are further configured to display guiding gridlines on said display screen of said display apparatus when said user drags one of said camera views to another section of the screen but before they drop said camera view at that location, showing said user in advance how said camera view will be rearranged before dropping said camera view at that location.

4. The automotive audio visual system of claim 1, wherein said computer instructions are further configured to:
cause at least one of said plurality of camera views to switch to an enlarged view of one of said multiple rear views in response to user input, and
cause at least one of said plurality of camera views to switch from an enlarged view to a restored view in response to user input such that said multiple rear views become visible again on said display apparatus.

5. The automotive audio visual system of claim 1, wherein said computer instructions are further configured to:
cause at least one of said plurality of camera views to adjust focus and/or zoom in response to user input.

6. The automotive audio visual system of claim 1, wherein said computer instructions are further configured to cause at least one of said plurality of camera views to:
save a focus and/or zoom level as a default camera setting, wherein a separate default camera setting is stored for each of said one or more rear cameras, and
wherein said default camera setting is used each time the rear view of the camera associated with said default setting is displayed.

7. The automotive audio visual system of claim 1, wherein said computer instructions are further configured to cause said computer processor to:
store said camera view image and provide an option to view said recorded camera view image.

8. The automotive audio visual system of claim 1, wherein said computer instructions are further configured to cause said computer processor to:
transfer said recorded camera view image to another device either wirelessly or using a wired connection.

9. The automotive audio visual system of claim 1, further comprising:
a graphical user interface (GUI) in a display area of said display apparatus, wherein said GUI comprises:
touch screen controls comprising button objects configured to select a rear passenger camera view for display on said display apparatus, wherein said rear passenger camera view comprises a view of passengers seated in the rear section of the vehicle.

10. The automotive audio visual system of claim 9, wherein said GUI further comprises:
adjustment controls for moving the camera view up, down, left, or right.

11. The automotive audio visual system of claim 1, wherein said computer instructions are configured to cause said computer processor to:
send video chat requests to selected recipients;
send video feed from at least one of said plurality of cameras to said video chat recipients in real time;
display video feed from said recipients on said display apparatus in real time; and
exchange audio between said video chat recipients and an occupant of said vehicle in real time.

12. The automotive audio visual system of claim 1, further comprising one or more sensors in a seat belt buckle, wherein the sensor detects when said seat belt buckle is buckled and sends a corresponding signal to the vehicle computer, wherein said signal is further sent to said display apparatus to activate the display screen if it is not already activated.

13. The automotive audio visual system of claim 1, wherein said display apparatus is configured to:
display multiple rear camera views displaying both rear facing passengers and front facing passengers sitting in the rear seats of said vehicle.

14. The automotive audio visual system of claim 13, wherein said multiple rear camera views displaying both rear facing passengers and front facing passengers sitting in rear seats of said vehicle are merged together to show the combined 'Rear passengers' camera view.

15. The automotive audio visual system of claim 13, further comprising a rear seat sensor located on a ceiling of the vehicle, wherein when said "Rear passengers" camera view is selected by the vehicle user to be displayed on the display apparatus, said rear seat sensor checks whether a rear facing child car seat is installed and whether it is occupied by a child, and sends a signal to a rear facing passenger camera to automatically display an image of the child sitting in the rear facing child car seat on at least one of said multiple rear camera views on said display apparatus.

16. The automotive audio visual system of claim 13, further comprising a sensor in a chest clip of the rear facing child car seat, wherein when said "Rear passengers" camera view is selected by the vehicle user to be displayed on the display apparatus, it receives a signal from said chest clip sensor when said chest clip of the rear facing child car seat is buckled, and displays an image of a child sitting in the rear facing child car seat on at least one of said multiple rear camera views on said display apparatus.

17. The automotive audio visual system of claim 16, wherein said sensor in the chest clip of the rear facing child car seat is activated when said chest clip is buckled, and said sensor sends a signal to said display apparatus to activate the display screen if it was not already activated and automatically changes said display screen to show the 'Rear Passengers' view on said display apparatus.

18. The automotive audio visual system of claim 1, wherein said display apparatus is configured to display a "Child seat" camera view which displays an image of any of the children sitting in a rear facing child car seat or a front facing child car seat in a rear passenger row of the vehicle.

19. The automotive audio visual system of claim 18, further comprising a sensor in the chest clip of the rear or front facing child car seat, wherein when said "Child seat" camera view is selected to be displayed on the display apparatus, a signal from said chest clip sensor is transmitted, indicating that the chest clip is buckled, and displays an image of a child sitting in the car seat.

20. The automotive audio visual system of claim 1, wherein said display apparatus is configured to generate an alert that a child is still sitting in a rear passenger child car seat with their child seat belt buckled while the vehicle's ignition is turned off, wherein the sensor in the chest clip of said child seat buckle detects the buckled child seat and sends a signal to the vehicle computer, wherein said signal is further sent to said display apparatus causing it to display an alert that a child is still sitting in the rear passenger child car seat.

21. The automotive audio visual system of claim 1, wherein said display apparatus is configured to display a "Front passengers" camera view which displays an image of passengers sitting in the front row, wherein said display apparatus is visible to the rear passengers.

22. The automotive audio visual system of claim 1, wherein said computer instructions are configured to generate a non-touch selfie function that allows a rear passenger to take selfie photos/videos without touching the display apparatus by making hand gestures towards one of the rear passenger cameras, wherein a user initiates a countdown for taking the selfie photo/video by raising a certain number of fingers, wherein each finger corresponds to a number of seconds before the photo/video is taken.

23. The automotive audio visual system of claim 1, wherein said computer instructions define an occupant recognition module configured to automatically identify vehicle occupants based on at least one of voice recognition, facial recognition, object detection, or an ID sensor, wherein said display screen of said display apparatus is automatically activated upon detection of one or more vehicle occupants.

24. The automotive audio visual system of claim 1, wherein said computer instructions define a personal assistant module configured to answer user questions and is further configured to inform a user about preprogrammed items of interest.

25. The automotive audio visual system of claim 1, wherein said computer instructions define a module configured to help a rear passenger stay awake by monitoring the rear passenger and providing stimuli in the form of at least one of: activate an alarm, generate audio, play music, play photos/videos, generate a vibration, talk to the rear passenger to try and engage them in a conversation, or call a friend.

26. The automotive audio visual system of claim 1, further comprising: a switching mechanism configured to cause said display apparatus to turn on and/or off in response to said switching mechanism.

27. The automotive audio visual system of claim 1, wherein said display apparatus is configured to accept input from a user in the form of a preset movement of one or more fingers on different parts of the display screen of said display apparatus to execute different functions available on the display apparatus.

28. The automotive audio visual system of claim 1, wherein said display apparatus is configured to accept as input a user touching the display screen with two fingers and then sliding the two fingers in a clockwise direction, wherein said input causes an adjustment to the display screen brightness.

29. A method of viewing one or more passengers in a vehicle, each of which is seated in a rear passenger seat of the vehicle, the method comprising the steps of:
receiving at a display apparatus an image from at least one camera directed to a rear passenger seat of the vehicle;
inputting on said display apparatus a request to view one or more rear passengers in the vehicle;
viewing on said display apparatus a rear passenger view produced by said at least one camera, said rear passenger view comprising multiple rear passenger rows displayed in a split view mode such that each passenger row is displayed in a separately defined section of the display screen simultaneously,
wherein said at least one camera is configured to recognize certain hand gestures as input and said processor is configured to process said input as a command to take a selfie image of a user performing the hand gestures, wherein said hand gestures comprise the user raising a hand with one or more fingers extended, wherein the number of fingers extended indicates a countdown in seconds until the camera takes the selfie,
wherein said display apparatus is integrated into the dashboard of the vehicle.

* * * * *